United States Patent
Zakharian

(12) 
(10) Patent No.: US 6,320,281 B1
(45) Date of Patent: Nov. 20, 2001

(54) METHOD OF OBTAINING THE ADJUSTABLE CAPACITOR

(75) Inventor: Manvel Zakharian, 4600 Samson Blvd Suite 25, Laval, Que. (CA), H7W 2H0

(73) Assignee: Manvel Zakharian (CA)

( * ) Notice: Subject to any disclaimer, the term of this patent is extended or adjusted under 35 U.S.C. 154(b) by 0 days.

(21) Appl. No.: 09/292,102

(22) Filed: Apr. 5, 1999

(30) Foreign Application Priority Data

May 11, 1998 (CH) .................................. PCT/IB98/00694

(51) Int. Cl.[7] ...................................... H02M 5/08
(52) U.S. Cl. .................... 307/109; 307/108; 323/352; 361/321.1
(58) Field of Search .................... 307/109, 108, 307/38, 39, 85, 86; 323/352; 361/321.1

(56) References Cited

U.S. PATENT DOCUMENTS

| | | | |
|---|---|---|---|
| 5,463,285 | * 10/1995 | El-Hamamsy | 315/248 |
| 5,568,035 | * 10/1996 | Kato et al. | 320/1 |
| 6,013,958 | * 1/2000 | Aytur | 307/109 |

* cited by examiner

*Primary Examiner*—Fritz Fleming
*Assistant Examiner*—Robert L. Deberadinis

(57) ABSTRACT

The method of obtaining the adjustable capacitor permits transforming all types of capacitors (including Electrolytic, Vacuum, Gas, high-voltage capacitors) into adjustable capacitors without mechanical parts inside capacitors and provides broad ranges of changing the capacity $C_A$ of an adjustable capacitor in electric circuits of direct and alternating currents. The method comprising the steps of: choosing the capacity of one capacitor no more than the capacity of a second capacitor and connecting said capacitors in series; connecting a voltage divider with a second capacitor and applying additional voltage $U_A$ to a divider arm of said voltage divider through at least one branch with at least one unilateral conductive device and/or photodiode; connecting capacitor plates through devices, which change their electrical states: changing the states of said devices within charging and discharging said capacitors by using the current(s) of said branch(es) and/or by using a voltage drop on at least one part of said branch(es). The method offered also includes additional and supplementary branches, having additional and supplementary unilateral conductive devices, switching devices and light sources which are controlled by currents of said branches and/or by a voltage drop on at least one part of said additional and supplementary branches. The present invention permits: independently changing a maximum voltage on the adjustable capacitor and stored energy into it; smoothly changing a voltage of direct or alternating currents on a load; forming on said capacitors stabilized frequency relaxation oscillations whose amplitudes are smoothly changed and whose pulse rate can be independently and smoothly changed; forming on a load stabilized frequency impulse voltages whose minimal values and amplitudes are smoothly changed and whose pulse rate can be independently and smoothly changed. The present invention ensures a low cost price of manufacturing and the highest level of security, reliability and high frequency of charging and discharging of the adjustable capacitor with smooth variation of $C_A$. The method can be used: for maintaining a voltage on a load within defined limits; for smooth variation of a voltage drop on a load in an electric circuit of alternating current; for smooth variation of power consumption of a load in an electric circuit of alternating current; for controlling a turn-on time and/or a turn-off time of at least one load; for triggering a thyristor; for changing motor speed; and in The Pulse Technology of low, medium and high voltages.

49 Claims, 31 Drawing Sheets

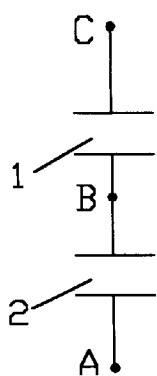
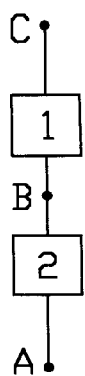
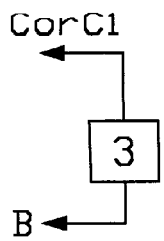
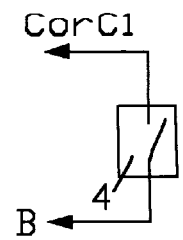
FIG.1  FIG.2  FIG.3  FIG.4
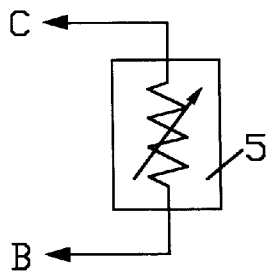
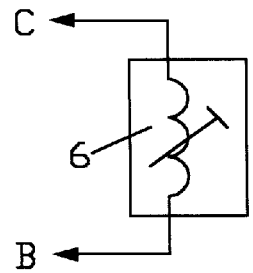
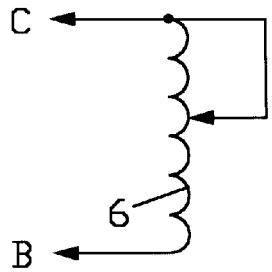
FIG.5  FIG.6-1  FIG.6-2
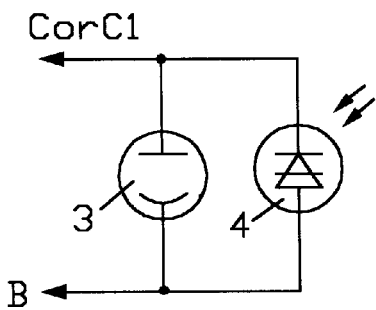
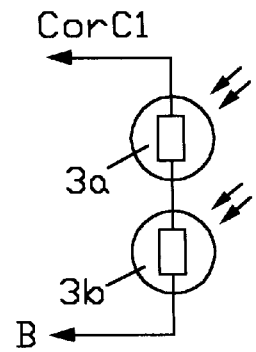
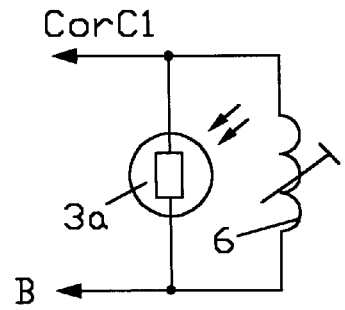
FIG.7  FIG.8-1  FIG.8-2 a)

b)

a)

b)

a)

b)

a)

b)

METHOD OF OBTAINING THE ADJUSTABLE CAPACITOR

THE METHOD OF OBTAINING THE ADJUSTABLE CAPACITOR PRIORITY

PCT application PCT/IB98/00694 filed on May 11, 1998 in the World Intellectual Property Organization (Switzerland). The independent claim 1 of the present invention and the claim 28 of the PCT application PCT/IB98/00694 are the same.

BACKGROUND OF THE INVENTION

The present invention relates to the methods of obtaining the adjustable capacitor for low-voltage and high-voltage.

U.S. Pat. No. 3,569,795, C1.317/231 of Gikow is an example of well known voltage variable capacitors of alternating current in which a capacity of a capacitor is changed as a result of the effect of changing a dielectric constant of a ferroelectric material by direct current control voltage. The capacitors of this type have relatively narrow range of changing a capacity and the used principle of changing a capacity cannot transform other types of capacitors into variable capacitors.

Gikow in U.S. Pat. No. 3,562,637, C1.323/74, uses direct current control voltage, applied to each capacitor from a plurality of capacitors (at least four capacitors), for obtaining the adjustable capacitor of alternating current. The control voltage creates on each of the pairs of said capacitors, connected together in series, voltages which have opposite directions and counteract each other. In this technical solution all energy of charging of said serially connected capacitors cannot be discharged and the energy, which cannot be discharged, is approximately proportional to $(CU_c)^2$ where $U_c$ is the control voltage, C is the capacitance of one of said capacitors. The mentioned shortcomings decrease the range of changing the capacity. Said plurality of capacitors cannot provide a rapid extraction of the stored energy into a load because voltages on each of the pairs of said capacitors have opposite directions and the electric changes on each of two connected together plates of said capacitors are the same: positive or negative. For obtaining the adjustable capacitors according to both Gikow U.S. Pat. No. 3,562,637 and 3,569,795, it is necessary to use a source of control voltage of direct current with resistors and to recuperate relatively high energy losses on said resistors.

In U.S. Pat. No. 5,600,187, C1.307/157, El-Hamamsy et al (for obtaining the adjustable capacitor of alternating current) use direct current bias voltage $V_{ds}$ applied to drain and source terminals of a MOSFET, having a body diode integral therewith, whose gate and source terminals are connected together, where said MOSFET is connected in series with a capacitor $C_1$ and the voltage of operating electric circuit of alternating current is applied to said serially connected MOSFET and capacitor. The output capacitance of said MOSFET comprises the sum of its drain-to-source capacitance and its drain-to-gate capacitance. According to El-Hamamsy et al, both of these interelectrode capacitances vary with the voltage of direct current $V_{ds}$ applied to drain and source terminals of said MOSFET. As said voltage $V_{ds}$ increases, the interelectrode capacitances decrease, thus decreasing the total capacitance between terminals. In this Patent the capacitor $C_1$ is utilized as a protective device which prevents significant power losses. For obtaining a variable capacitor El-Hamamsy et al. use the conception of changing drain-to-source capacitance and drain-to-gate capacitance of a MOSFET by changing said voltage $V_{ds}$ of direct current. This conception has the following shortcomings:

It has very narrow industrial applicability and according to El-Hamamsy et al, the technical solutions of U.S. Pat. No. 5,600,187 are useful as a tuning capacitor in an electrodeless HID lamp ballast;

The peak of energy density is not high;

It can only be utilized for obtaining a variable capacitor of picofarad values;

It cannot be utilized for obtaining a variable Electrolytic Capacitor, etc.

Examples of switching capacitor without moving parts are described in U.S. Pat. Nos. 3,778,645, C1.307/318. This invention includes the steps of; connecting a tunneling capacitor in series with in parallel connected an invariable resistor and a second capacitor; applying a bias impulse voltage to said capacitors. As a result of applying a bias voltage to said capacitors, the tunneling current of the tunneling capacitor increases exponentially and capacitance is changed from a first value to a second value. An impulse direct current voltage source is utilized for applying said bias impulse voltage, Technical solutions of U.S. Pat. No. 3,778,645 do not include a switching device connected to said tunneling capacitor. The equivalent circuit is presented with a switching device $SW_2$ (FIG.3) for explaining creation of a tunneling current by said tunneling capacitor and by said applied bias voltage. In U.S. Pat. No. 3,778,645, one cannot find the following information: is said tunneling capacitor larger or smaller in comparison with said second capacitor?; is said resistor connected in parallel with larger or smaller of said capacitors? This U.S. Patent includes technical solutions with two tunneling sections which are placed in series with oppositely poled unidirectional devices, This method has the following shortcomings:

The impulse direct current voltage source affects the value and the form of operating alternating voltage when applying the bias voltage;

It cannot provide a rapid extraction of all stored energy into a load, in an operating circuit of direct current;

Used principle of changing a capacity cannot smoothly change a capacitance and cannot transform other types of capacitors into variable capacitors;

The tunneling current increases energy losses. It is also necessary to underline that the technical solutions, presented in U.S. Pat. No. 3,778,645, can only function with said tunneling capacitor whose structure is described in the claims 2, 3 and 7 of said Patent.

A conception, which permits transforming all types of invariable capacitors into adjustable capacitors and simultaneously obtaining a voltage source with stepless voltage control, does not exist in the art.

It exists only one practically useful method for smooth control of a rate of charge of all types of capacitors in an operating electric circuit. This method includes the step of charging a capacitor through a variable current limiting device and changing a rate of charge of said capacitor by changing an impedance of said current limiting device. Therefore, said variable current limiting device must have a design voltage no less than the voltage of said operating electric circuit and a design power which is proportional to $I^2$, where I is an average current of charging of said capacitor.

SUMMARY OF THE INVENTION

The present invention includes the conception of changing the total stored energy of at least two capacitors or at least two groups of capacitors which are connected in series. This conception is described in U.S. nonprovisional Patent Application 08/995,415 of Manvel Zakharian filed on Dec. 19, 1997 (the examination has not been finished). The expressions from (1) to (8), described in the detailed description of the invention, are the theoretical base of said conception.

The mentioned conception is realized by the steps of:
choosing the capacity of a first capacitor or a first group of capacitors, which has first and second output terminals, no more than the capacity of a second capacitor or a second group of capacitors which has first and second output terminals;

connecting at least said first and second capacitors or said first and second groups of capacitors in series;

connecting capacitor plates of said first capacitor or said output terminals of said first group of capacitors through at least one cell, which changes its resistance or reactance, or at least one switching device or at least one adjustable resistance device or at least one adjustable reactance device;

then converting at least one of said cells or switching devices or adjustable resistance devices or adjustable reactance devices into a non-conducting state or into a state with higher impedance within charging of said second capacitor or said second group of capacitors; then connecting electrically the capacitor plates of said first capacitor or said output terminals of said first group of capacitors.

These steps with the additional steps permit transforming all types of invariable capacitors into adjustable capacitors and simultaneously obtaining a voltage source with stepless voltage control. The invention comprises the following additional steps:

applying a control voltage $U_A$ to said second capacitor or to said output terminals of the second group of capacitors through at least one branch, having at least one unidirectional conductive device or photodiode, or connecting capacitor plates of said second capacitor or said output terminals of the second group of capacitors through a voltage divider and applying said control voltage $U_A$ to a divider arm of said voltage divider through at least one branch having at least one unidirectional conductive device or photodiode;

using a current of at least one of said branches or using a voltage drop on at least one part of said branches for controlling or realizing at least one of said steps of connecting and said step of converting;

and changing a capacity of the adjustable capacitor by changing a value of said control voltage $U_A$ or by changing a value(s) of impedance(s) on at least one of divider arms of said voltage divider.

Another object of the invention is further simplification of the adjustable capacitor. This $2^{nd}$ object is attained by steps of claims 2 or 3.

Another object of the invention is to provide broad ranges of changing the capacity of the adjustable capacitor $C_A$ with smooth variation of $C_A$. This $3^{rd}$ object is attained by steps of claims 4 or 5.

Another object of the invention includes:
obtaining the adjustable capacitor with a higher frequency of charging and discharging;
increasing smooth variation of $C_A$;
decreasing energy losses and dimensions;
obtaining the adjustable capacitor with the highest level of security for medium and high voltages. This $4^{th}$ object is attained by step of claim 6.

Another object of the invention is to decrease energy losses and the cost price of the step of charging the adjustable capacitor. This $5^{th}$ object is attained by technical solution described by claim 7.

Another object of the invention is to obtain the adjustable capacitor with smooth variation of a voltage of direct current on a load. This $6^{th}$ object is attained by steps of claim 8.

Another purpose of the invention is to increase functional potentialities of the adjustable capacitor. This purpose is achieved by new control systems:

a) A first control system having at least one of switching devices S1, S1-1 and/or light sources LS1, LS1-1. The first control system is attained by steps of at least one of claims 9 and 10;

b) A second control system having at least one of switching devices S2, S2-2 and/or light sources LS2, LS2-1. The second control system is attained by steps of at least one of claims 16, 17 and 18;

c) A third control system having at least one of switching devices S3, S3-1 and/or light sources LS3, LS3-1. The third control system is attained by steps of at least one of claims 26, 27 and 28.

Said new functional potentialities of the adjustable capacitor permit:

1. Forming on the second capacitor stabilized frequency relaxation oscillations whose amplitude can be smoothly changed. This $7^{th}$ object is attained by step of claim 11.

2. Forming on a load impulse voltages whose amplitude can be smoothly changed. This $8^{th}$ object is attained by step of claim 14.

3. Forming on the first and second capacitors a stabilized frequency relaxation oscillations whose pulse rate and amplitude can be smoothly changed. This $9^{th}$ object is attained by step of claim 19.

4. Changing independently a maximum voltage $U_{ADjmax}$ on the adjustable capacitor and a stored energy into it. This $10^{th}$ object is attained by steps of claim 21.

5. Forming on a load impulse voltages whose minimal value or amplitude is smoothly changed and whose pulse rate can be independently and smoothly changed. This $11^{th}$ object is attained by step of claim 22.

6. Forming on a load impulse voltages (whose amplitudes are independently and smoothly changed) as a function of a voltage level on the first and second capacitors. This $12^{th}$ object is attained by step of claim 23.

7. Forming on a load impulse voltages whose minimal values and amplitudes are smoothly changed and whose pulse rate can be independently and smoothly changed. This $13^{th}$ object is attained by step of claim 30.

8. Forming on a load impulse voltages (whose pulse duration and amplitudes are smoothly changed) as a function of two voltage levels on the first and second capacitors. This $14^{th}$ object is attained by step of claim 31.

9. Forming on a load stabilized frequency impulse voltages whose minimal values and amplitudes are smoothly changed and whose pulse rate can be independently and smoothly changed. This $15^{th}$ object is attained by step of claim 32.

10. Changing a pulse duration on a load and a pulse rise time as a function of a voltage level on the first and second capacitors. This $16^{th}$ object is attained by steps of claim 33.

11. Controlling a turn-on time and/or a turn-off time of at least one load by at least one of said switching devices and light sources. This $17^{th}$ object can be differently achieved by one of said control systems and without adding a new part:

d) by step of claim 12;
e) by step of claims 20 or 29.

12. Controlling a delay time in at least one electric circuit having at least one photosensitive part. This 18$^{th}$ object can be differently achieved by one of said control systems and without adding a new part:

f) by steps of claim 15;

g) by steps of claim 25.

Another object of the invention is to increase smooth variation of $C_A$ and to increase ranges of changing the capacity of the adjustable capacitor $C_A$. This 19$^{th}$ object is attained by steps of claim 35.

Another object of the invention is to obtain the adjustable capacitor for a direct current which can also be used in an electric circuit of alternating current. This 20$^{th}$ object is attained by step of claim 37.

Another object of the invention is to ensure a lower cost price of manufacturing the adjustable capacitor of alternating current whose capacity $C_A$ can be changed within a positive and a negative period of oscillations. This 21$^{st}$ object is attained by steps of claim 38.

Another object of the invention is to increase reliability and smooth variation of $C_A$ in an electric circuit of alternating current. This 22$^{nd}$ object is attained by steps of claim 40.

Another object of the invention is to decrease energy losses of the adjustable capacitor for an electric circuit of alternating voltage. This 23$^{rd}$ object is attained by steps of claim 41.

Another object of the invention is to obtain the adjustable capacitor with smooth variation of an alternating voltage on a load. This 24$^{th}$ object is attained by step of claim 42.

Another object of the invention is to obtain the adjustable capacitor for an electric circuit of alternating current with high frequency of charging and discharging and with smooth variation of $C_A$. This 25$^{th}$ object is attained by steps of claim 43.

The objects, advantages and many other novel features of the present invention are apparent from the following detailed description when read in conjunction with the appended claims and attached drawings.

BRIEF DESCRIPTION OF THE DRAWINGS

FIGS. from 1 to 8-2 illustrate the steps for obtaining the adjustable capacitor of direct current on the base of two capacitors or two groups of capacitors.

FIG. 32 illustrates also the step of charging the adjustable capacitor 12 through a light source and a bridge rectifier.

Figure 44:
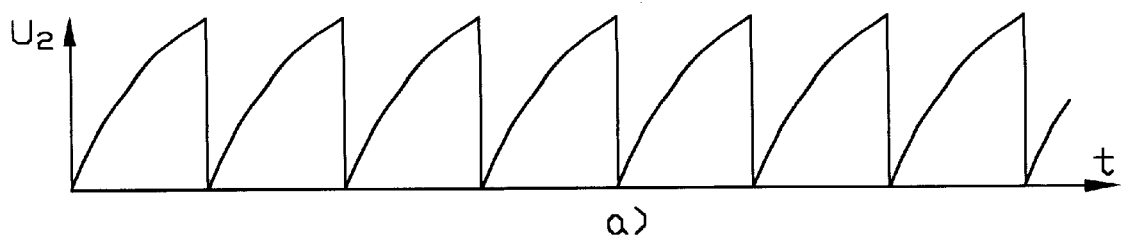
FIG. 44 illustrates relaxation oscillations whose amplitudes are controlled by said first control system.
Figure 44:
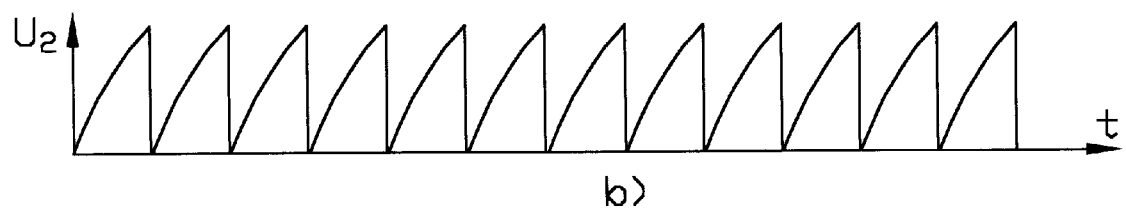

$U_2$ (FIG. 44$a$ and FIG. 44$b$)-voltages on the second capacitor 2.

Figure 45:
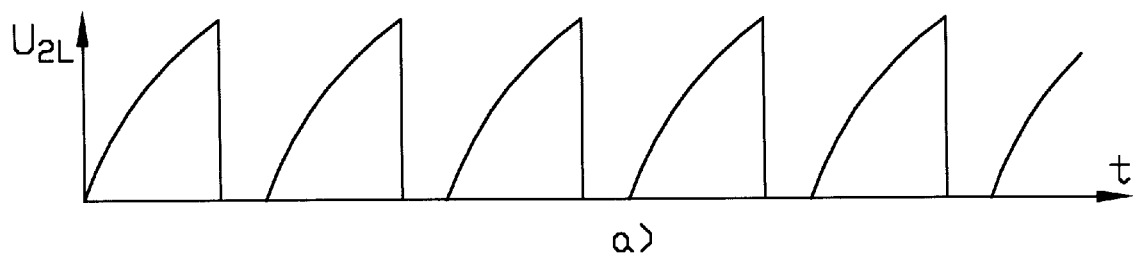
Figure 45:
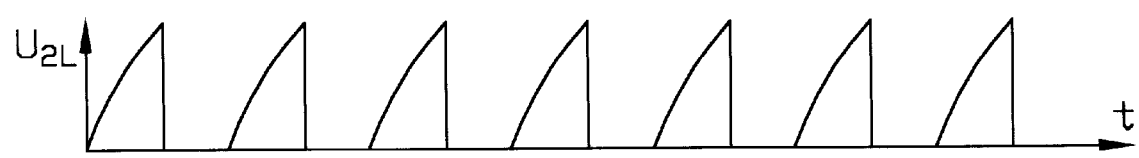
Figure 46:
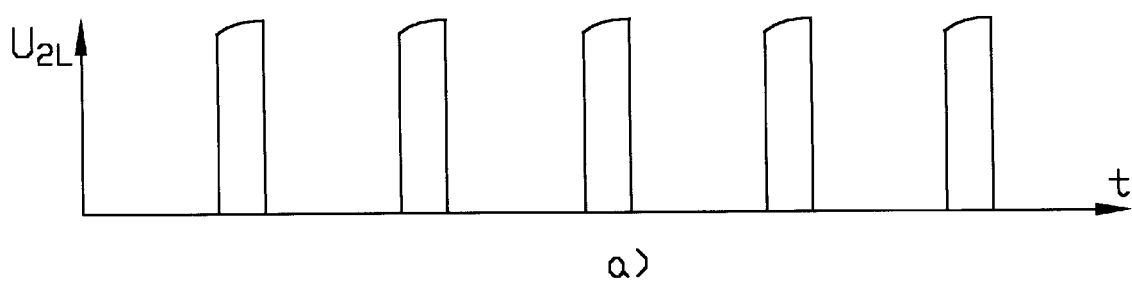
Figure 46:
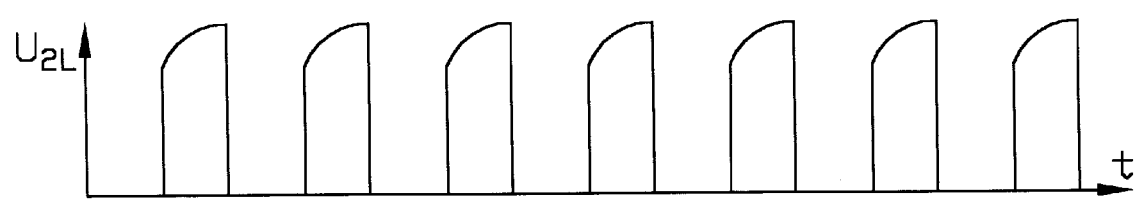

FIGS. 45–46 illustrate impulse voltages whose amplitudes (FIG. 45) or minimal values (FIG. 46) are changed.

$U_{2L}$ (FIGS. 45–46)-voltages which are formed on a load by said first control system, the second capacitor 2 and the step of changing the capacity $C_A$ of the adjustable capacitor 12.

FIGS. 48–51 illustrate realizations of said second control system.

FIG. 47 and FIGS. 52–63 illustrate realizations which ensure new functional potentialities of the adjustable capacitor by said second control system.

Figure 64:
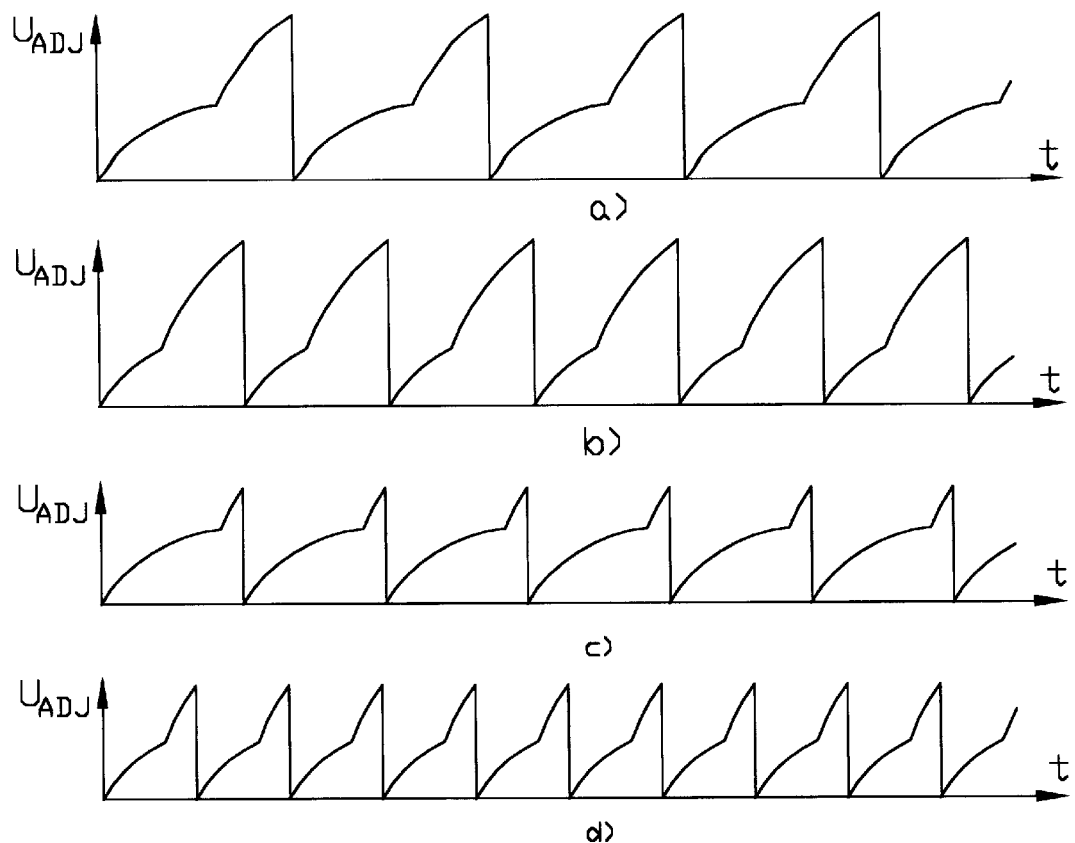

FIG. 64 illustrates relaxation oscillations whose amplitudes are smoothly changed (by said second control system) and whose pulse rate can be independently and smoothly changed by the step of changing the capacity $C_A$ of the adjustable capacitor 12.

$U_{ADJ}$ (FIG. 64)-voltages on said first 1 and second 2 capacitors.

Figure 47:
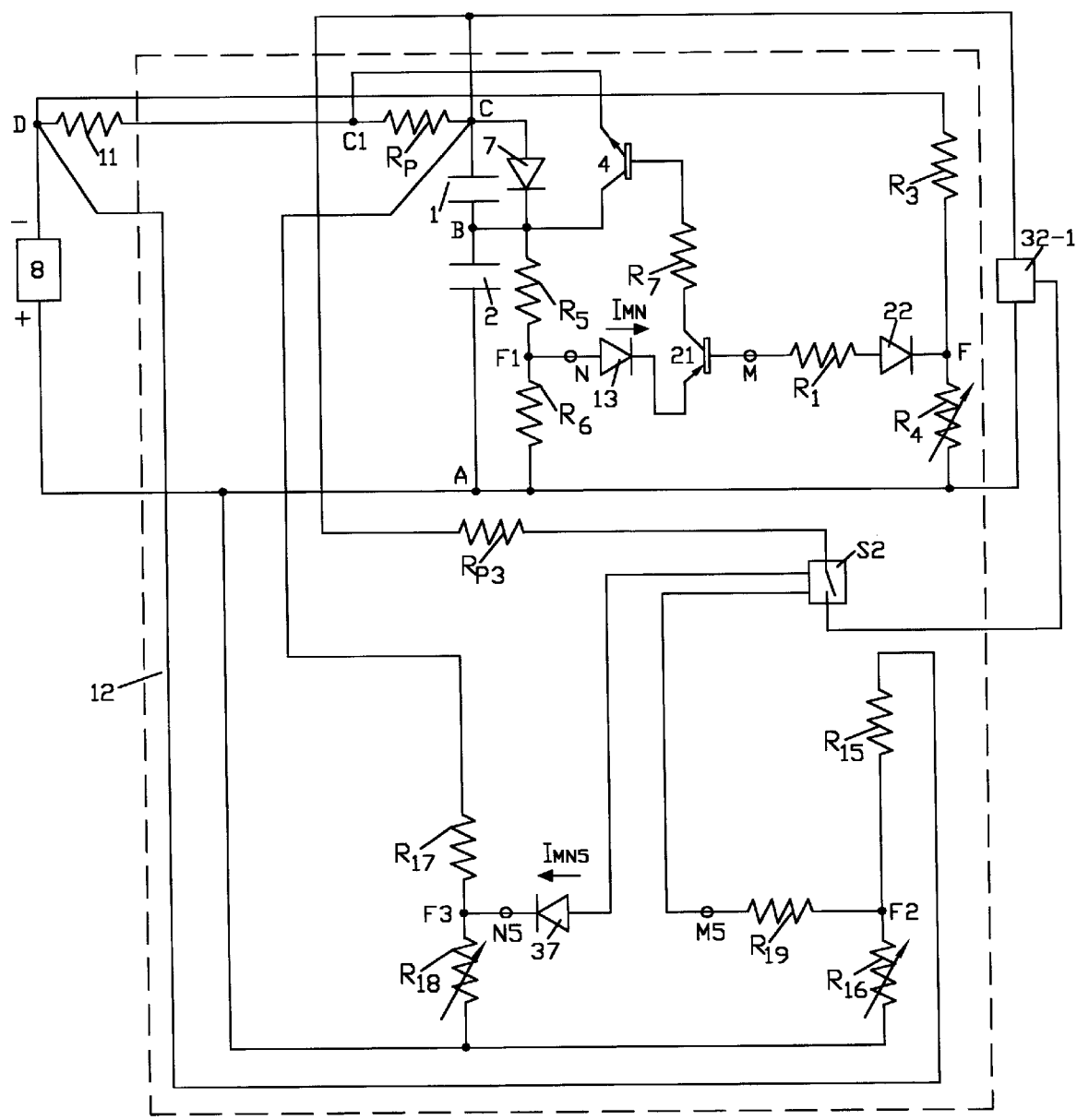
Figure 65:
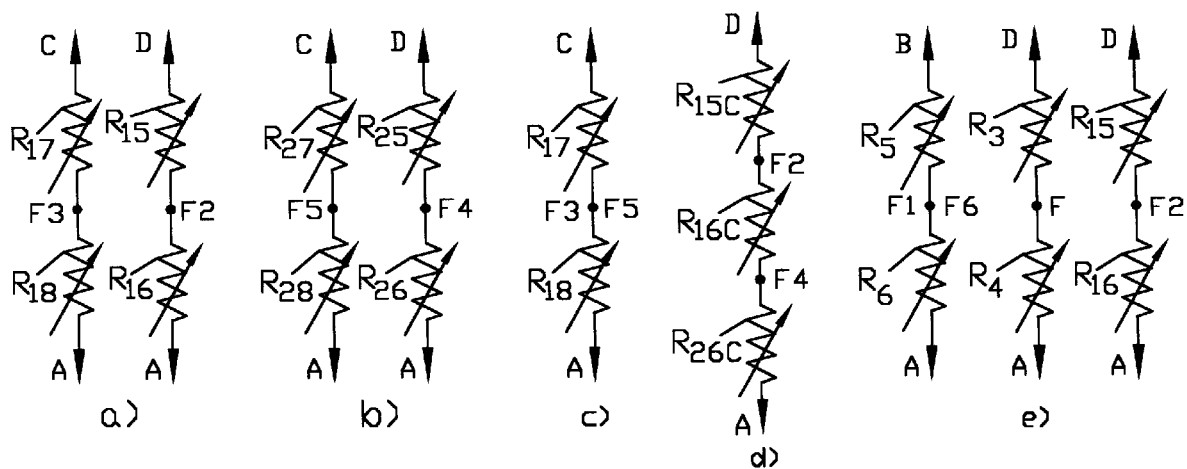
Figure 66:
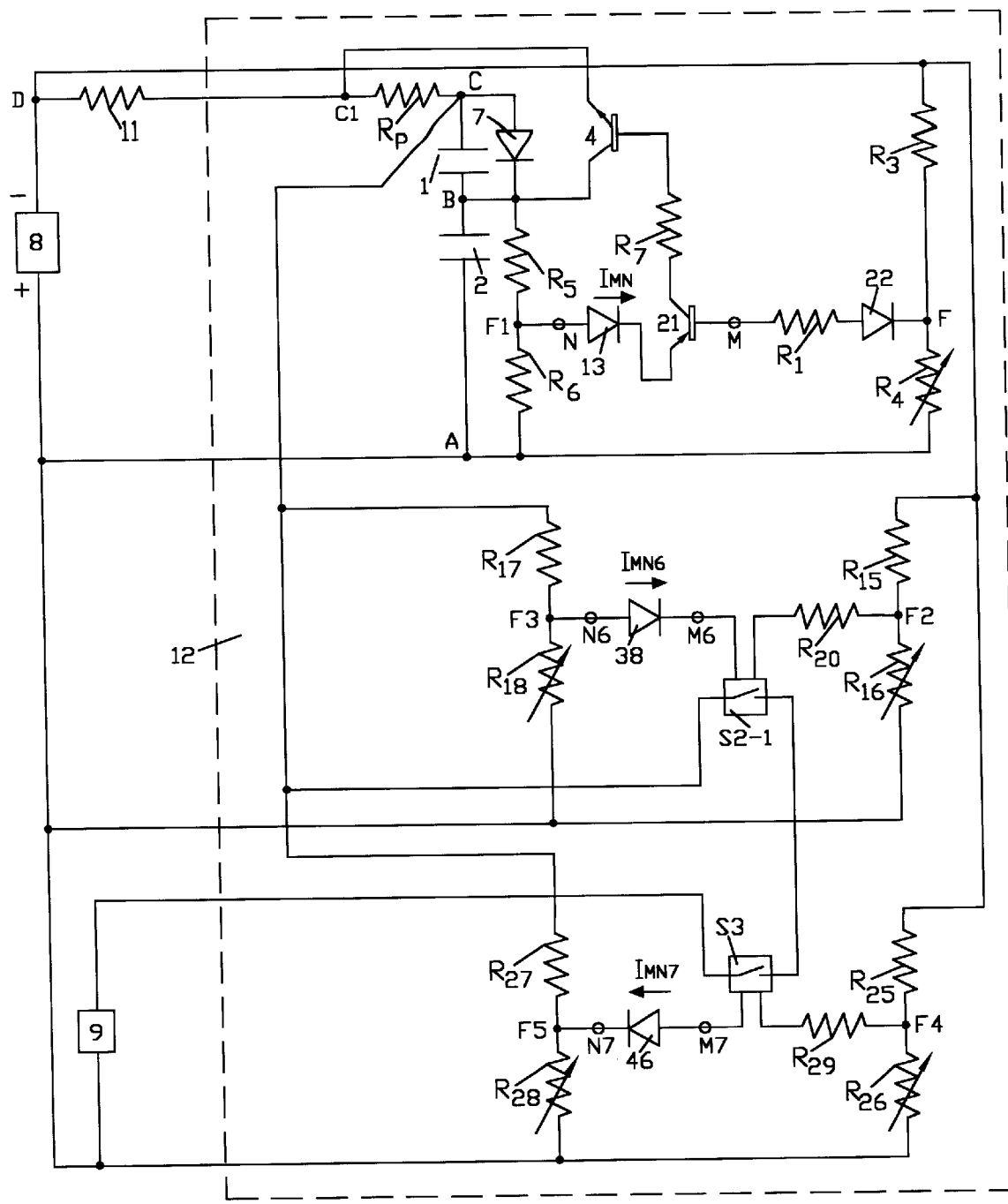

FIG. 65$a$ and FIG. 47 illustrate a second voltage divider (with resistances $R_{17}$ and $R_{18}$) and a supplementary voltage divider (with resistances $R_{15}$ and $R_{16}$). FIG. 65$b$ and FIG. 66 illustrate a third voltage divider (with resistances $R_{27}$ and $R_{28}$) and a second supplementary voltage divider (with resistances $R_{25}$ and $R_{26}$). FIG. 65$c$ illustrates the step of combining the second voltage divider with the third voltage divider. FIG. 65$d$ illustrates the step of combining the supplementary voltage divider with the second supplementary voltage divider and a combined voltage divider with resistances $R_{15C}$, $R_{16C}$ and $R_{26C}$. FIG. 65$e$ illustrates the additional (with resistances $R_3$ and $R_4$) and the supplementary voltage dividers and the step of combining the voltage divider with the new voltage divider.

FIGS. 67–70 illustrate realizations of said third control system.

FIG. 66 and FIGS. 71–77 illustrate realizations which ensure new functional potentialities of the adjustable capacitor by the second and the third control systems.

Figure 78:
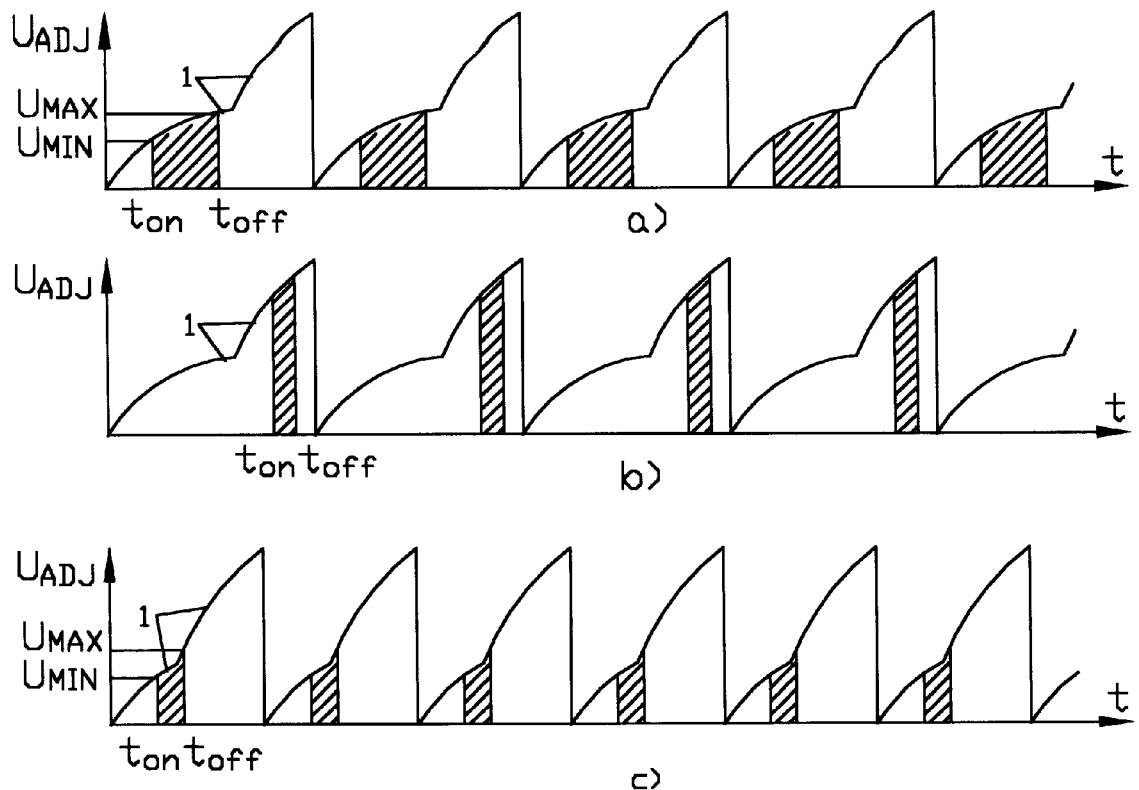

FIG. 78 illustrates relaxation oscillations on the first 1 and second 2 capacitors and impulse voltages (shaded sections) whose minimal values and amplitudes are smoothly changed (by said second and third control systems) and whose pulse rate can be independently and smoothly changed by the step of changing the capacity $C_A$ of the adjustable capacitor 12.

Figure 79:
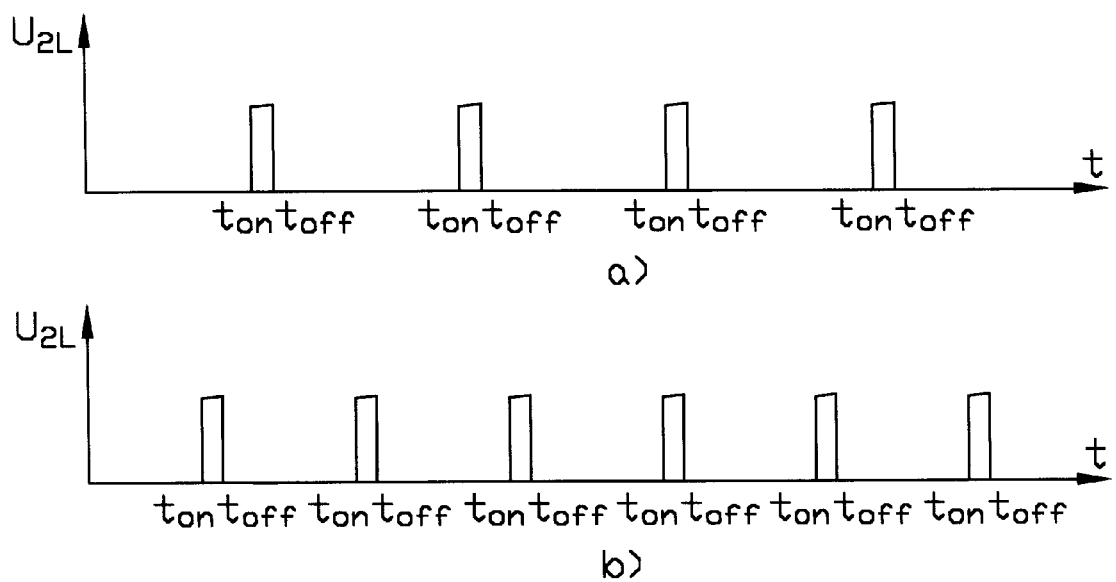
Figure 80:
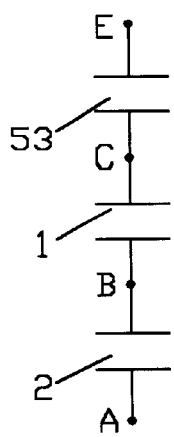
Figure 81:
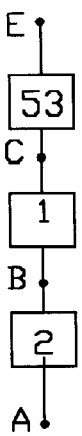
Figure 82:
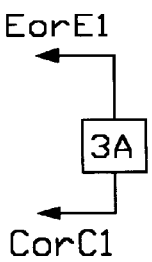
Figure 83:
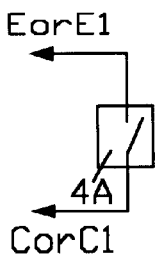
Figure 84:
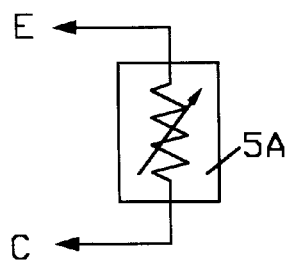
Figure 85:
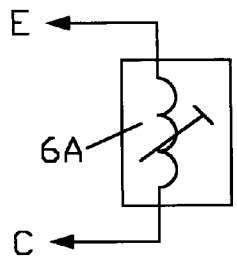

FIG. 79 illustrates impulse voltages on a load whose amplitudes can be smoothly changed by said second and third control systems.

$U_{2L}$ (FIG. 79$a$ and FIG. 79$b$)-voltages which are formed on a load by said second and third control systems, the second capacitor 2 and the step of changing the capacity $C_A$ of the adjustable capacitor 12.

FIGS. 80–87 illustrate the steps for obtaining the adjustable capacitor of direct current (FIG. 86) and alternating current (FIG. 87) on the base of three capacitors.

Figure 88:
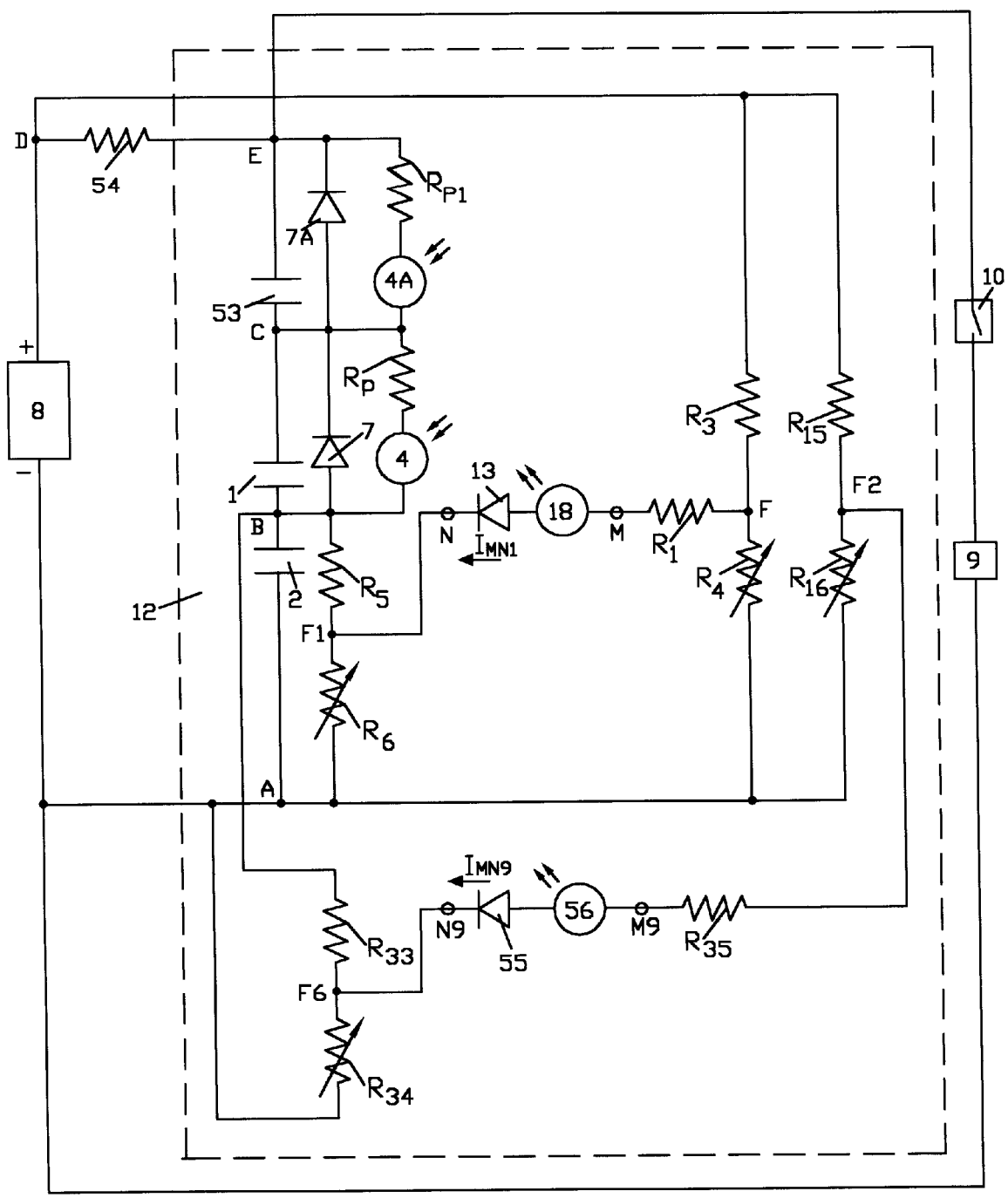

FIG. 88 illustrates a realization of the adjustable capacitor of direct current on the base of three capacitors. This realization includes the voltage divider (with resistances $R_5$ and $R_6$) and the new voltage divider (with resistances $R_{33}$ and $R_{34}$).

Figure 86:
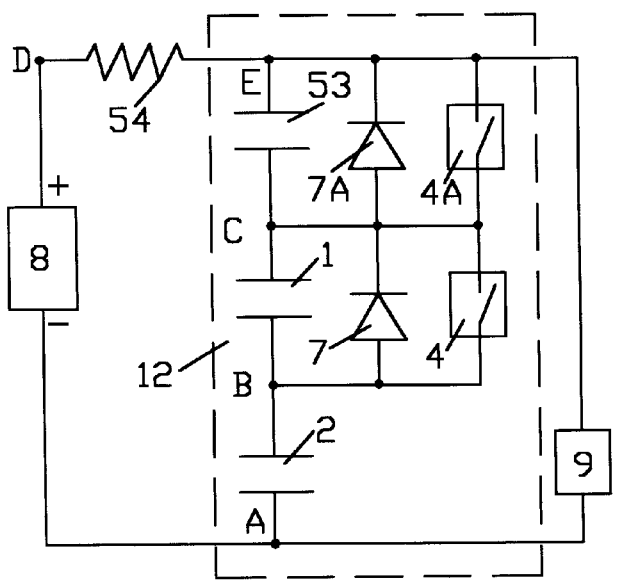
Figure 89:
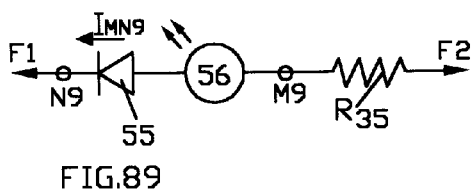

FIG. 89 and FIG. 65e illustrate the step of combining said voltage divider with said new voltage divider for a realization of the adjustable capacitor of direct current on the base of three capacitors (FIG. 86).

Figure 90:
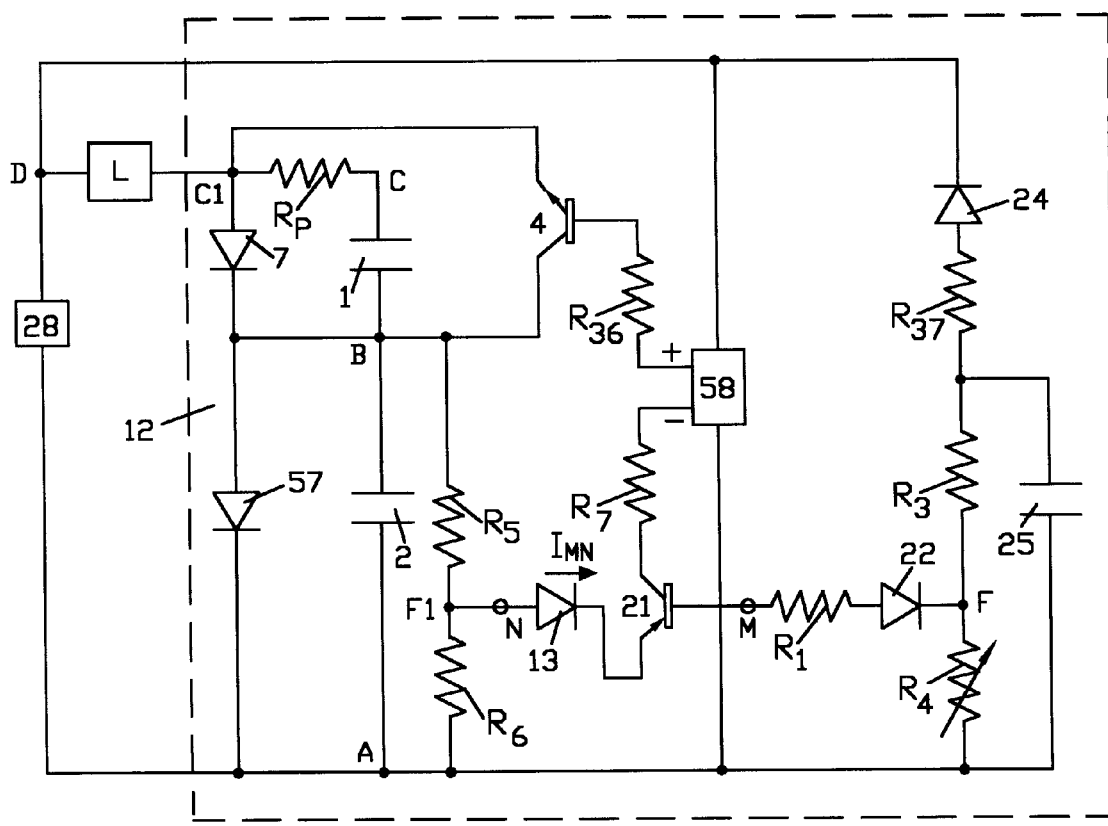

FIG. 90 illustrates a realization of the adjustable capacitor for a direct and an alternating currents.

Figure 91:
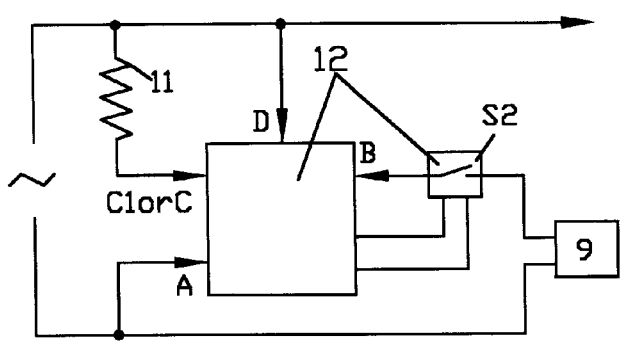

FIG. 91 illustrates a realization of the adjustable capacitor 12 in which a turn-on time or a turn-off time of the second capacitor with a load 9 is controlled as a function of a voltage level on the first and second capacitors.

Figure 92:
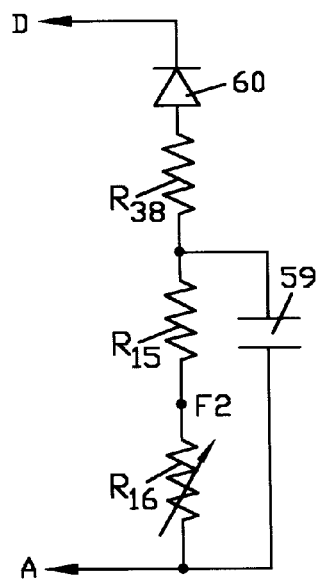

FIG. 92 illustrates a realization of a supplementary voltage divider.

FIGS. 93–97 illustrate realizations of the adjustable capacitor of alternating current whose capacity $C_A$ can be changed within a positive and a negative period of oscillations.

FIG. 98b explains the process of charging and discharging the second capacitor of the adjustable capacitors (which are illustrated in FIGS. 93, 94, 95, 96 and 97) in an electric circuit of alternating voltage (FIG. 98a).

Figure 99:
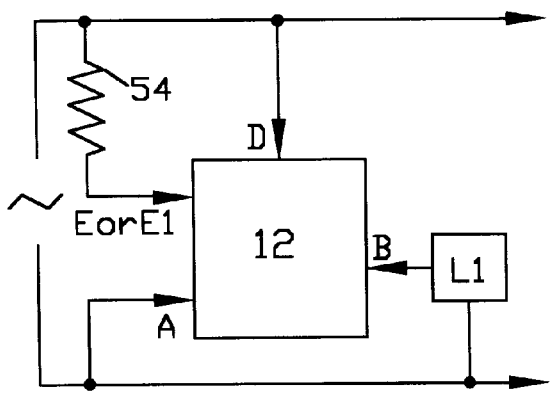

FIG. 99 illustrates a realization of the adjustable capacitor which ensures smooth variation of an alternating voltage on a load.

Figure 100:
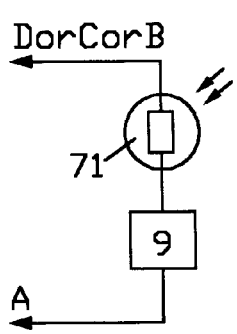

FIG. 100 illustrates a realization in which a turn-on time and/or a turn-off time of a load 9 are controlled by one of said light sources LS1, LS1-1, LS2, LS2-1, LS3, LS3-1 which is optically connected to a photosensitive part 71.

Figure 101:
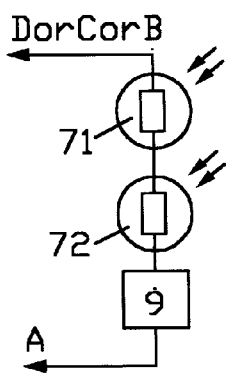

FIG. 101 illustrates a realization in which a turn-on time and a turn-off time of a load 9 are controlled by one of said light sources LS2, LS2-1 and one of said light sources LS3, LS3-1 which function as normally switched off and as normally switched on light sources and which are optically connected respectively to photosensitive parts 71 and 72.

DETAILED DESCRIPTION OF THE DRAWINGS

The invention is hereinafter described with reference to the accompanying drawings in which:

FIG. 1 and FIG. 2 illustrate the step of connecting said first 1 and said second 2 capacitors (FIG. 1) or first 1 and second 2 groups of capacitors (FIG. 2) in series;

FIG. 3, FIG. 4, FIG. 5, FIG. 6-1, FIG. 6-2, FIG. 7, FIG. 8-1, FIG. 8-2 with FIG. 1 and FIG. 2 illustrate the step of connecting capacitor plates of said first capacitor 1 or said output terminals of said first group of capacitors 1 through at least one cell 3 (FIG. 3, FIG. 7 and FIG. 8-2 ), which changes its impedance, and/or at least one switching device 4 (FIG. 4 and FIG. 7) and/or at least one adjustable resistance 5 (FIG. 5) and/or at least one adjustable reactance 6 (FIG. 6-1, FIG. 6-2 and FIG. 8-2) device(s).

As a cell, which changes its impedance, can be used: a photoconducting cell or cells 3a, 3b (FIG. 8-1), a photoelectric cell 3 (FIG. 7), a photorelay, a photodiode, a material which changes its resistance with changes in temperature, for example $VO_2$.

Figure 15:
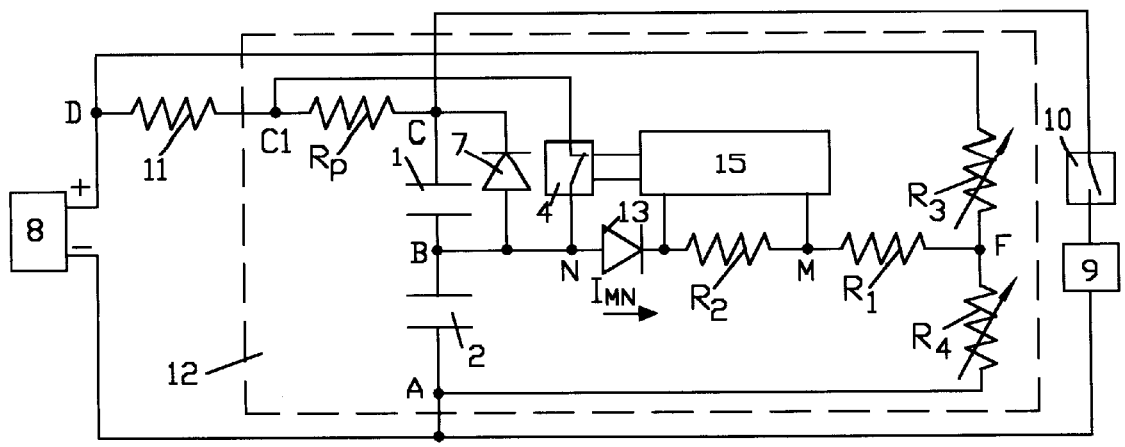
Figure 16:
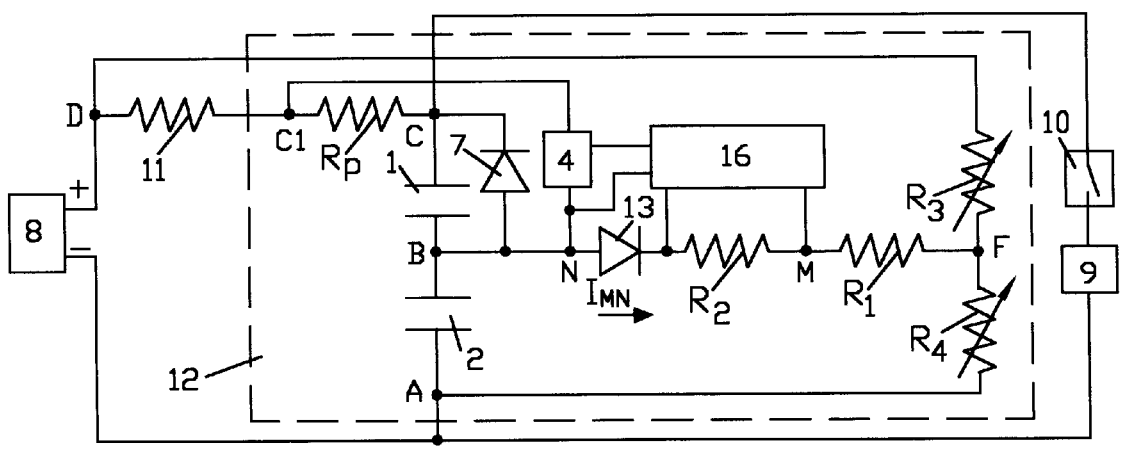
Figure 17:
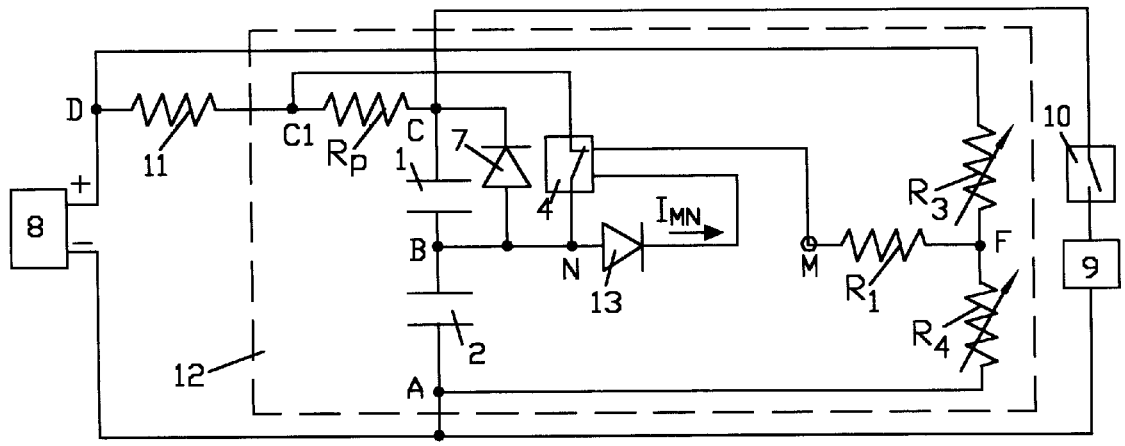
Figure 24:
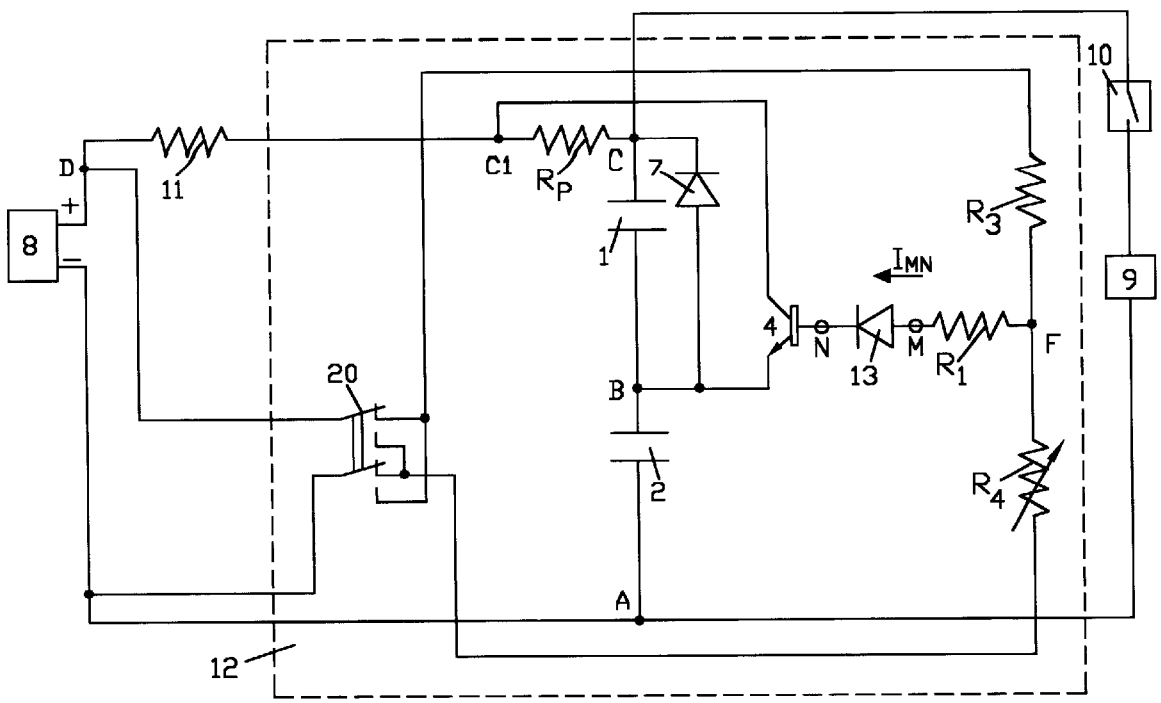
FIG. 24 illustrates a realization of the adjustable capacitor 12 which permits simplifying the adjustable capacitor by the step of reversing a voltage applied to an additional voltage divider.
Figure 25:
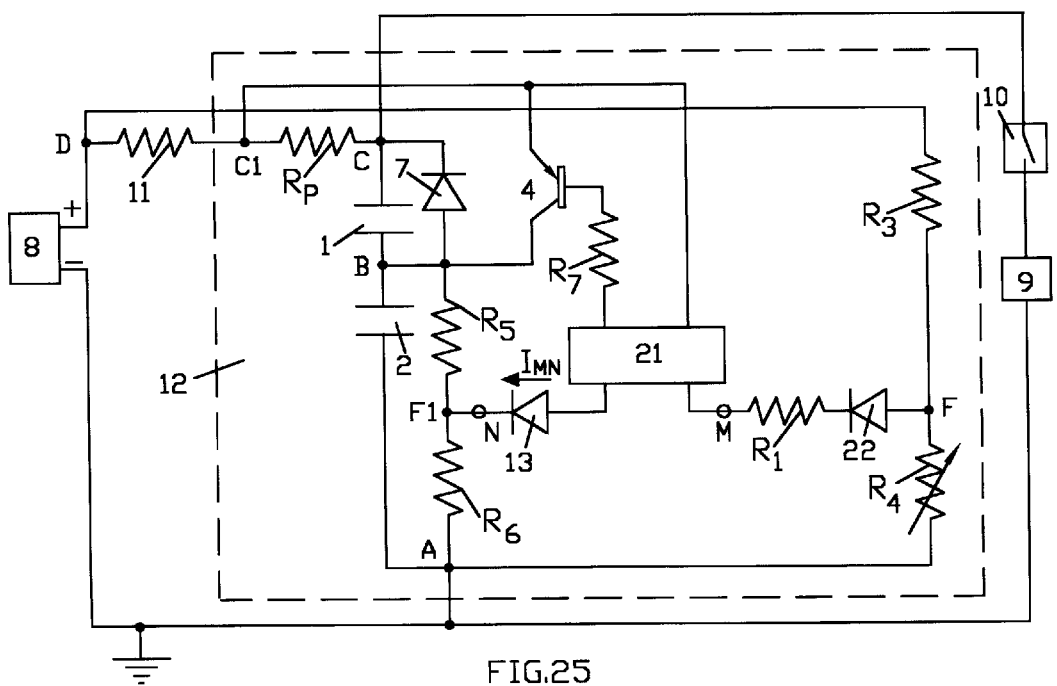
FIGS. 25–28 illustrate realizations of the adjustable capacitor 12 with an amplifying device 21.
Figure 26:
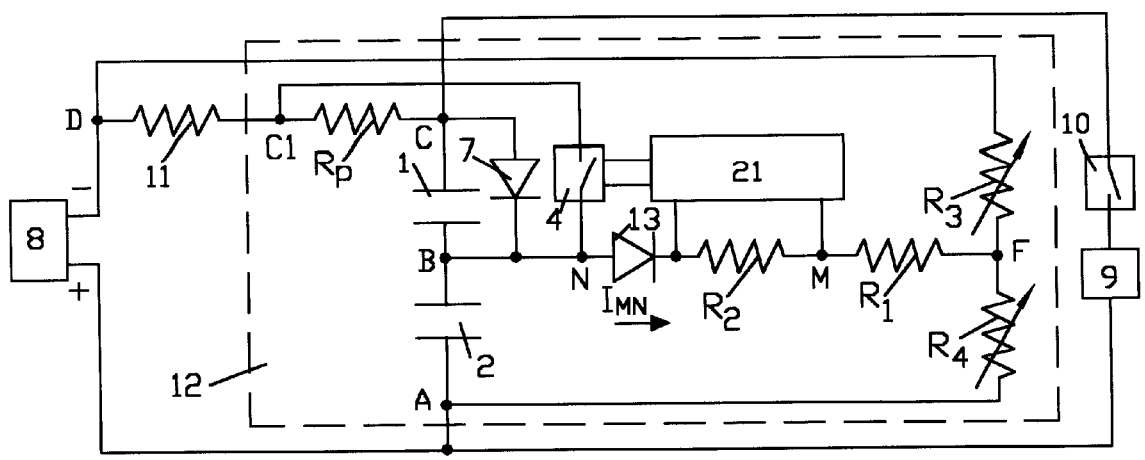
Figure 27:
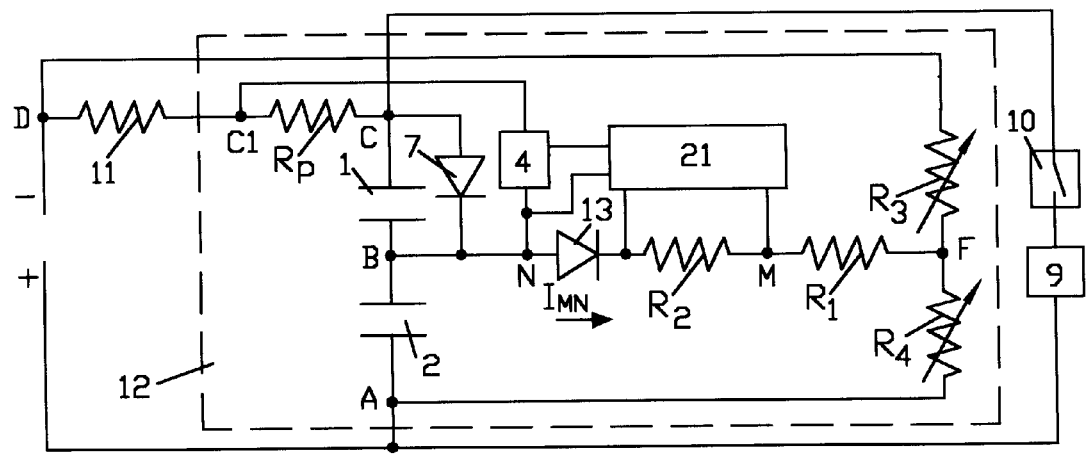
Figure 28:
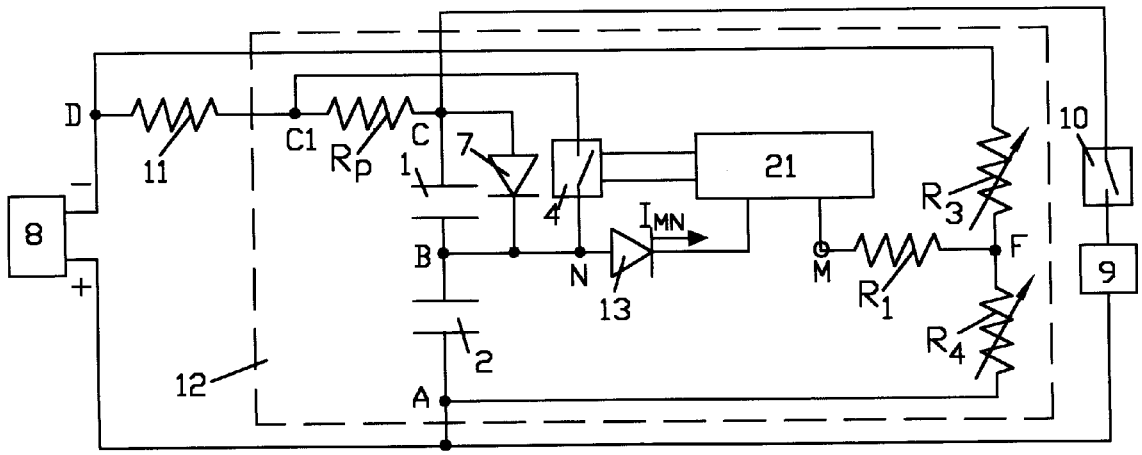
Figure 31:
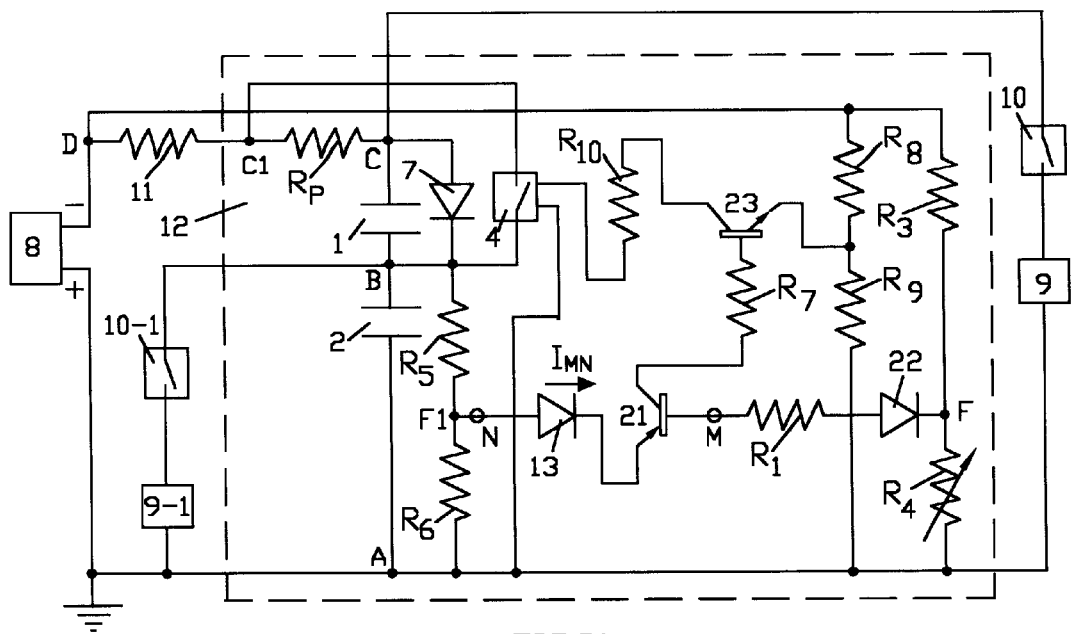
Figure 32:
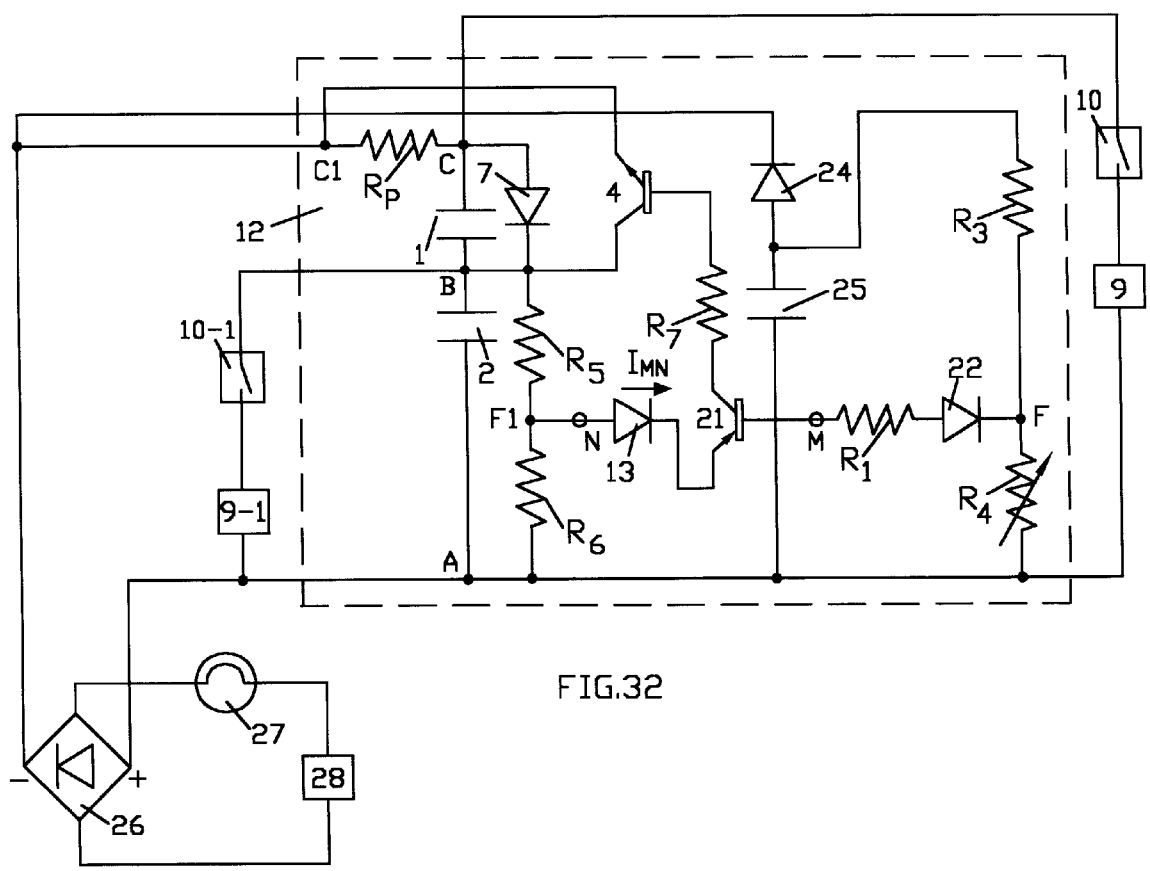
Figure 62:
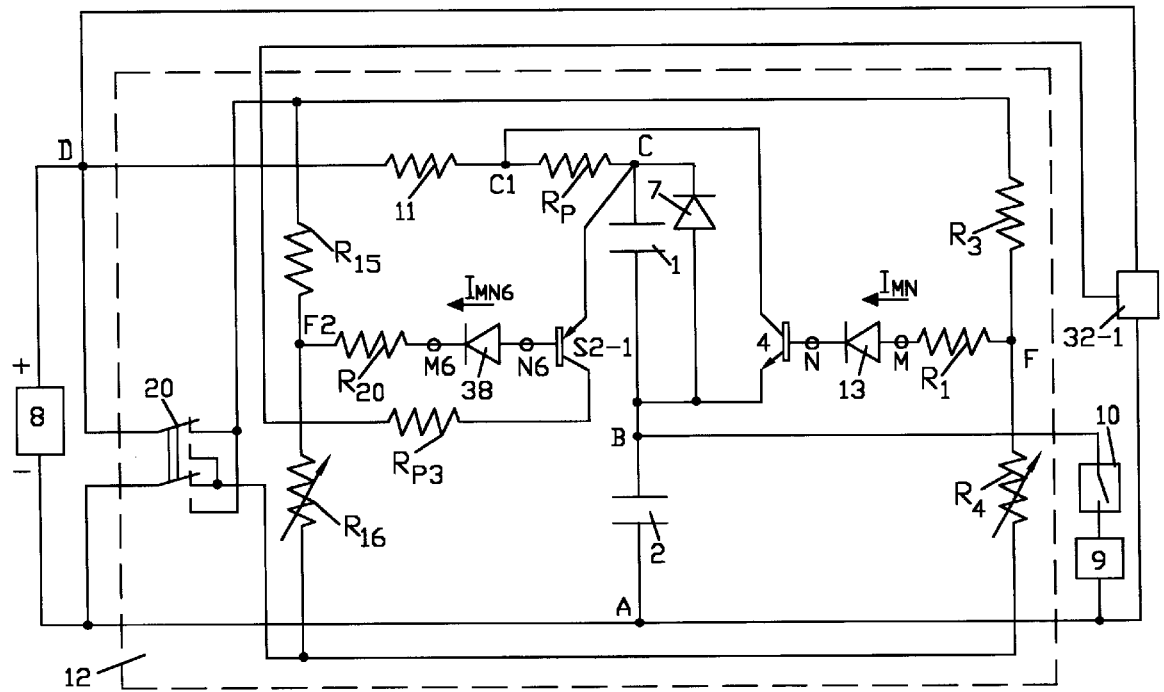
Figure 63:
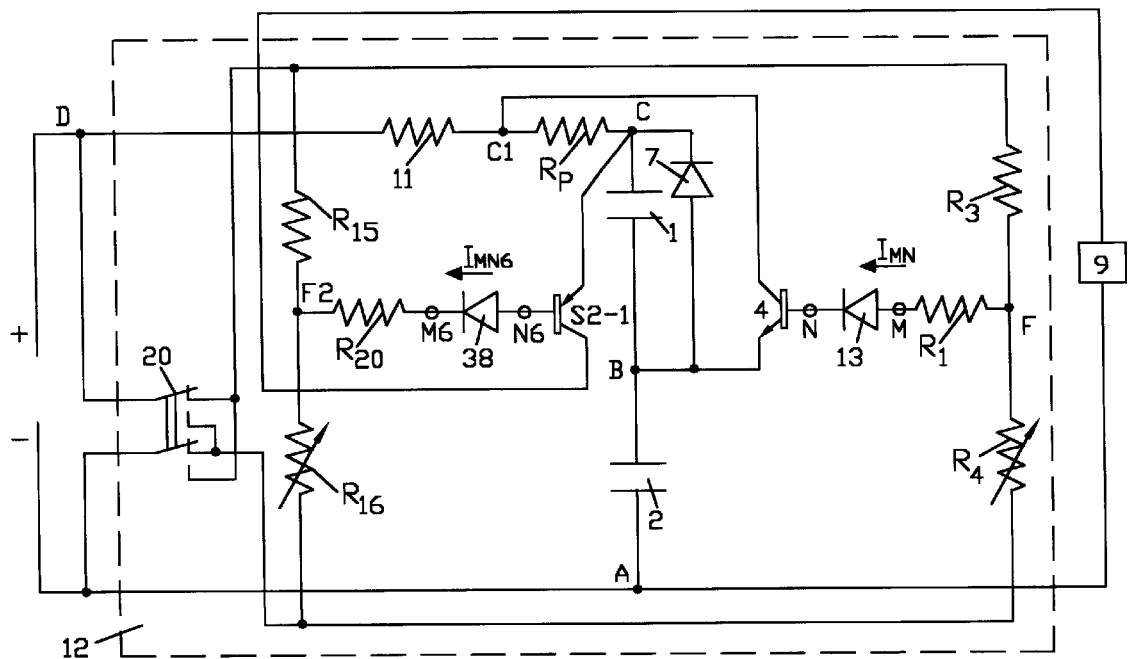
Figure 95:
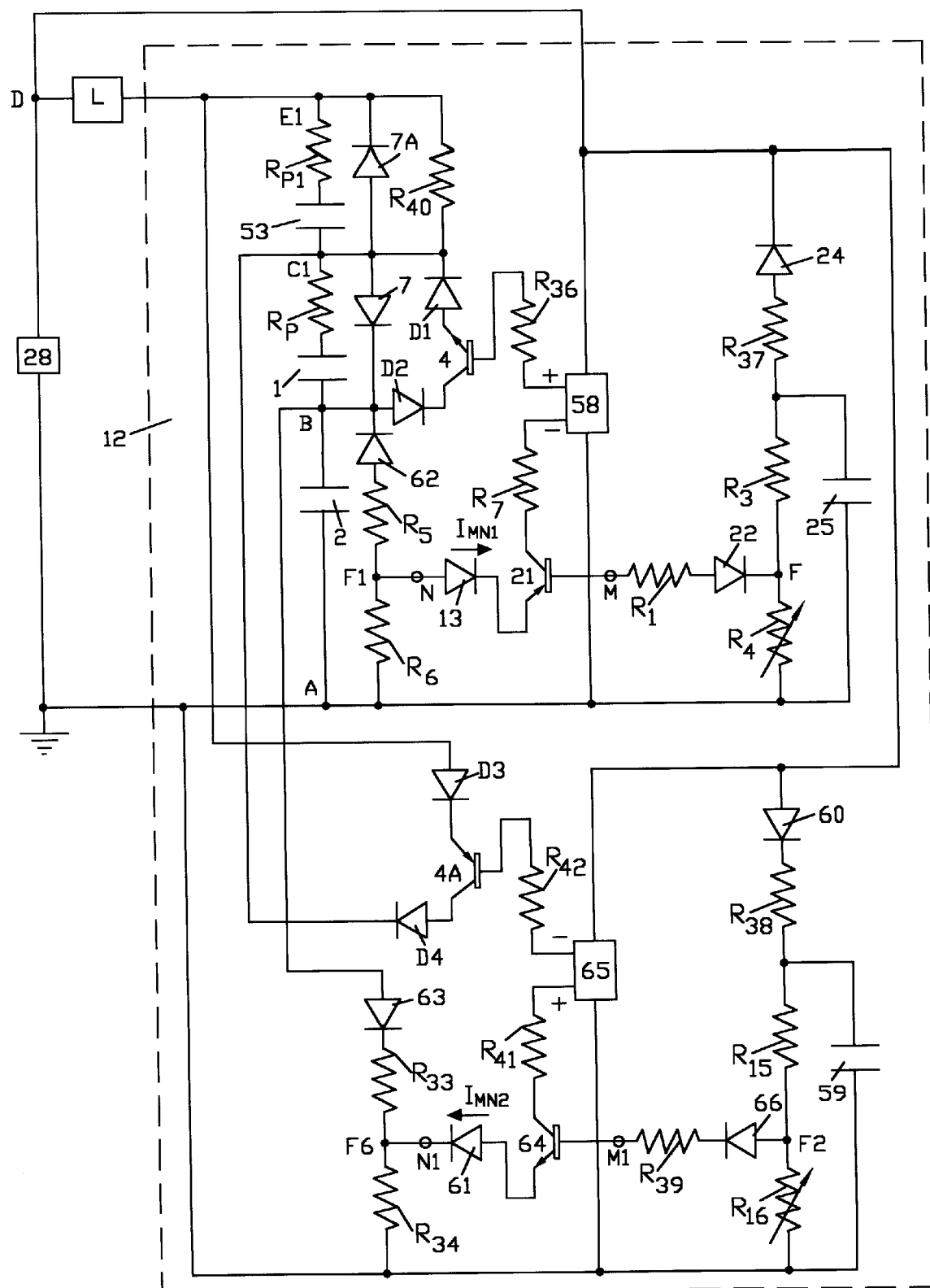
Figure 96:
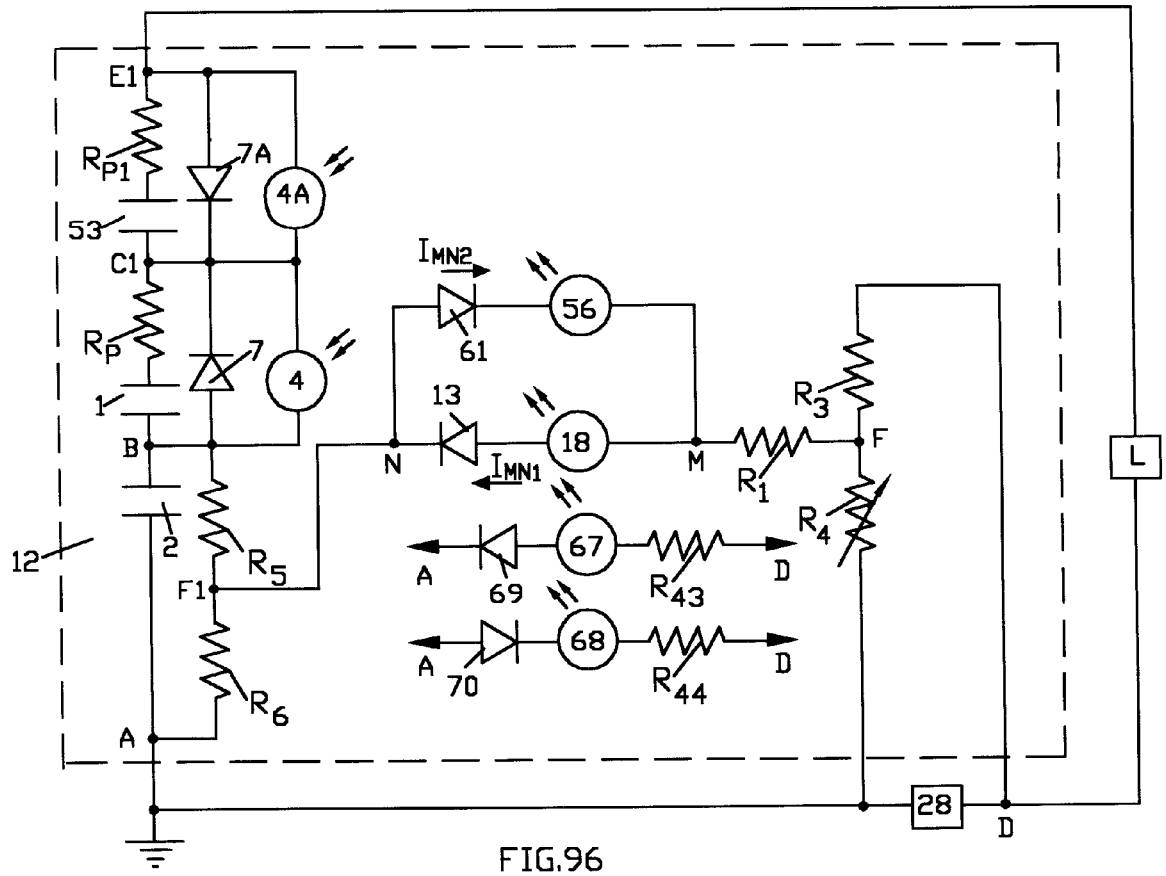
Figure 97:
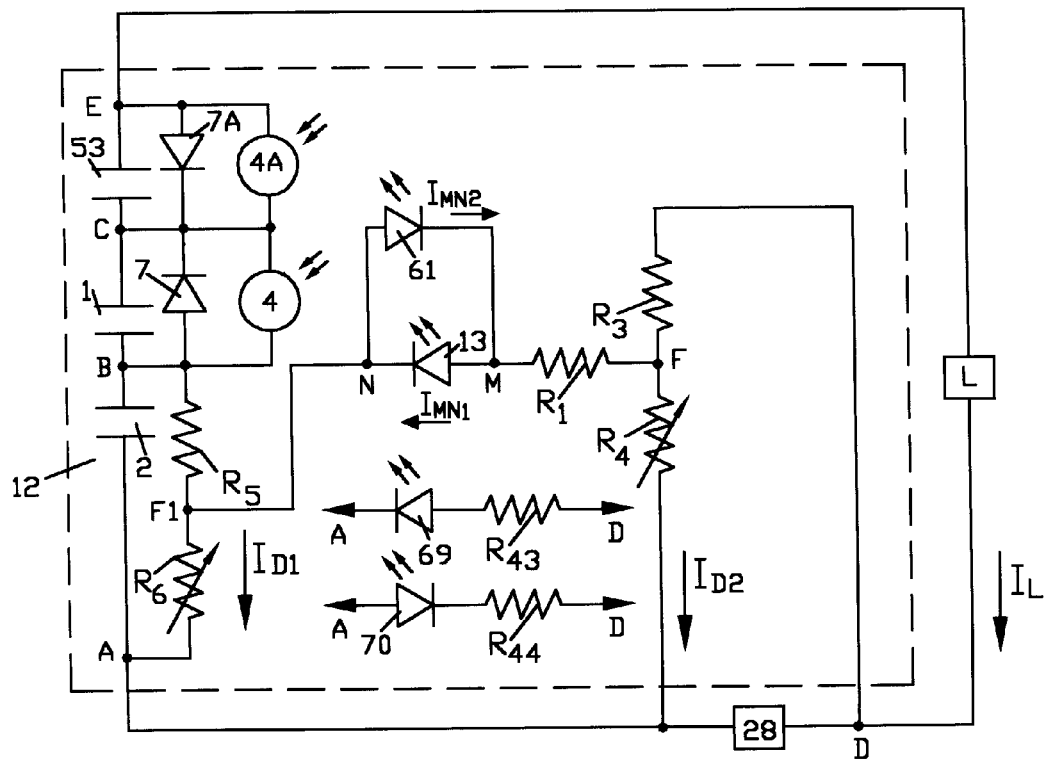

As a switching device 4 can be used: an electronic switching device (for example: a photo-thyristor 4, FIG. 7), a triode, a thyratron, a gas-discharge switching device or a mechanical switching device when electric charge time constant of the second capacitor 2 or the second group of capacitors 2 is relatively big. FIGS. 9–14, FIGS. 18–21, FIGS. 24–28, FIGS. 30–32, FIGS. 42–43, FIG. 47, FIGS. 62–63, FIG. 66, FIG. 88, FIG. 90 and FIGS. 93–97 illustrate realizations in which the switching device 4 is normally open. In FIG. 15 and FIG. 17 the switching device 4 is normally closed;

FIGS. 9–28, FIGS. 30–32, FIGS. 42–43, FIG. 47, FIGS. 62–63, FIG. 66, FIG. 88, FIG. 90 and FIGS. 93–97 illustrate the steps of: applying a control voltage $U_A$ to said second capacitor 2 through at least one branch (points of connections F, B), having a unidirectional conductive device 13, (FIGS. 9–17, FIG. 24, FIGS. 26–28 and FIGS. 62–63); or connecting capacitor plates of said second capacitor 2 through a voltage divider, including at least two resistances $R_5$ and $R_6$, and applying said control voltage $U_A$ to a divider arm with the resistance $R_6$ of said voltage divider through said branch (points of connections F, F1), having said unidirectional conductive device 13 (FIGS. 18–20, FIGS. 22–23, FIG. 88, FIGS. 93–94 and FIG. 96) or photodiode 13 (FIG. 21) or having unidirectional conductive devices 13 and 22 (FIG. 25, FIGS. 30–32, FIGS. 42–43, FIG. 47, FIG. 66, FIG. 90 and FIG. 95), or through branches having unidirectional conductive devices 13 and 61 (FIG. 96) or photodiodes 13 and 61 (FIG. 97);

FIGS. 12–19, FIGS. 21–28, FIGS. 30–32, FIGS. 42–43, FIG. 47, FIGS. 62–63, FIG. 66, FIG. 88, FIG. 90 and FIGS. 93–97 explain the steps of: connecting a voltage source or unlike poles of an operating electric circuit of charging said first 1 and second 2 capacitors (FIG. 12, FIG. 27 and FIG. 63) through an additional voltange divider, including at least two resistances $R_3$ and $R_4$, and using voltage drop on a divider arm $R_4$ of said voltage divider as said control voltage $U_A$. In FIG. 32 said additional voltage divider includes also a capacitor 25 and a diode 24. In FIG. 90, FIGS. 93–95 said additional voltage divider includes a capacitor 25, a diode 24 and a charging resistor $R_{37}$;

FIG. 47, FIGS. 62–63, FIG. 65a, FIG. 66, FIG. 88 and FIGS. 92–95 explain the steps of: connecting a voltage source or unlike poles of an operating electric circuit of charging said first 1 and second 2 capacitors through a supplementary voltage divider, including at least two resistances $R_{15}$ and $R_{16}$, and using at least one voltage drop on at least one of divider arms of said voltage divider as a supplementary voltage $U_{S1}$. In FIGS. 92–95 said supplementary voltage divider includes also a capacitor 59, a diode 60 and a charging resistor $R_{38}$;

FIG. 88, FIGS. 93–95 illustrate the steps of connecting capacitor plates of said second capacitor 2 through a new voltage divider, including resistances $R_{33}$ and $R_{34}$, and applying said supplementary voltage $U_{S1}$ to a divider arm of said new voltage divider through a supplementary branch (points of connections F2, F6), having a supplementary unidirectional conductive device 61 (FIGS. 93–94), or through a supplementary branch (points of connections F2, F6), having supplementary unidirectional conductive devices 61 and 66 (FIG. 95), or applying said supplementary voltage $U_{S1}$ to a divider arm of said new voltage divider through a new supplementary branch (points of connections F2, F6), having a new supplementary unidirectional conductive device 55 (FIG. 88);

FIGS. 9–28, FIGS. 30–32, FIGS. 41–43, FIGS. 47, FIGS. 62–63, FIG. 66, FIGS. 86–89, FIGS. 90–91 and FIGS. 93–97 include: a resistance $R_1$ (FIGS. 9–28, FIGS. 30–32, FIGS. 41–43, FIG. 47, FIGS. 62–63, FIG. 66, FIG. 88, FIG. 90 and FIGS. 93–97); a resistance $R_2$ (FIGS. 9–10, FIG. 12–13, FIGS. 15–16, FIG. 18, FIG. 22 and FIGS. 26–27); a resistance $R_7$ (FIG. 25, FIGS. 30–32, FIGS. 41–43, FIG. 47, FIG. 66, FIG. 90 and FIG. 95); resistances $R_8$, $R_9$ and $R_{10}$ (FIG. 31); a resistance $R_{35}$ (FIGS. 88–89); a resistance $R_{36}$ (FIG. 90 and FIG. 95); a resistance $R_{39}$ (FIGS. 93–95); resistances $R_{41}$, and $R_{42}$ (FIG. 95); resistances $R_{43}$ and $R_{44}$ (FIGS. 96–97); a protective resistor $R_p$ (FIGS. 20–21, FIGS. 23–28, FIGS. 30–32, FIGS. 42–43, FIG. 47, FIGS. 62–63, FIG. 66, FIG. 88, FIG. 90 and FIGS. 93–96); a protective resistor $R_{p1}$ (FIG. 88 and FIGS. 93–96); a voltage source of direct current 8; a load of direct current 9 or 9-1 (FIGS. 9–28, FIGS. 30–32, FIGS. 42–43, FIGS. 62–63, FIG. 66, FIG. 86, FIG. 88 and FIG. 91) with a switching device 10, or 10-1 (FIGS. 9–17, FIGS. 24–28, FIGS. 30–32, FIGS. 42–43 and FIG. 62) or with an arrester 17 (FIGS. 18–23); a charging resistor 11 (FIGS. 9–28, FIGS. 30–32, FIGS. 42–43, FIG. 47, FIGS. 62–63, FIG. 66 and FIG. 91); a source 14 of said control voltage $U_A$ (FIGS. 9–11 and FIG. 20); a light source 18 (FIGS. 19–20, FIG. 88, FIGS. 93–94 and FIG. 96) or a photodiode 13 (FIG. 21 and FIG. 97) optically connected to a photoelectric switch 4; a control unit 15 of the switching device 4 (FIG. 9, FIG. 12, FIG. 15 and FIG. 18); a control unit 19 (FIG. 22) of the adjustable resistance 5 (FIG. 5 and FIG. 22) or the adjustable reactance device 6 (FIG. 6-1, FIG. 6-2 and FIG. 22); a light source 18 optically connected to the photoconducting cell 3 (FIG. 3 and FIG. 23) which changes its impedance; a logic unit (inverter) 16 (FIG. 16). As a switching device 4 can be used: a transistor switch (FIG. 10, FIG. 13, FIG. 16 and FIG. 27); an electronic switching device; a photoelectric switching device (FIGS. 19–21, FIG. 88, FIGS. 93–94 and FIGS. 96–97); a magnetoelectric switching device (FIG. 9, FIG. 11, FIG. 12, and FIGS. 14–18). In said figures the step of connecting electrically the capacitor plates of the first capacitor 1 is realized through a diode 7 which is installed against current of charging of the first capacitor 1;

FIG. 24 and FIGS. 62–63 include a two-way switch 20 which ensures the step of reversing connections of the voltage source 8 or unlike poles of an operating electric circuit (FIG. 63) through the additional voltage divider;

FIGS. 25–28, FIG. 90 and FIG. 95 explain the steps of installing an input circuit of an amplifying device 21 in said branch (points of connections F, F1) and controlling a control gear of said switching device 4 through the amplifying device 21. In FIG. 90 and FIG. 95 said amplifying device 21 has a device of voltage 58. FIGS. 30–32, FIGS. 42–43, FIG. 47, FIG. 66, FIG. 90 and FIG. 95 illustrate realizations in which a transistor 21 (for example, a darlington transistor) is used as an amplifying device 21;

FIG. 31 illustrates a realization of the adjustable capacitor 12 comprising the step of controlling a control gear of said switching device 4 through an output of the amplifying device 21 and a transistor 23;

FIG. 32 illustrates a technical solution in which said step of charging the adjustable capacitor 12 is realized through a light source 27 and a bridge rectifier 26;

FIGS. 33–43 illustrate different realizations of the first control system with points of connections F and F1 to divider arms of said additional voltage divider and said voltage divider or with points of connections F and B to a divider arm of said additional voltage divider and said second capacitor.

Figure 35:
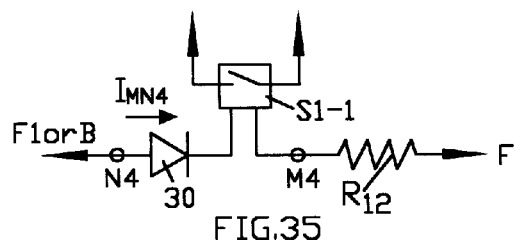
Figure 36:
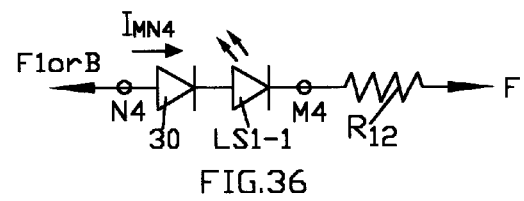
Figure 37:
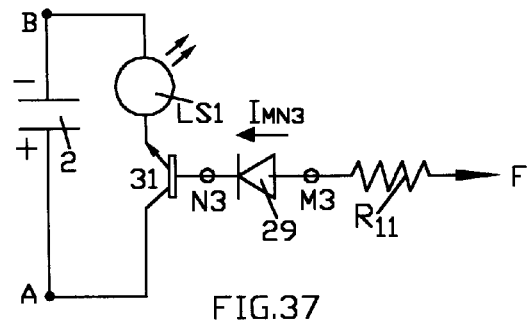
Figure 38:
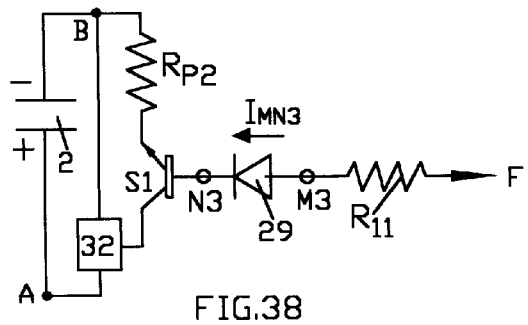
FIGS. 38–43 illustrate realizations which ensure new functional potentialities of the adjustable capacitor by said first control system.
Figure 39:
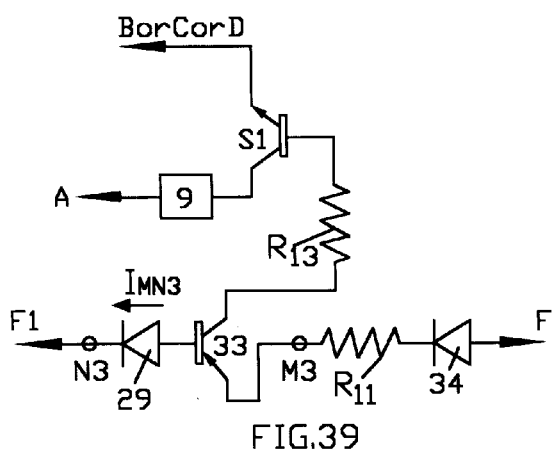
Figure 40:
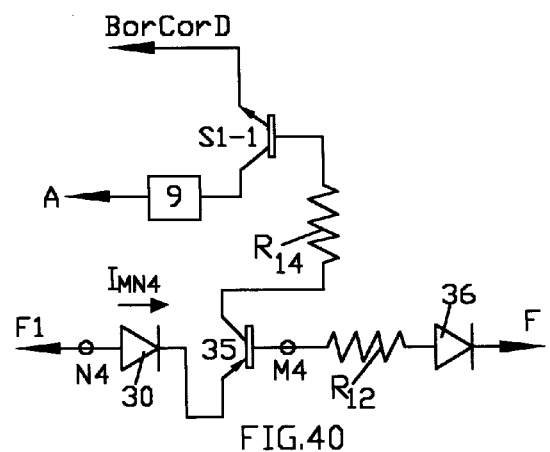
Figure 41:
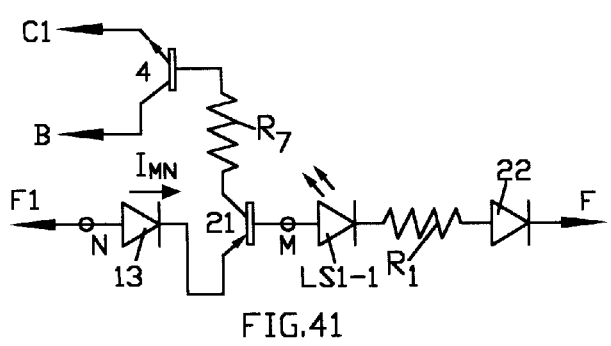

FIGS. 33–34, FIG. 37 and FIG. 42 illustrate a new branch (having a new unidirectional conductive device 29 and a resistance $R_{11}$), a switching device S1 (FIG. 33 and FIG. 42) or a light source LS1 (FIG. 34 and FIG. 37) which is controlled by current $I_{MN3}$. FIG. 37 illustrates a light source LS1 which is controlled by current of said new branch through a transistor 31. FIGS. 35–36 and FIG. 43 illustrate a second new branch (having a second new unidirectional conductive device 30 and a resistance $R_{12}$), a switching device S1-1 (FIG. 35 and FIG. 43) or a light source LS1-1 (FIG. 36) which is controlled by current $I_{MN4}$. FIGS. 39–40 include additional parts: a resistance $R_{13}$, a transistor 33 and a third new unidirectional conductive device 34 (FIG. 39); a resistance $R_{14}$, a transistor 35 and a fourth new unidirectional conductive device 36 (FIG. 40). FIG. 38 illustrates the step of controlling a time of beginning discharging said second capacitor 2 or said second group of capacitors 2 by the switching devices S1 which functions as normally open switching device. This figure includes also a protective resistor $R_{P2}$ and a controlled switching device 32. FIGS. 39–40 and FIGS. 42–43 illustrate the step of controlling a turn-on time and/or a turn-off time of said second capacitor 2 with at least one load 9 by at least one of said switching devices S1, S1-1. FIGS. 39–40 illustrate also the step of controlling a turn-on time and/or a turn-off time of at least one load 9 by at least one of said switching devices S1, S1-1 (points D and A are connected through said load 9 and at least one of said switching devices S1, S1-1). FIG. 41 illustrates the step of combining said branch with said second new branch;

FIG. 47 illustrates the steps of: connecting capacitor plates of said first 1 and second 2 capacitors through a second voltage divider, including resistances $R_{17}$ and $R_{18}$; applying said supplementary voltage $U_{S1}$, to a divider arm of said second voltage divider through an additional branch (points of connections F2, F3) having an additional unidirectional conductive device 37.

Figure 48:
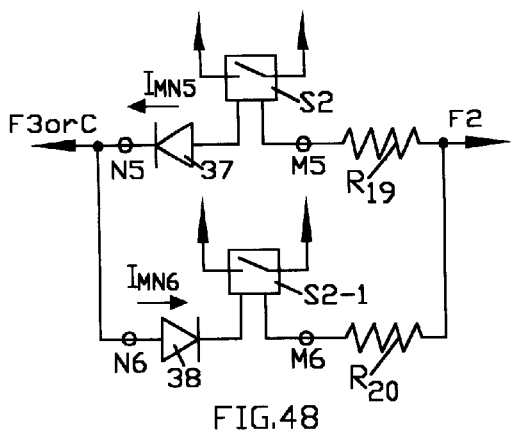
Figure 50:
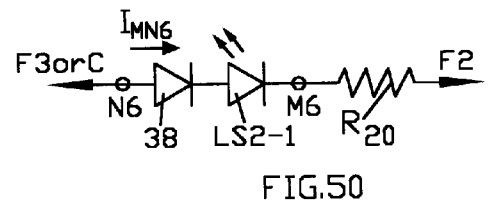
Figure 51:
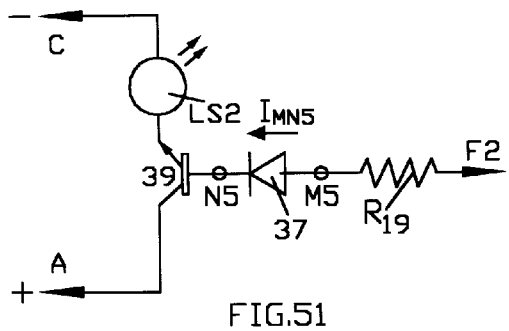
Figure 52:
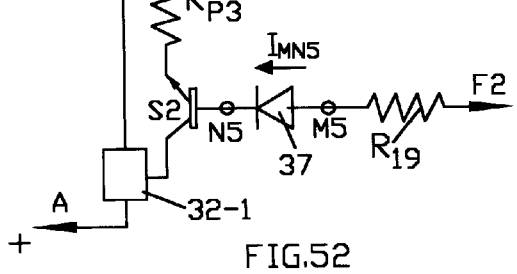
Figure 61:
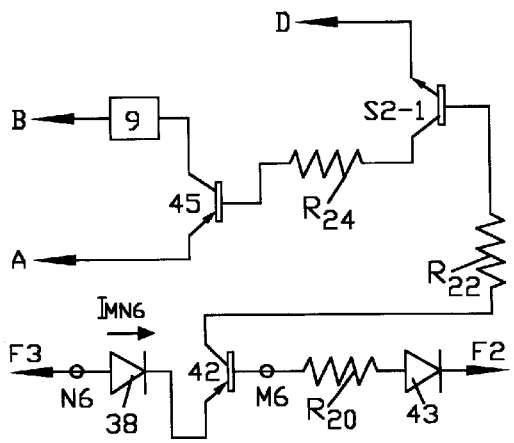

FIG. 62 and FIG. 63 illustrate the step of applying said supplementary voltage $U_{S1}$, to said first and second capacitors through a second additional branch (points of connections F2, C) having a second additional unidirectional conductive device 38;

FIGS. 47–63 illustrate different realizations of the second control system with points of connections F2 and F3 to divider arms of said supplementary voltage divider and said second voltage divider or with points of connections F2 and C to a divider arm of said supplementary voltage divider and to the first capacitor 1. FIGS. 47–49 and FIG. 51 illustrate an additional branch (having said additional unidirectional conductive device 37 and a resistance $R_{19}$), a switching device S2 (FIGS. 47–48) or a light source LS2 (FIG. 49 and FIG. 51) which is controlled by current $I_{MN5}$. FIG. 51 illustrates a light source LS2 which is controlled by current of said additional branch through a transistor 39. FIG. 48 and FIG. 50 illustrate a second additional branch (having a second additional unidirectional conductive device 38 and a resistance $R_{20}$), a switching device S2-1 (FIG. 48) or a light source LS2-1 (FIG. 50) which is controlled by current $I_{MN6}$. FIGS. 53–54, FIGS. 56–57 and FIGS. 60–61 include additional parts: a resistance $R_{21}$, a transistor 40 and a third additional unidirectional conductive device 41 (FIG. 53, FIG. 56 and FIG. 60); a resistance $R_{22}$, a transistor 42 and a fourth additional unidirectional conductive device 43 (FIG. 54, FIG. 57 and FIG. 61); a resistance $R_{23}$, a transistor 44 (FIG. 60); a resistance $R_{24}$ and a transistor 45 (FIG. 61). FIG. 52 and FIG. 62 illustrate the step of controlling a time of beginning discharging said first 1 and second 2 capacitors by the switching devices S2 (FIG. 52) and S2-1 (FIG. 62) which function as normally open switching devices. These figures include also a protective resistor $R_{P3}$ and a controlled switching device 32-1.

Figure 53:
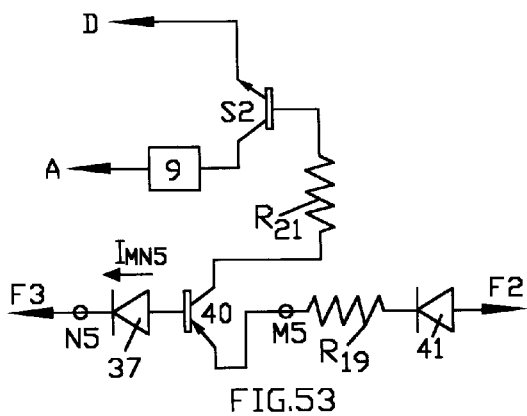
Figure 54:
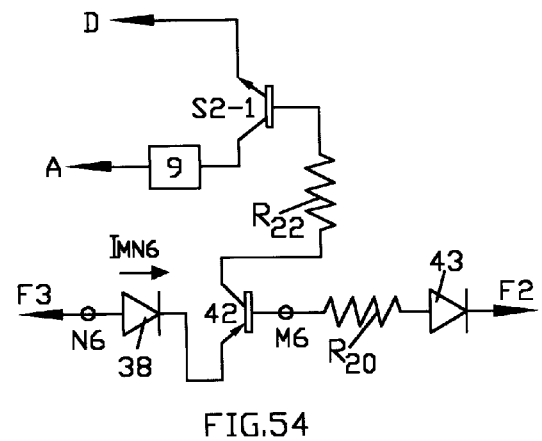

FIGS. 53–54 illustrate the step of controlling a turn-on time and/or a turn-off time of at least one load 9 by at least one of said switching devices S2, S2-1.

Figure 55:
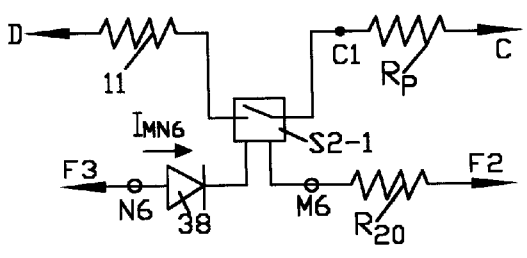

FIG. 55 illustrates the step of applying a voltage of the voltage source 8 or a voltage on unlike poles of said operating electric circuit to said first 1 and second 2 capacitors or to said first and second groups of capacitors through said switching device S2-1 which functions as normally closed switching device.

Figure 56:
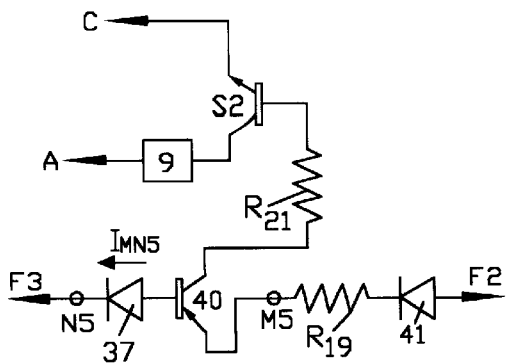
Figure 57:
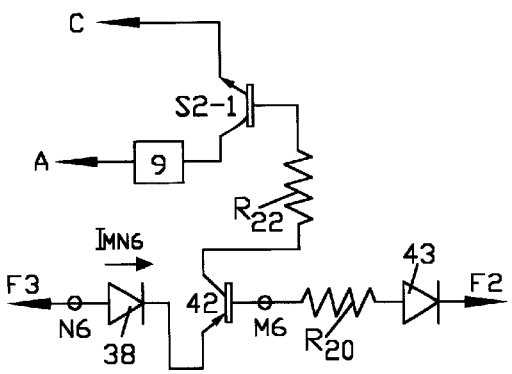
Figure 58:
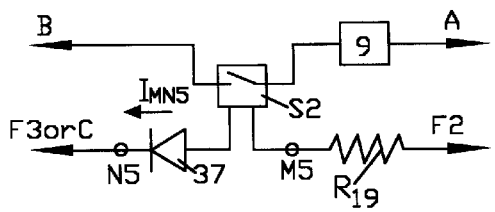

FIGS. 56–57 and FIG. 63 illustrate the step of controlling a turn-on time and/or a turn-off time of said first 1 and second 2 capacitors or said first and second groups of capacitors with at least one load by at least one of said switching devices S2, S2-1.

FIGS. 58–61 illustrate the step of controlling a turn-on time and/or a turn-off time of said second capacitor 2 with at least one load 9 by at least one of said switching devices S2, S2-1;

FIG. 66 illustrates the steps of:

connecting said voltage source of charging the adjustable capacitor through a second supplementary voltage divider, including resistances $R_{25}$ and $R_{26}$, and using at least one voltage drop on at least one of divider arms of said second supplementary voltage divider as a second supplementary voltage $U_{S2}$;

connecting capacitor plates of said first 1 and second 2 capacitors through a third voltage divider, including resistances $R_{27}$ and $R_{28}$, and applying a second supplementary voltage $U_{S2}$ to a divider arm of said third voltage divider through a new additional branch (points of connections F4, F5) having a new additional unidirectional conductive device 46;

FIGS. 66–74 illustrate different realizations of the third control system with points of connections F4 and F5 to divider arms of said second supplementary voltage divider and said third voltage divider or with points of connections F4 and C to a divider arm of said second supplementary voltage divider and to said first capacitor 1.

Figure 70:
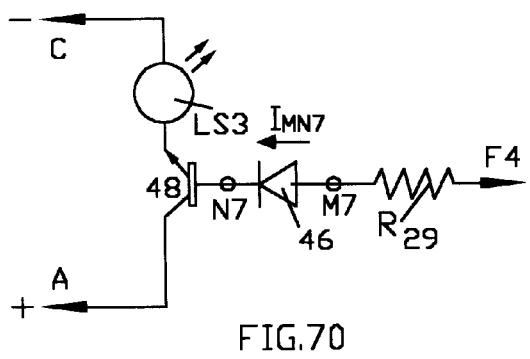

FIGS. 66–68 and FIG. 70 illustrate a new additional branch (having said new additional unidirectional conductive device 46 and a resistance $R_{29}$), a switching device S3 (FIGS. 66–67) or a light source LS3 (FIG. 68 and FIG. 70) which is controlled by current $I_{MN7}$. FIG. 70 illustrates a light source LS3 which is controlled by current of said new additional branch through a transistor 48.

Figure 67:
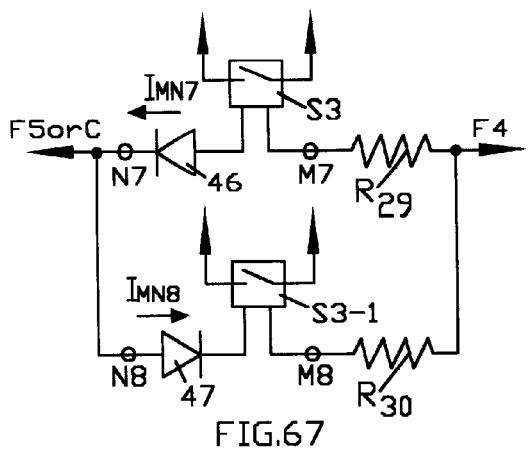
Figure 69:
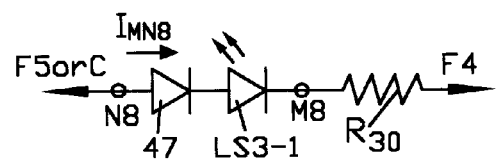

FIG. 67 and FIG. 69 illustrate a second new additional branch (having a second new additional unidirectional conductive device 47 and a resistance $R_{30}$), a switching device S3-1 (FIG. 67) or a light source LS3-1 (FIG. 69) which is controlled by current $I_{MN8}$.

Figure 72:
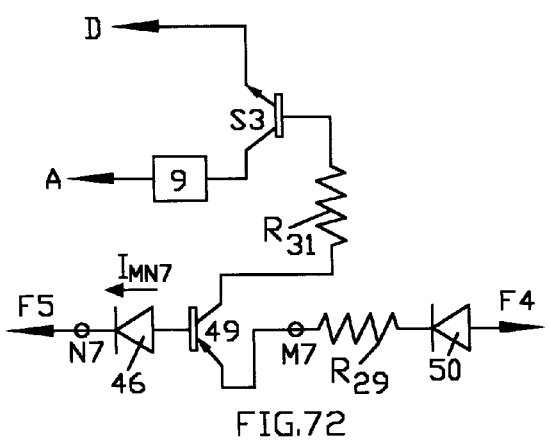
Figure 74:
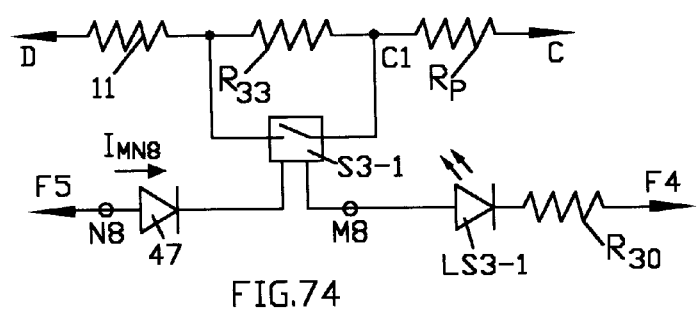
Figure 73:
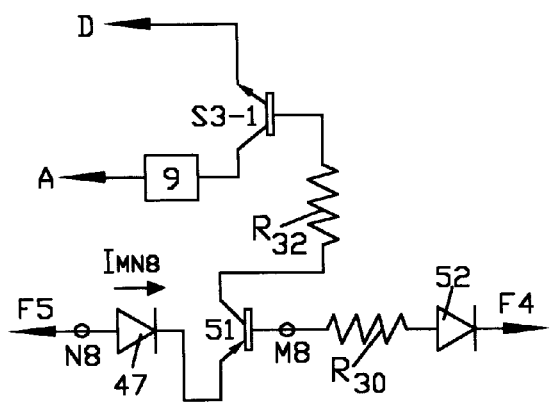
Figure 75:
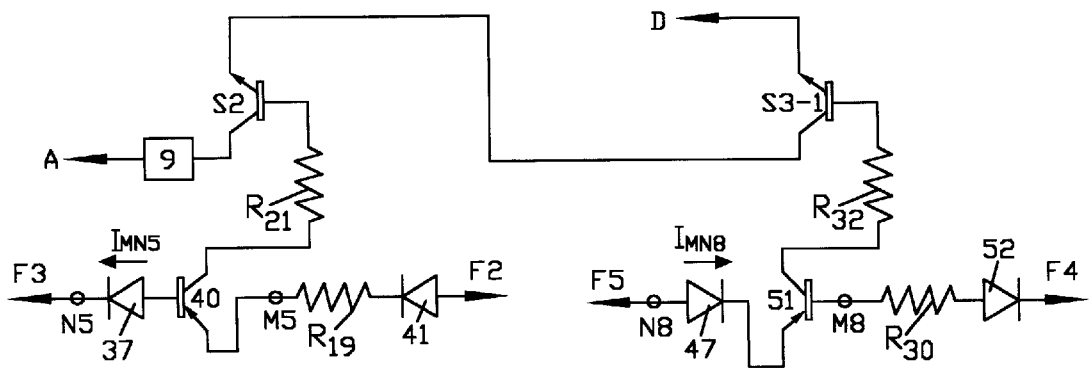
Figure 77:
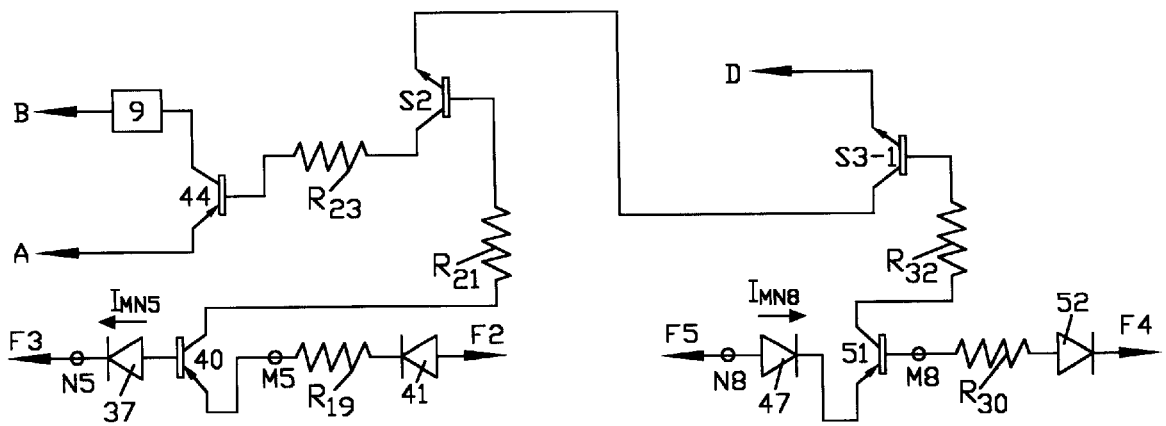

FIGS. 72–75 and FIG. 77 include additional parts: a resistance $R_{31}$, a transistor 49 and a third new additional unidirectional conductive device 50 (FIG. 72); a resistance $R_{32}$, a transistor 51 and a fourth new additional unidirectional conductive device 52 (FIG. 73, FIG. 75 and FIG. 77).

Figure 71:
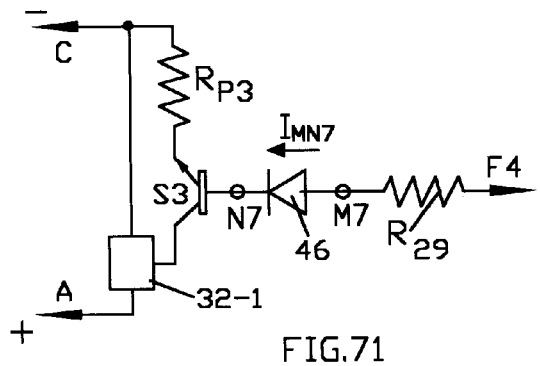

FIG. 71 illustrates the step of controlling a time of beginning discharging said first 1 and second 2 capacitors or said first and second groups of capacitors by one of said switching devices S3, S3-1 which functions as normally open switching device. This figure includes also a protective resistor $R_{P3}$ and a controlled switching device 32-1. As a switching devices 32 (FIG. 38) and 32-1 (FIG. 52 and FIG. 71) can be used, for example, a thyristor or an arrester with a control electrode or two arresters connected in series or a controlled valve etc.

FIGS. 72–73 illustrate realizations in which a turn-on time and/or a turn-off time of at least one load 9 can be controlled by at least one of said switching devices S3, S3-1.

FIG. 74 illustrates the steps of connecting a current limiting device $R_{33}$ with at least one of said switching devices S2, S2-1, S3 and S3-1 in parallel and installing them in an electric circuit of charging the adjustable capacitor.

Figure 76:
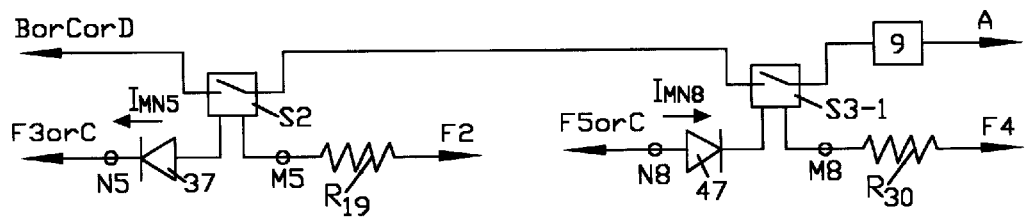

FIGS. 75–76 illustrate the step of controlling a turn-on time and a turn-off time of at least one load 9 by one of said switching devices S2, S2-1 and one of said switching devices S3, S3-1 which function as normally open and as normally closed switching devices.

FIG. 76 illustrates the step of controlling a turn-on time and a turn-off time of said first 1 and second 2 capacitors or said first and second groups of capacitors with at least one load by one of said switching devices S2, S2-1 and one of said switching devices S3, S3-1 which function as normally open and as normally closed switching devices.

FIGS. 76–77 illustrate the step of controlling a turn-on time and a turn-off time of said second capacitor 2 or said second group of capacitors with at least one load by one of said switching devices S2, S2-1 and one of said switching devices S3, S3-1 which function as normally open and as normally closed switching devices;

FIGS. 80–85 illustrate the additional steps (necessary for obtaining the adjustable capacitor of direct and alternating currents on the base of said first 1, second 2 and a third 53 capacitors):

connecting at least one third capacitor 53 (FIG. 80) or third group of capacitors 53 (FIG. 81) with said first capacitor 1 or first group of capacitors 1 or with said second capacitor 2 or second group of capacitors 2 in series;

connecting capacitor plates of said third capacitor 53 or said output terminals of said third group of capacitors 53 through at least one additional cell 3A (FIG. 82), which changes its impedance, and/or at least one additional switching device 4A (FIG. 83) and/or at least one additional adjustable resistance 5A (FIG. 84) and/or at least one additional adjustable reactance 6A (FIG. 85) device(s);

FIG. 90 illustrates the adjustable capacitor 12 of alternating current on the base of said first 1 and second 2 capacitors. This realization includes a unidirectional conductive device 57 which is installed against current of charging of said second capacitor 2;

FIG. 91 includes the adjustable capacitor 12 of alternating current, illustrated in FIG. 90, with the second control system whose supplementary voltage divider is shown in FIG. 92;

FIGS. 86–88 and FIGS. 93–97 include the adjustable capacitor 12 of direct current (FIG. 86 and FIG. 88) and the adjustable capacitor 12 of alternating current (FIG. 87 and FIGS. 93–97) on the base of said first 1, second 2 and third 53 capacitors.

FIG. 88 illustrates a new supplementary branch (with points of connections F2, F6) having at least one new supplementary unidirectional conductive device 55.

Figure 93:
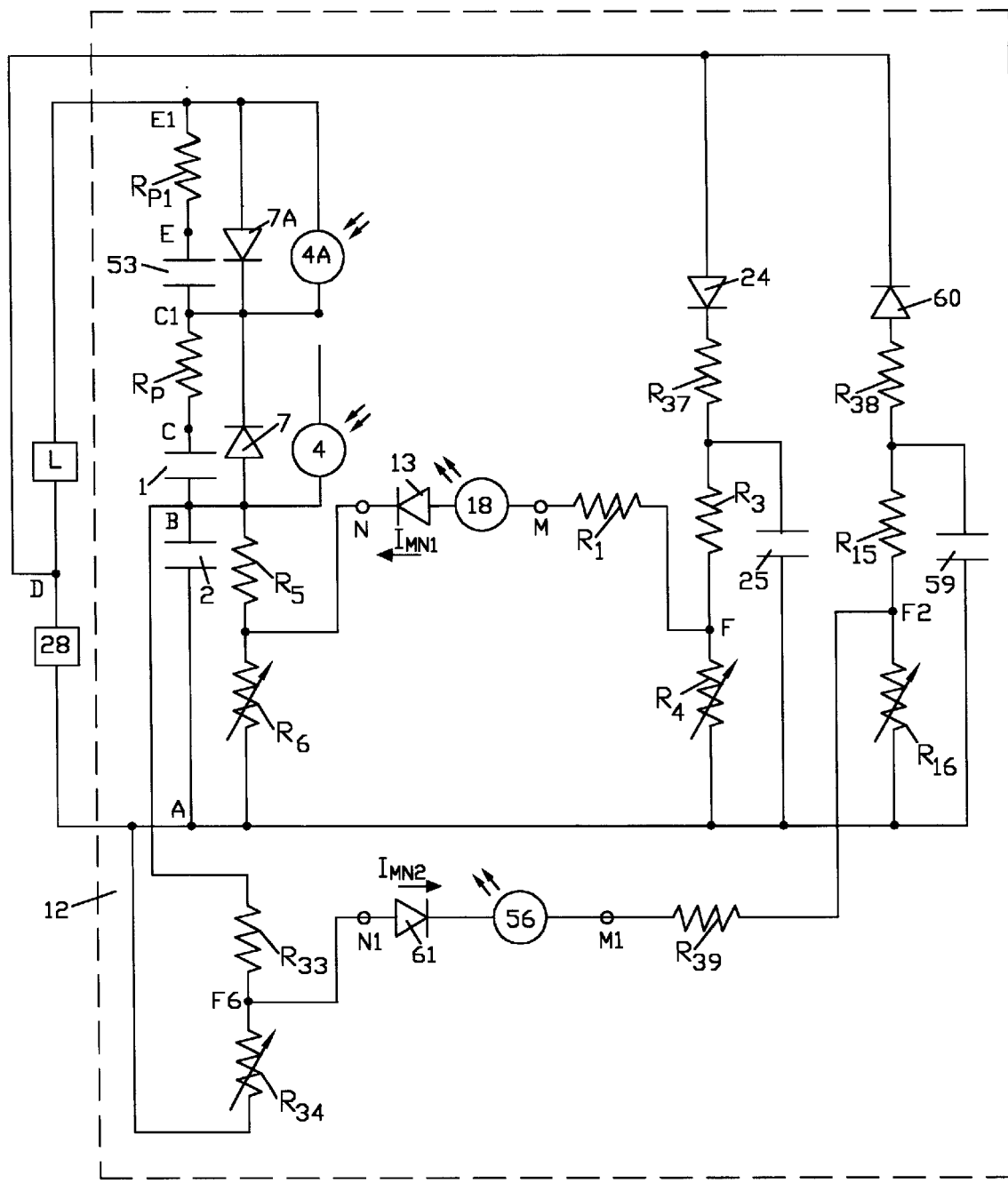
Figure 94:
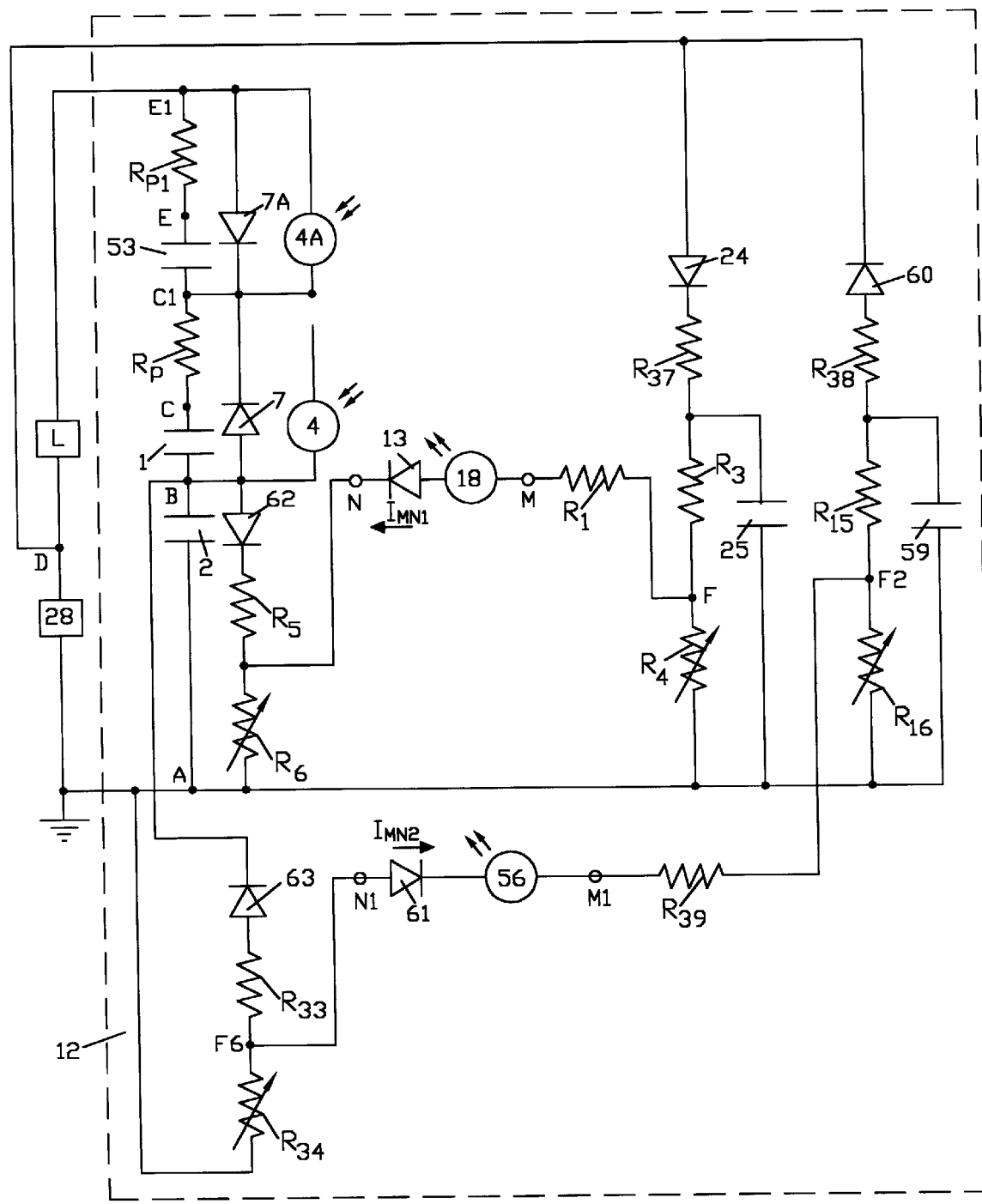

FIGS. 93–95 illustrate a supplementary branch (with points of connections F2, F6) having at least one supplementary unidirectional conductive device 61.

FIG. 95 illustrates the steps of:

installing an input circuit of an additional amplifying device 64 in said supplementary branch;

controlling a control gear of said additional switching device 4A through an output of said amplifying device 64. A transistor, for example, a darlington transistor can be used as an additional amplifying device 64. In FIG. 95 said amplifying device 64 has a device of voltage 65.

FIGS. 86–89, FIGS. 93–97 and FIG. 99 include the additional parts: a charging resistor 54 (FIG. 86, FIG. 88 and FIG. 99); a light source 56 (FIGS. 88–89, FIGS. 93–94, FIG. 96) or a photodiode 61 (FIG. 97) which is optically connected to a photoelectric switch 4A; a diode 62, which is installed against current of charging of said third capacitor and a diode 63, which is installed against current of charging of said first capacitor 1 (FIGS. 94–95); protective diodes D1, D2, D3 and D4 (FIG. 95);

light sources 67 and 68 (FIG. 96), or photodiodes 69, 70 (FIG. 97), which are optically connected respectively to an additional photoelectric switching device 4A and a photoelectric switching device 4; diodes 69 and 70 (FIG. 96);

FIG. 99 illustrates the step of connecting capacitor plates of said second capacitor 2 or said output terminals of said second group of capacitors through a load L1. FIG. 99 includes the adjustable capacitor of alternating current 12, whose different realizations are shown in FIGS. 93–97;

A diode or a valve or a gate or a photodiode can be used as at least one of mentioned parts 13, 22, 29, 30, 37, 38, 46, 47, 55, 61 and 66.

A photoelectric switching device or a photorelay can be also used as at least one of said switching devices S1, S1-1, S2, S2-1, S3 and S3-1, illustrated in FIG. 33, FIG. 35, FIGS. 42–43, FIGS. 47–48, FIG. 55, FIGS. 58–59, FIGS. 66–67, FIG. 74 and FIG. 76.

DETAILED DESCRIPTION OF THE INVENTION

The method of changing a capacity $C_A$ of the adjustable capacitor is demonstrated below.

When the switching device 4 or the photoconducting cell 3 is off, all the time within charging of the second capacitor 2 or the second group of capacitors 2 (FIGS. 1–4), the capacity of the adjustable capacitor $C_A$ is given by following expression:

$$C_A=(C_1 \times C_2)/(C_1+C_2) \qquad (1)$$

where $C_1$ and $C_2$ are capacities of the first 1 and the second 2 capacitors.

When the switching device 4 or the photoconducting cell 3 is on, all the time within charging of the second capacitor 2 or the second group of capacitors 2, the capacity of the adjustable capacitor $C_A$ is given by expression:

$$C_A=C_2 \qquad (2)$$

Therefore, by the step of converting said cell 3 or said switching device 4 into a non-conducting state or into a state with higher impedance, within charging of said second capacitor 2 or said second group of capacitors 2, one can change the capacity of the adjustable capacitor $C_A$ within limits:

$$(C_1 \times C_2)/(C_1+C_2) \leq C_A \leq C_2 \qquad (3)$$

$t_0$ (FIG. 29) is a moment of switching on the voltage source 8 (FIGS. 9–21, FIGS. 24–26, FIG. 28, FIGS. 30–32, FIG. 42, FIG. 47, FIG. 62 and FIG. 66). In the moment $t_0$ or before the moment $t_0$, the step of connecting capacitor plates of the first capacitor 1 is realized by switching on the switching device 4. In a moment $t_1$ (FIG. 29), the step of converting the switching device 4 into a non-conducting state is realized by switching off the switching device 4.

A period of time $\Delta t$, when the switching device 4 is in a non-conducting state, within charging of the second capacitor 2, is given by the following condition:

$$0 \leq \Delta t \leq 5\tau \qquad (4)$$

The charging of the first capacitor 1 begins at this moment $t_1$. In a moment $t_F$, the process of charging the capacitors 1 and 2 is finished.

$t_F - t_0 < 5 R_{11} \times C_2$ where: $R_{11} \times C_2 = \tau$ is electric charge time constant of the second capacitor 2; $R_{11}$ is the value of the resistance 11. At this moment $t_F$ or later in a moment $t_2$, the step of discharging the adjustable capacitor is started by switching on the switching device 10 (FIGS. 9–17, FIGS. 24–28, FIGS. 30–32, FIGS. 42–43). In a moment $t_3$ (FIG. 29), the process of discharging the first capacitor 1 is finished and the step of connecting electrically capacitor plates of the first capacitor 1 is realized by diode 7.

During a period of time $\Delta t_2 = t_4 - t_3$, the step of discharging the second capacitor 2 is realized through the diode 7. In a moment $t_4$, the process of discharging the second capacitor 2 is finished. In this moment $t_4$, described above process of charging the adjustable capacitor can be repeated by switching off the switching device 10.

The adjustable capacitor 12 shown in FIGS. 9–14 and FIGS. 18–19 can function without the diode 7 because during the period of time $\Delta t_2 = t_4 - t_3$ (FIG. 29) the switching device 4 is on. The diode 7 ensures the highest reliability.

After finishing process of charging the adjustable capacitor, the energy of the adjustable capacitor $W_A$ and voltages of capacitors are given by following expressions:

$$W_A = C_1 \times U_1^2/2 + C_2 \times U_2^2/2 \qquad (5)$$

$$U_S = U_1 + U_2 \qquad (6)$$

$$W_A = C_A \times (U_1 + U_2)^2/2 \qquad (7)$$

$$U_1 = 1/C_1 \times \int i \times dt \qquad (8)$$

Where: $U_1$ and $U_2$ are voltages of the first 1 and the second 2 capacitors; $U_S$ is the voltage of the voltage source 8; $C_A$ is the capacity of the adjustable capacitor; i-instantaneous current; $\Delta t$ is the duration of a period of time when the switching device 4 is in a non-conducting state.

In case of $C_1 < C_2$, it follows from above expressions (3), (5), (6), (7), (8) that:

the more $C_2/C_1$ the more range of changing $C_A$;

in case of $\Delta t = 5\tau$, $C_A$ is of the order of $C_1$;

the more $\Delta t$ the less $C_A$.

Consequently, in case of $C_2/C_1 = 10$ one can change $C_A$ approximately 11 times, in case of $C_2/C_1 = 1000$ one can change $C_A$ approximately 1000 times etc. Mentioned results are the same for the first 1 and the second 2 groups of capacitors connected in series (FIG. 2 with FIG. 4). Therefore, the method offered provides revolutionary broad ranges of changing a capacity of the adjustable capacitor.

In case of $C_1 = C_2$ the capacity of the adjustable capacitor $C_A$ can be changed within limits:

$$C_2/2 \leq C_A \leq C_2 \qquad (9)$$

Figure 11:
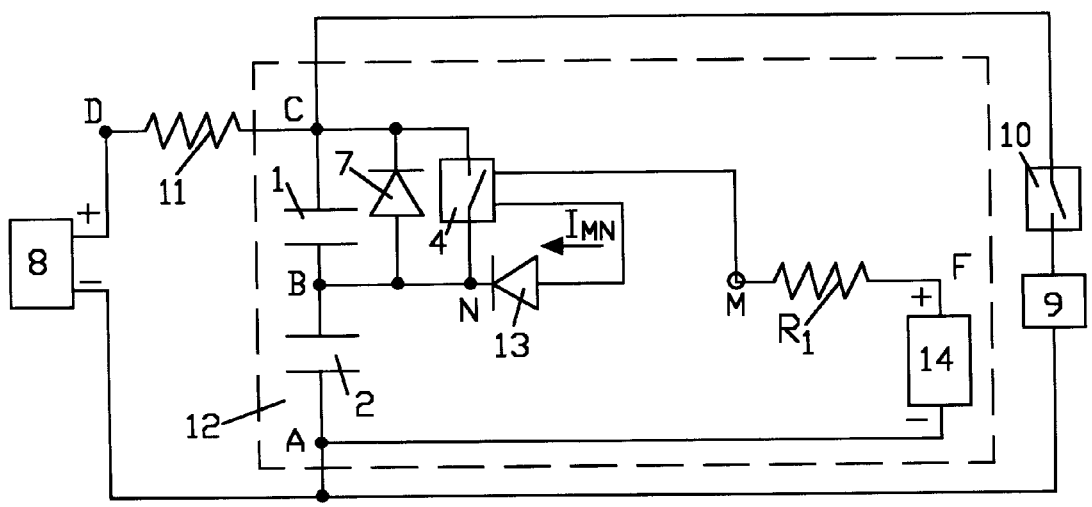
Figure 12:
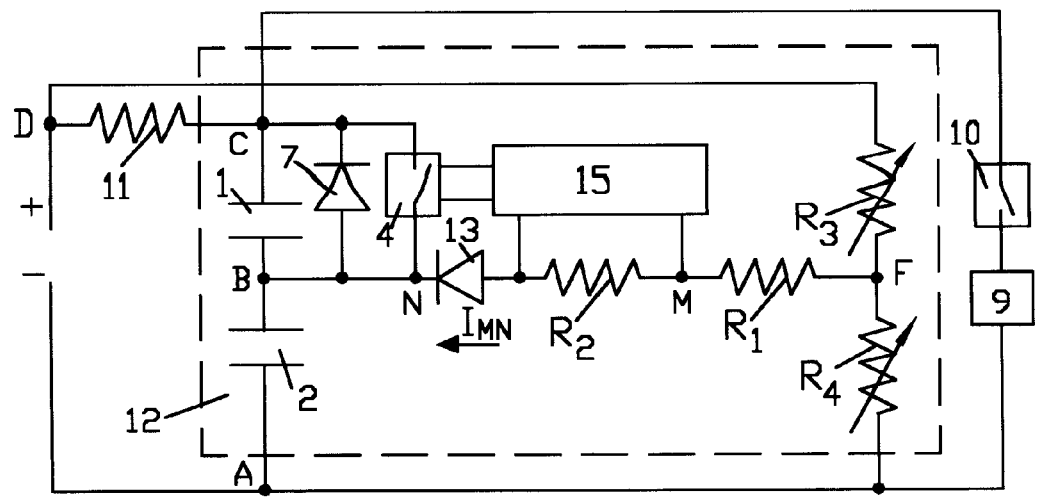
Figure 13:
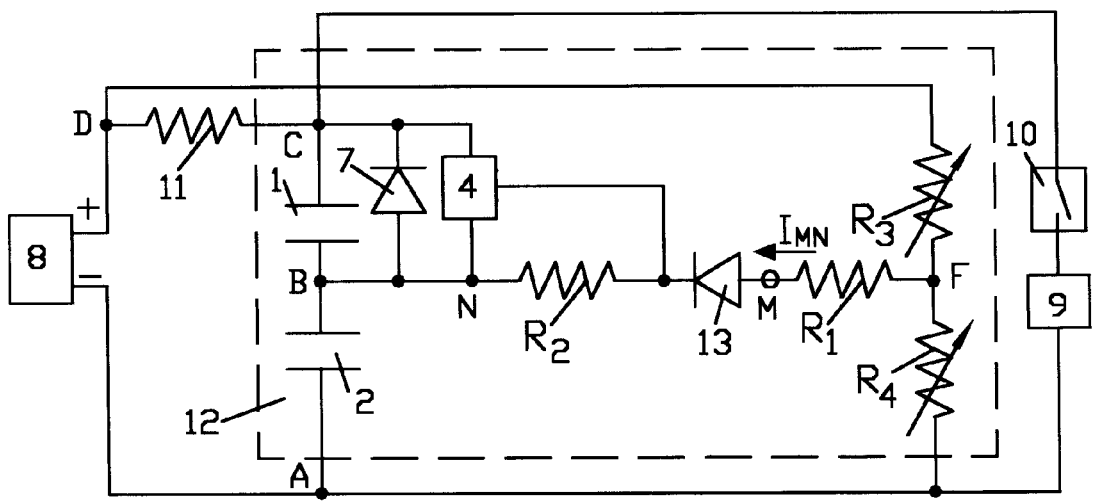
Figure 29:
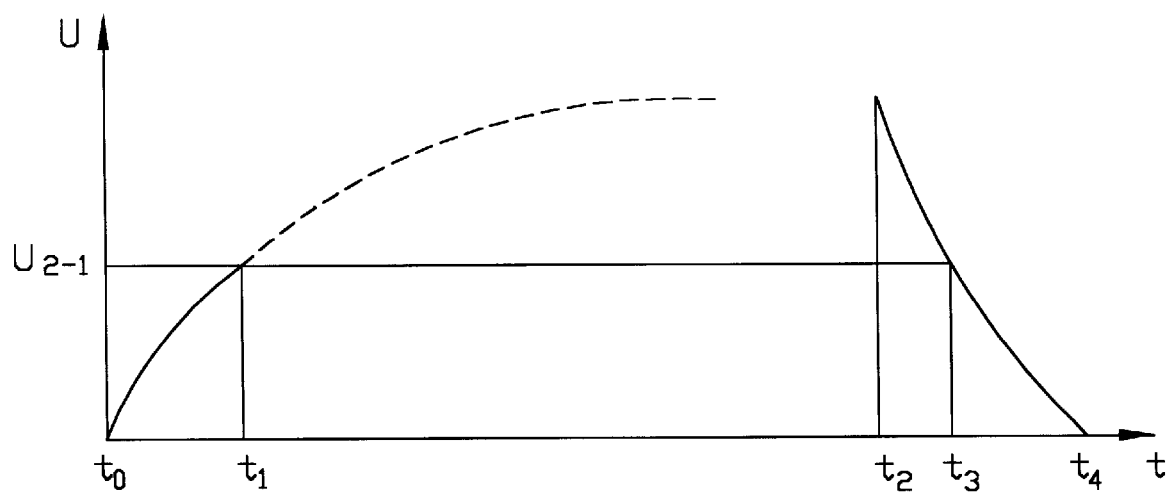
FIG. 29 explains the process of charging the second capacitor or the second group of capacitors and the process of discharging the adjustable capacitor 12.

FIG. 11 includes the first capacitor 1 whose capacity is chosen no more than the capacity of the second capacitor 2. The realization of this technical solution comprises the steps of:

connecting said first 1 and second 2 capacitors in series;

applying a control voltage $U_A$ (the voltage of the voltage source 14) to said second capacitor 2 through the branch (with a current $I_{MN}$) having a unidirectional conductive device 13;

connecting capacitor plates of said first capacitor 1 through a switching device 4;

using the current $I_{MN}$ of said branch for controlling said step of connecting capacitor plates of said first capacitor 1 through said switching device 4 (during a period of time $t_1 - t_0$: FIG. 29) and for controlling the step of converting said switching device 4 into a non-conducting state (during a period of time $t_3$–$t_1$: FIG. 29);

connecting electrically the capacitor plates of said first capacitor 1 (during a period of time $t_4$–$t_3$: FIG. 29) through the diode 7. One can change a capacity of the adjustable capacitor 12 by changing a value of said control voltage $U_A$.

Figure 14:
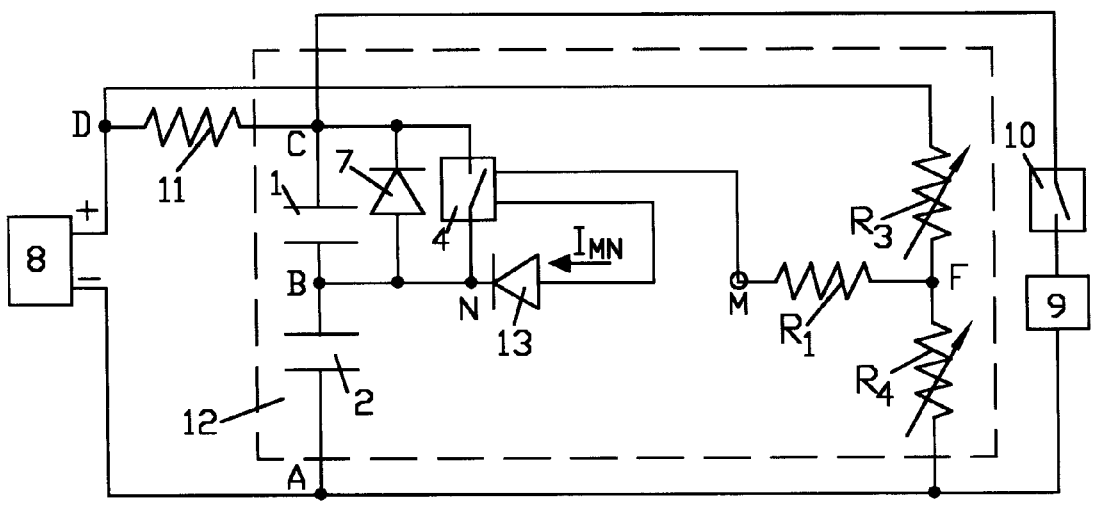

FIG. 14 includes the first capacitor 1 whose capacity is chosen no more than the capacity of the second capacitor 2. The realization of this technical solution comprises the steps of:

connecting said first 1 and second 2 capacitors in series;

connecting a voltage source or unlike poles of an operating electric circuit of charging said first 1 and second 2 capacitors through an additional voltage divider (with resistances $R_3$ and $R_4$) and using the voltage drop on the divider arm $R_4$ of said additional voltage divider as a control voltage $U_A$;

applying said control voltage $U_A$ ($U_A=U_{R4}$) to said second capacitor 2 through the branch (with a current $I_{MN}$) having a unidirectional conductive device 13;

connecting capacitor plates of said first capacitor 1 through a switching device 4;

using the current $I_{MN}$ of said: branch for controlling said step of connecting capacitor plates of said first capacitor 1 through said switching device 4 (during a period of time $t_1$–$t_0$: FIG. 29) and for controlling the step of converting said switching device 4 into a non-conducting state (during a period of time $t_3$–$t_1$: FIG. 29);

connecting electrically the capacitor plates of said first capacitor 1 (during a period of time $t_4$–$t_3$: FIG. 29) through the diode 7. One can change a capacity of the adjustable capacitor 12 by changing a value of at least one of said resistances $R_3$ and $R_4$.

Figure 18:
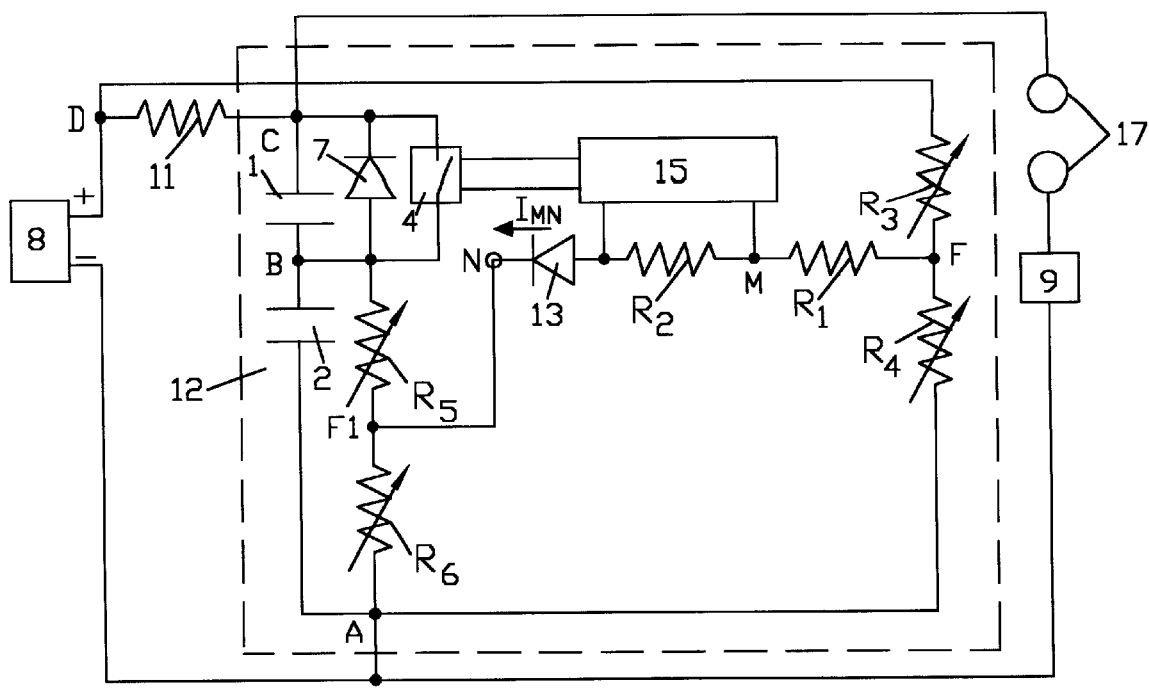
Figure 19:
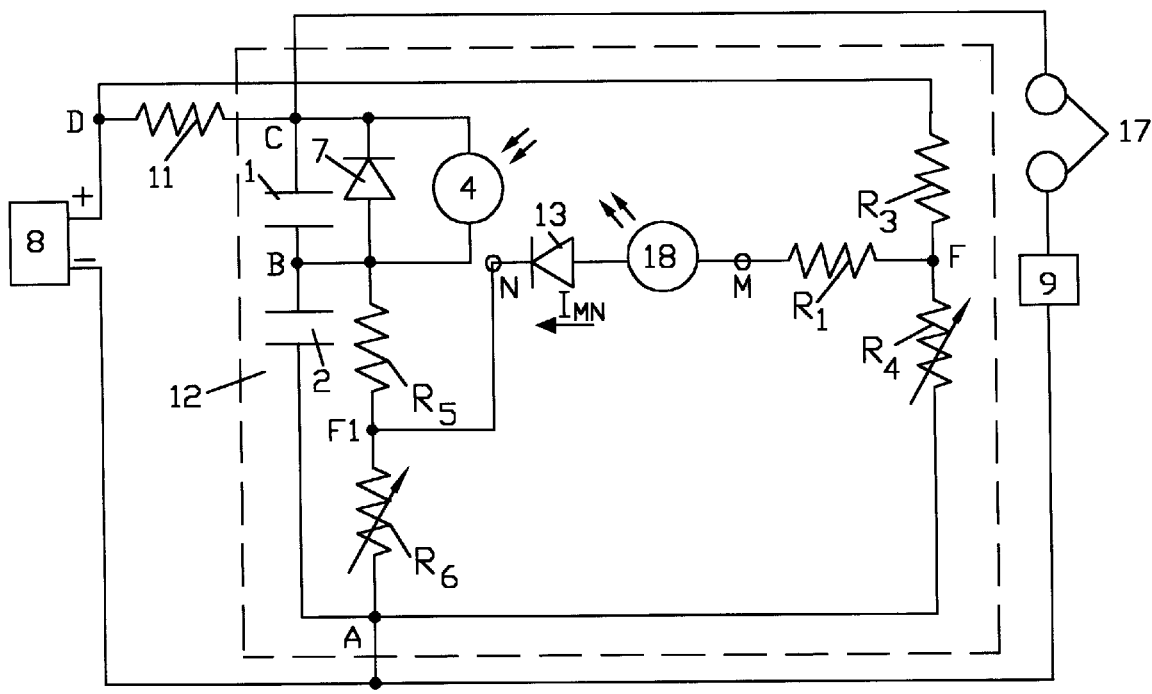

FIG. 18 includes the first capacitor 1 whose capacity is chosen no more than the capacity of the second capacitor 2. The realization of this technical solution comprises the steps of:

connecting said first 1 and second 2 capacitors in series;

connecting capacitor plates of said second capacitor 2 through a voltage divider (with resistances $R_5$ and $R_6$);

connecting a voltage source or unlike poles of an operating electric circuit of charging said first 1 and second 2 capacitors through an additional voltage divider (with resistances $R_3$ and $R_4$) and using the voltage drop on the divider arm $R_4$ of said additional voltage divider as a control voltage $U_A$;

applying said control voltage $U_A$ to the divider arm $R_6$ of said voltage divider through the branch (with a current $I_{MN}$) having a unidirectional conductive device 13;

connecting capacitor plates of said first capacitor 1 through a switching device 4;

using a voltage drop (on resistance $R_2$) of said branch for controlling said step of connecting capacitor plates of said first capacitor 1 through said switching device 4 (during a period of time $t_1$–$t_0$: FIG. 29) and for controlling the step of converting said switching device 4 into a non-conducting state (during a period of time $t_3$–$t_1$: FIG. 29);

connecting electrically the capacitor plates of said first capacitor 1 (during a period of time $t_4$–$t_3$: FIG. 29) through the diode 7. One can change a capacity of the adjustable capacitor 12 by changing a value of at least one of said resistances $R_3$, $R_4$, $R_5$ and $R_6$.

Figure 21:
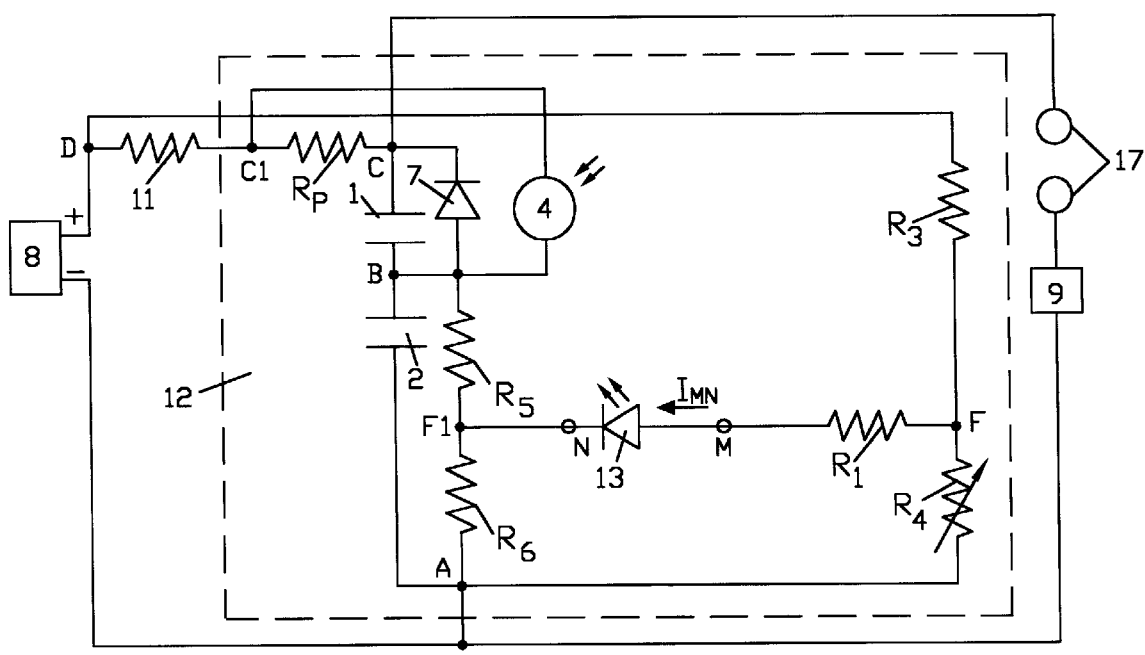

FIG. 21 includes the first capacitor 1 whose capacity is chosen no more than the capacity of the second capacitor 2. The realization of this technical solution comprises the steps of:

connecting said first 1 and second 2 capacitors in series;

connecting capacitor plates of said second capacitor 2 through a voltage divider (with resistances $R_5$ and $R_6$;

connecting a voltage source or unlike poles of an operating electric circuit of charging said first 1 and second 2 capacitors through an additional voltage divider (with resistances $R_3$ and $R_4$) and using the voltage drop on the divider arm $R_4$ of said additional voltage divider as a control voltage $U_A$;

applying said control voltage $U_A$ to the divider arm $R_6$ of said voltage divider through the branch (with a current $I_{MN}$) having a photodiode 13;

connecting capacitor plates of said first capacitor 1 through a switching device 4 (a photosensitive switching device 4, optically connected to the photodiode 13, can be used as a switching device 4);

using the current $I_{MN}$ of said branch for controlling said step of connecting capacitor plates of said first capacitor 1 through said switching device 4 (during a period of time $t_1$–$t_0$: FIG. 29) and for controlling the step of converting said switching device 4 into a non-conducting state (during a period of time $t_3$–$t_1$: FIG. 29);

connecting electrically the capacitor plates of said first capacitor 1 (during a period of time $t_4$–$t_3$: FIG. 29) through the diode 7. One can change a capacity of the adjustable capacitor 12 by changing a value of at least one of said resistances $R_3$, $R_4$, $R_5$ and $R_6$.

Figure 22:
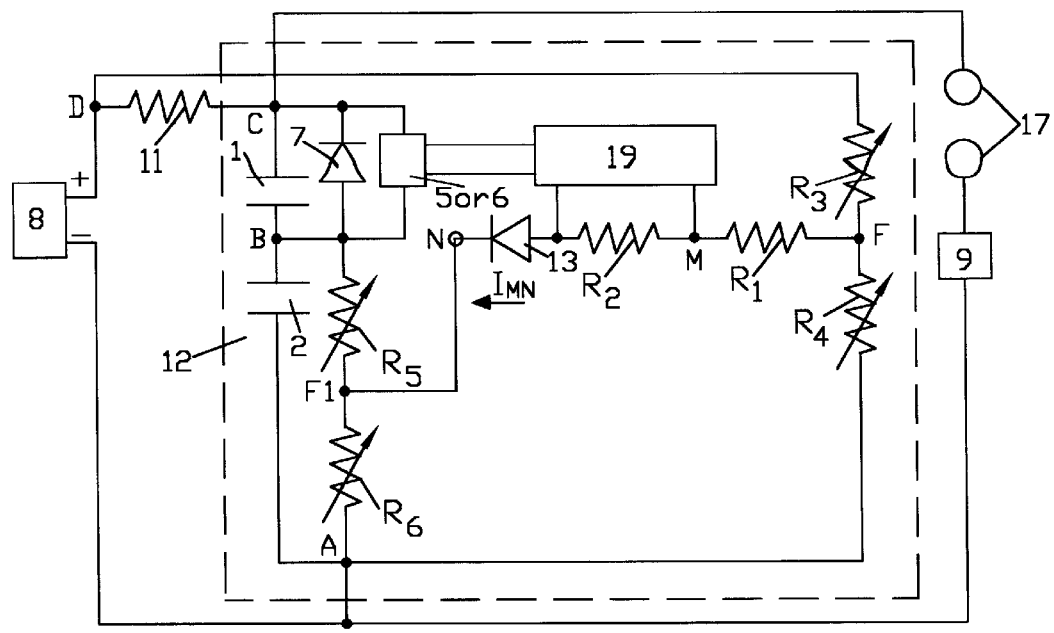

FIG. 22 includes the first capacitor 1 whose capacity is chosen no more than the capacity of the second capacitor 2. The realization of this technical solution comprises the steps of:

connecting said first 1 and second 2 capacitors in series;

connecting capacitor plates of said second capacitor 2 through a voltage divider (with resistances $R_5$ and $R_6$);

connecting a voltage source or unlike poles of an operating electric circuit of charging said first 1 and second 2 capacitors through an additional voltage divider (with resistances $R_3$ and $R_4$) and using the voltage drop on the divider arm $R_4$ of said additional voltage divider as a control voltage $U_A$;

applying said control voltage $U_A$ to the divider arm $R_6$ of said voltage divider through the branch (with a current $I_{MN}$) having a unidirectional conductive device 13;

connecting capacitor plates of said first capacitor 1 through an adjustable resistance device 5 or through an adjustable reactance device 6;

using a voltage drop (on resistance $R_2$) of said branch for controlling said step of connecting capacitor plates of said first capacitor 1 through said adjustable resistance device 5 or through said adjustable reactance device 6 (during a period of time $t_1$–$t_0$: FIG. 29) and for controlling the step of converting said adjustable resistance device 5 or adjustable reactance device 6 into a state with higher impedance (during a period of time $t_3$–$t_1$: FIG. 29);

connecting electrically the capacitor plates of said first capacitor 1 (during a period of time $t_4$–$t_3$: FIG. 29) through the diode 7. One can change a capacity of the adjustable capacitor 12 by changing a value of at least one of said resistances $R_3$, $R_4$, $R_5$ and $R_6$.

Figure 23:
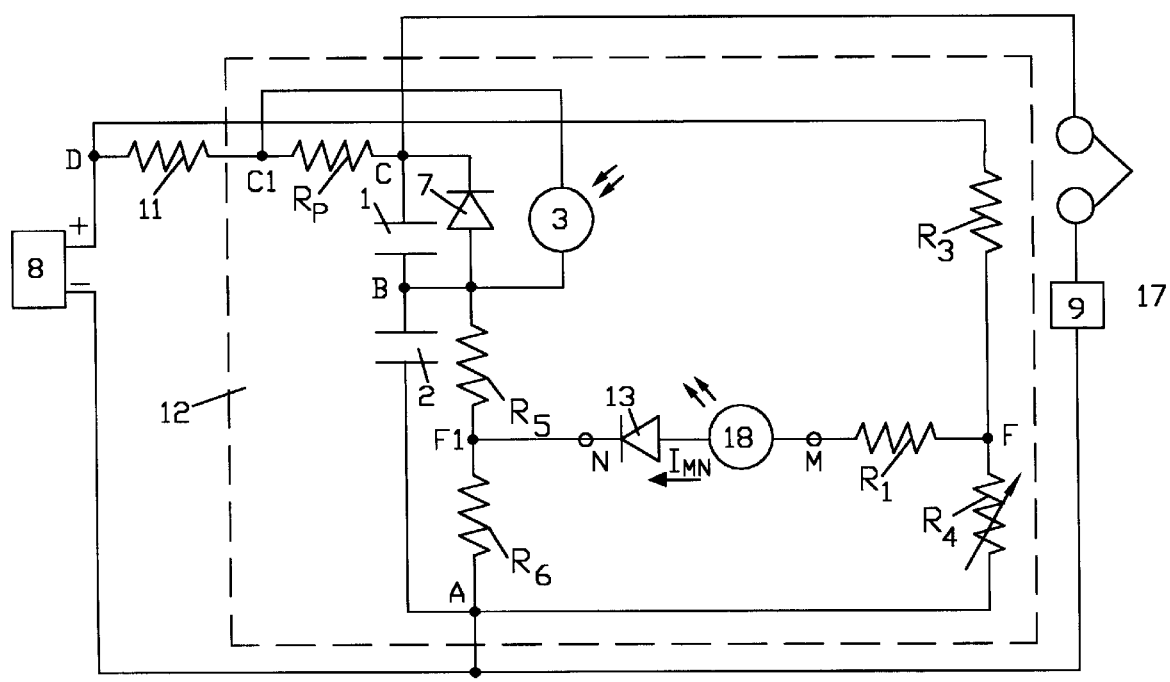

FIG. 23 includes the first capacitor 1 whose capacity is chosen no more than the capacity of the second capacitor 2. The realization of this technical solution comprises the steps of:

connecting said first 1 and second 2 capacitors in series;

connecting capacitor plates of said second capacitor 2 through a voltage divider (with resistances $R_5$ and $R_6$);

connecting a voltage source or unlike poles of an operating electric circuit of charging said first 1 and second 2 capacitors through an additional voltage divider (with resistances $R_3$ and $R_4$) and using the voltage drop on the divider arm $R_4$ of said additional voltage divider as a control voltage $U_A$;

applying said control voltage $U_A$ to the divider arm $R_6$ of said voltage divider through the branch (with a current $I_{MN}$) having a unidirectional conductive device 13;

connecting capacitor plates of said first capacitor 1 through a cell 3 (a photoconductive cell, optically connected to the light source 18, can be used as a cell 3);

using the current $I_{MN}$ of said branch for controlling said step of connecting capacitor plates of said first capacitor 1 through said cell 3 (during a period of time $t_1-t_0$: FIG. 29) and for controlling the step of converting said cell 3 into a state with higher impedance or into a non-conducting state (during a period of time $t_3-t_1$: FIG. 29);

connecting electrically the capacitor plates of said first capacitor 1 (during a period of time $t_4-t_3$: FIG. 29) through the diode 7. One can change a capacity of the adjustable capacitor 12 by changing a value of at least one of said resistances $R_3$, $R_4$, $R_5$ and $R_6$.

FIG. 24 includes the first capacitor 1 whose capacity is chosen no more than the capacity of the second capacitor 2. The realization of this technical solution comprises the steps of:

connecting said first 1 and second 2 capacitors in series;

connecting a voltage source or unlike poles of an operating electric circuit of charging said first 1 and second 2 capacitors through an additional voltage divider (with resistances $R_3$ and $R_4$) and using the voltage drop on the divider arm $R_4$ of said additional voltage divider as a control voltage $U_A$;

applying said control voltage $U_A$ ($U_A=U_{R4}$) to said second capacitor 2 through the branch (with a current $I_{MN}$) having a unidirectional conductive device 13;

connecting capacitor plates of said first capacitor 1 through a switching device 4 (a transistor is used as a switching device 4);

using the current $I_{MN}$ of said branch for switching on (during a period of time $t_1-t_0$: FIG. 29), switching off (during a period of time $t_3-t_1$: FIG. 29) and switching on (during a period of time $t_4-t_3$: FIG. 29) said switching device 4. One can change a capacity of the adjustable capacitor 12 by changing a value of at least one of said resistances $R_3$ and $R_4$.

Figure 20:
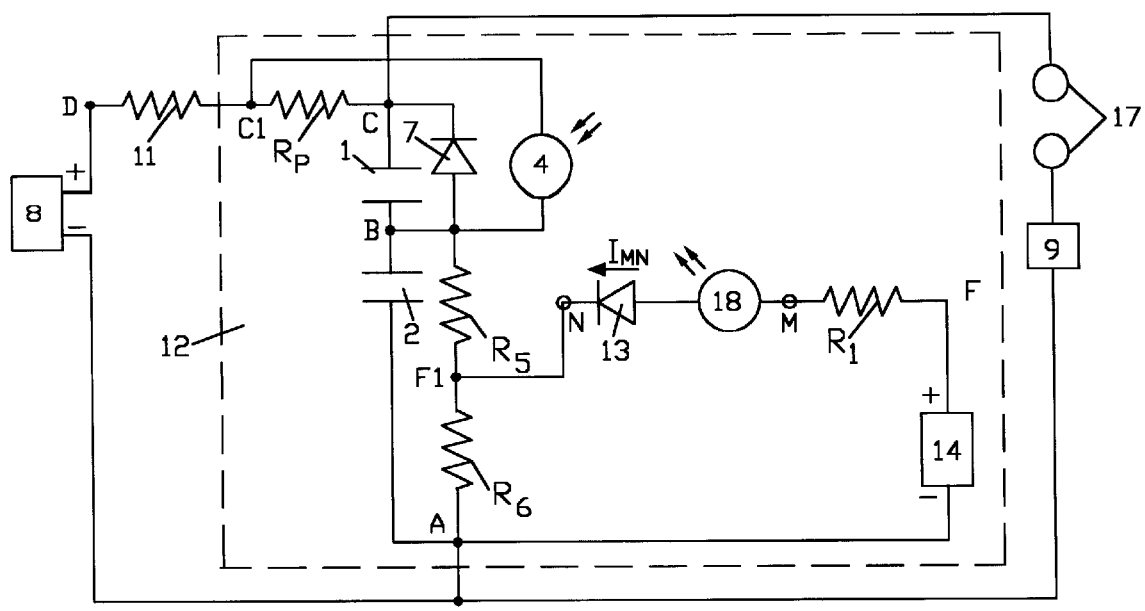

The switching device 4 or the photoconducting cell 3 (FIG. 3 and FIG. 23) is on when $I_{MN}>0$ where $I_{MN}$ is a current of said branch. The current $I_{MN}>0$ when:

$U_A>U_2$ where $U_A$ is a voltage of the source of control voltage 14 (FIGS. 9–11), $U_2$ is a voltage on the second capacitor 2;

$U_A>U_{R6}$ where $U_{R6}$ is a voltage on the resistance $R_6$ (FIG. 20);

$U_{R4}>U_2$ where $U_{R4}$ is a voltage on the resistance $R_4$ (FIGS. 12–14, FIGS. 26–28 and FIGS. 62–63);

$U_{R4}>U_{R6}$ (FIGS. 18–19, FIG. 21, FIG. 23, FIG. 25, FIGS. 30–32, FIGS. 42–43, FIG. 47, FIG. 66 and FIG. 88).

For realizations shown in FIGS. 15–17, the switching device 4 is on when $I_{MN}=0$. The current $I_{MN}=0$ when:

$U_{R4} \geq U_2$.

Figure 9:
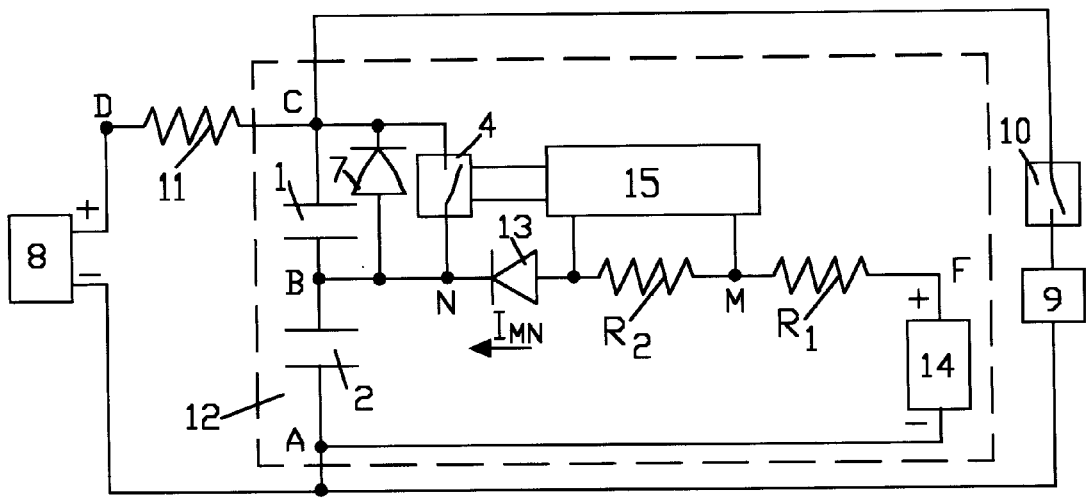
FIGS. 9–23 (figures from 9 to 23) illustrate the adjustable capacitor 12 which functions by using a current of said branch or by using a voltage drop on at least one part of said branch for controlling or realizing said steps of connecting capacitor plates of said first capacitor or said output terminals of said first group of capacitors and said step of converting.
Figure 10:
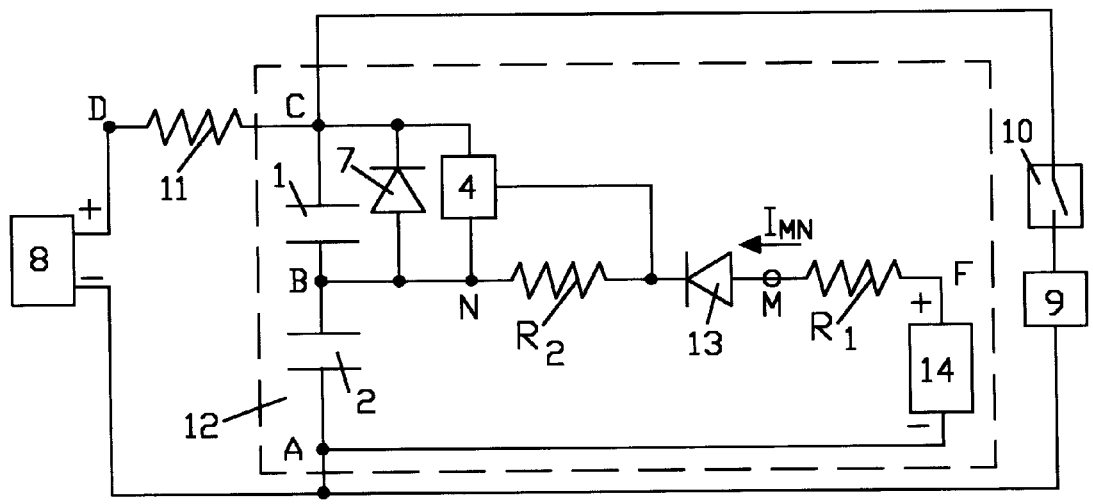

The switching device 4 or the photoconducting cell 3 (FIG. 3 and FIG. 23) is off when $I_{MN}=0$. The current $I_{MN}=0$ when:

$U_2 \geq U_A$ (FIGS. 9–11);
$U_{R6} \geq U_A$ (FIG. 20);
$U_2 \geq U_{R4}$ (FIGS. 12–14, FIGS. 26–28 and FIGS. 62–63);
$U_{R6} \geq U_{R4}$ (FIGS. 18–19, FIG. 21, FIG. 23, FIG. 25, FIGS. 30–32, FIGS. 42–43, FIG. 47, FIG. 66 and FIG. 88).

For realizations shown in FIGS. 15–17, the switching device 4 is off when $I_{MN}>0$. The current $I_{MN}>0$ when:

$U_2>U_{R4}$.

During a period of time $t_1-t_0$ (FIG. 29), the switching device 4 (FIGS. 9–21, FIGS. 24–28, FIGS. 30–32) or the photoconducting cell 3 (FIG. 23) is on because:

the unidirectional conductive device 13 (FIGS. 9–14, FIGS. 18–20, FIGS. 23–28, FIGS. 30–32) or the photodiode 13 (FIG. 21) is open and the current $I_{MN}>0$;

the unidirectional conductive device 13 is closed and the current $I_{MN}=0$ (FIGS. 15–17).

During a period of time $t_3-t_1$ (FIG. 29), the switching device 4 (FIGS. 9–21, FIGS. 24–28, FIGS. 30–32) or the photoconducting cell 3 (FIG. 23) is off because:

the unidirectional conductive device 13 (FIGS. 9–14, FIGS. 18–20, FIGS. 23–28, FIGS. 30–32) or the photodiode 13 (FIG. 21) is closed and the current $I_{MN}=0$;

the unidirectional conductive device 13 is open and the current $I_{MN}>0$ (FIGS. 15–17). For realization shown in FIG. 22, the step of converting the adjustable resistance 5 or the adjustable reactance 6 (FIG. 5, FIG. 6-1 and FIG. 6-2) into a non-conducting state or into a state with higher impedance is realized by control unit 19 (FIG. 22) in a moment $t_1$ (FIG. 29).

One can smoothly change the capacity $C_A$ of the adjustable capacitor 12 within limits given by mentioned expression (3) by changing a value of said control voltage $U_A$ and/or by changing a value(s) of impedance(s) on at least one of divider arms of said voltage divider. For example:

In case of $U_A=U_S$ (for realizations shown in FIGS. 9–11), the capacity $C_A$ of the adjustable capacitor 12 is given by mentioned expression (2): $C_A=C_2$ because $I_{MN}>0$ all the time within charging of the second capacitor 2 and the switching device 4 is on all the time within charging of the second capacitor 2;

In case of $U_A=0$ (for realizations shown in FIGS. 9–11), the capacity $C_A$ of the adjustable capacitor 12 is given by mentioned expression (3): $C_A=(C_1 \times C_2)/(C_1+C_2)$ because $I_{MN}=0$ all the time within charging of the second capacitor 2 and the switching device 4 is off all the time within charging of the second capacitor 2. Therefore, by changing a value of said control voltage $U_A$ within limits $0 \leq U_A \leq U_S$ one can smoothly change the capacity $C_A$ of the adjustable capacitor 12 within limits:

$$(C_1 \times C_2)/(C_1+C_2) \leq C_A \leq C_2 \qquad (3)$$

For realizations shown in FIG. 20, one can smoothly change the capacity $C_A$ of the adjustable capacitor 12 within limits given by mentioned expression (3) by changing a value of said control voltage $U_A$ within limits: $0 \leq U_A \leq (U_S \times R_6)/(R_5+R_6)$ where $R_5$ and $R_6$ are values of resistances $R_5$ and $R_6$.

As a control voltage $U_A$ can be used at least one voltage drop on at least one of divider arms of an additional voltage divider.

For realizations shown in FIGS. 18–19, FIG. 21, FIG. 23, FIG. 25, FIGS. 30–32, FIGS. 42–43, FIG. 47 and FIG. 66, one can smoothly change the capacity $C_A$ of the adjustable capacitor 12 within limits given by mentioned expression (3) by changing a value of said control voltage $U_A$ within limits:

$$0 \leq (U_S \times R_4)/(R_3+R_4) \leq (U_S \times R_6)/(R_5+R_6) \qquad (10)$$

where $U_A=(U_S \times R_4)/(R_3+R_4)$, $U_S$ is the voltage of the voltage source 8, $R_3$ and $R_4$ are values of resistances $R_3$ and $R_4$. When the resistance $R_4$ is variable and resistances $R_3$, $R_5$ and $R_6$ are not variable or have fixed values, it follows from above expression (10) that one can smoothly change the capacity $C_A$ of the adjustable capacitor 12 within limits given by mentioned expression (3) by changing a value of said resistance $R_4$ within limits:

$$0 \leq R_4/(R_3+R_4) \leq R_6/R_5+R_6 \qquad (10\text{-}1)$$

Technical solution with the two-way switch 20 (FIG. 24) ensures the step of reversing connections of the voltage source 8 with said additional voltage divider. This step with the step of changing the resistance $R_4$ (FIG. 24) permit changing the capacity $C_A$ of the adjustable capacitor 12 within limits given by mentioned expression (3) because these steps ensure changing a control voltage $U_A$ (applied to the second capacitor 2 through said branch having a unidirectional conductive device 13) within limits:

$$0 \leq U_A \leq U_S.$$

The steps of installing an input circuit of an amplifying device 21 (FIGS. 25–28) in said branch and controlling said switching device 4 through an output of said amplifying device ensure smooth change of the capacity $C_A$ of the adjustable capacitor 12 within limits given by mentioned expression (3) by changing a value of said resistance $R_4$ within limits given by mentioned expression (10-1). These steps also permit using the adjustable resistance $R_4$ whose design power is about four to five and more orders of magnitude lesser than design power of the charging resistor 11. Technical solutions, for example, in which said amplifying device 21 is a darlington transistor (FIGS. 30–32), permit using the adjustable resistance $R_4$ whose design power is about four to five orders of magnitude lesser than design power of the charging resistor 11.

The step of controlling said switching device 4 through an output of the amplifying device 21 and at least one transistor 23 (FIG. 31) permits changing the capacity $C_A$ of the adjustable capacitor 12 within limits given by mentioned expression (3) by using the adjustable resistance $R_4$ whose design voltage is about two to three orders of magnitude lesser than design voltages of the first 1 and the second 2 capacitors.

Technical solution (FIG. 32), in which said step of charging said capacitors is realized through at least one light source 27 and a bridge rectifier 26, permits decreasing a cost price of the step of charging the adjustable capacitor 12 and energy losses because market prices of light sources are lesser than market prices of current limiting resistances and a part of energy of heat release can be transformed into light energy.

The step of controlling switched on and switched off states of the switching device 4 by a current $I_{MN}$ of said branch permits maintaining the voltage $U_{2L}$ on the load 9-1, connected to the second capacitor 2 (FIGS. 30–32), practically constant when a value of the variable resistance $R_4$ is fixed and $I_L \ll U_S/R_{11}$ where $I_L$ is the current of the load 9-1. One can smoothly change said voltage $U_{2L}$ within limits $0 < U_{2L} < U_S$ by changing a value of said resistance $R_4$ within limits:

$$0 \leq R_4/(R_3+R_4) \leq R_6/R_5+R_6 \qquad (10\text{-}1)$$

(FIG. 11 with FIG. 33) illustrate a technical solution in which the first control system, having a switching device S1, is attained by steps of: applying said control voltage $U_A$ to the second capacitor 2 through the new branch (with a current $I_{MN3}$) having a new unidirectional conductive device 29; using the current $I_{MN3}$ of said new branch for controlling or switching on and switching off the switching device S1. One can change a maximum voltage $U_{2max}$ on the second capacitor 2 and a time of switching on or switching off said switching device S1 by changing a value of said control voltage $U_A$ (the voltage of the voltage source 14).

Figure 42:
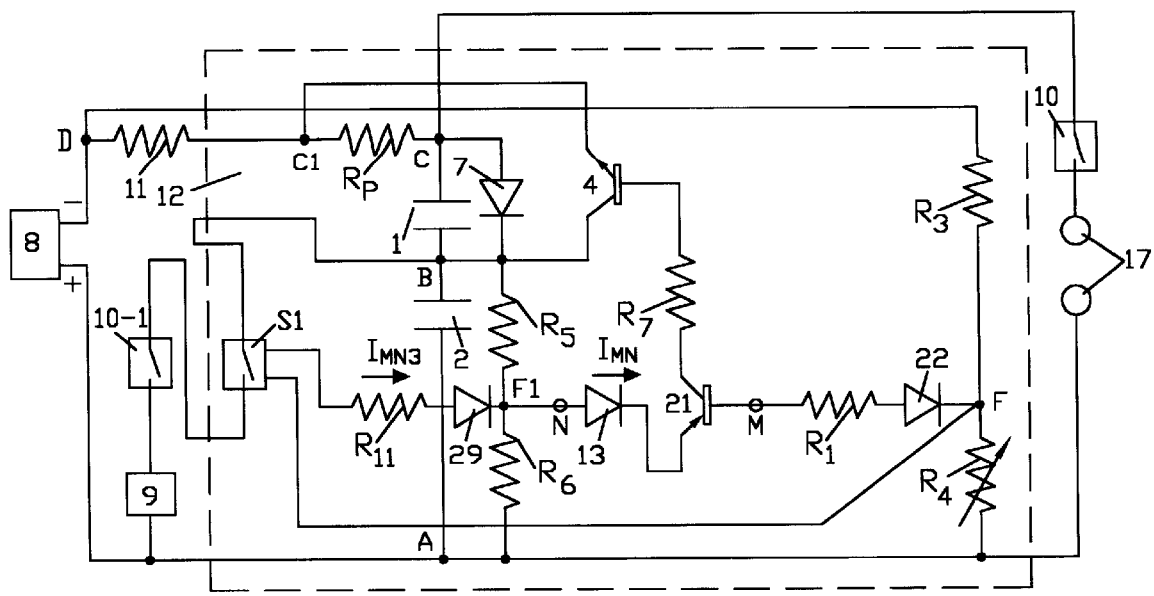
Figure 43:
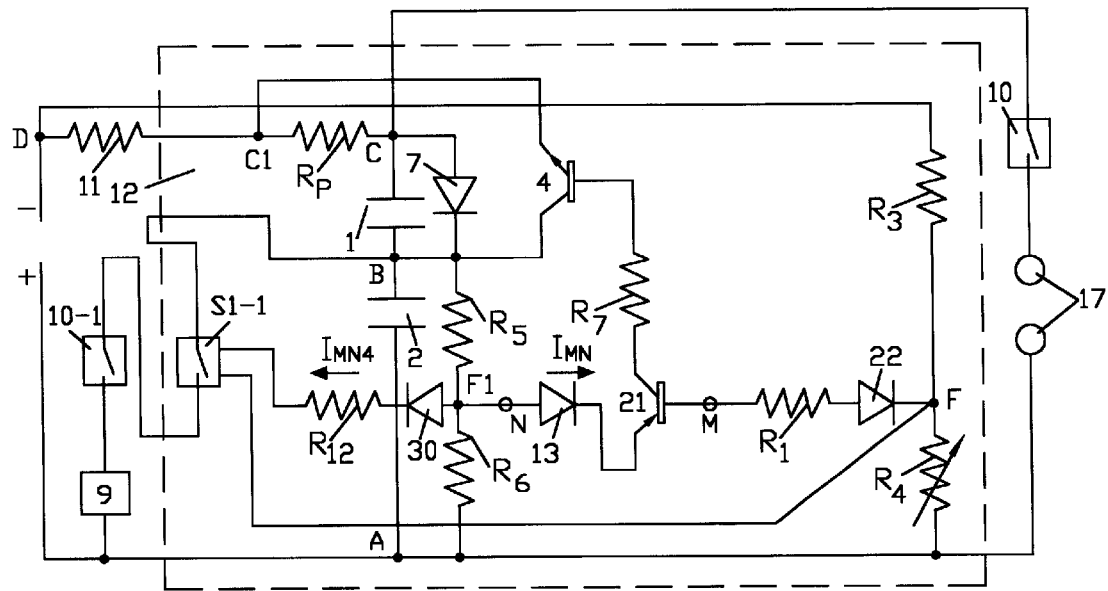

FIG. 42 illustrates a technical solution in which the first control system, having a switching device S1, is attained by steps of: applying said control voltage $U_A$ ($U_A = U_{R4}$) to the divider arm $R_6$ of the voltage divider (with resistances $R_5$ and $R_6$) through the new branch (with a current $I_{MN3}$) having a unidirectional conductive device 29;

using the current $I_{MN3}$ of said new branch for controlling or switching on and switching off the switching device S1. One can change a maximum voltage $U_{2max}$ on the second capacitor 2 and a time of switching on or switching off said switching device S1 by changing a value of said control voltage $U_A$ or by changing a value of at least one of said resistances $R_5$ and $R_6$.

(FIG. 11 with FIG. 35) illustrate a technical solution in which the first control system, having a switching device S1-1, is attained by steps of: applying said control voltage $U_A$ to said second capacitor 2 through the second new branch (with a current $I_{MN4}$) having a second new unidirectional conductive device 30 which is installed in an opposite direction with respect to said new unidirectional conductive device 29; using the current $I_{MN4}$ of said second new branch for controlling or switching on or switching off the switching device S1-1. One can change a maximum voltage $U_{2max}$ on the second capacitor 2 and a time of switching on or switching off said switching device S1-1 by changing a value of said control voltage $U_A$ (the voltage of the voltage source 14).

FIG. 43 illustrates a technical solution in which the first control system, having a switching device S1-1, is attained by steps of: applying said control voltage $U_A$ ($U_A = U_{R4}$) to the divider arm $R_6$ of the voltage divider (with resistances $R_5$ and $R_6$) through the second new branch (with a current $I_{MN4}$), having a second new unidirectional conductive device 30 which is installed in an opposite direction with respect to said new unidirectional conductive device 29 (FIG. 42); using the current $I_{MN4}$ of said second new branch for controlling or switching on or switching off the switching device S1-1. One can change a maximum voltage $U_{2max}$ on the second capacitor 2 and a time of switching on or switching off said switching device S1-1 by changing a value of said control voltage $U_A$ or by changing a value of at least one of said resistances $R_5$ and $R_6$.

The principle of functioning the first control system is demonstrated below for realizations shown in FIGS. 33–43.

Figure 30:
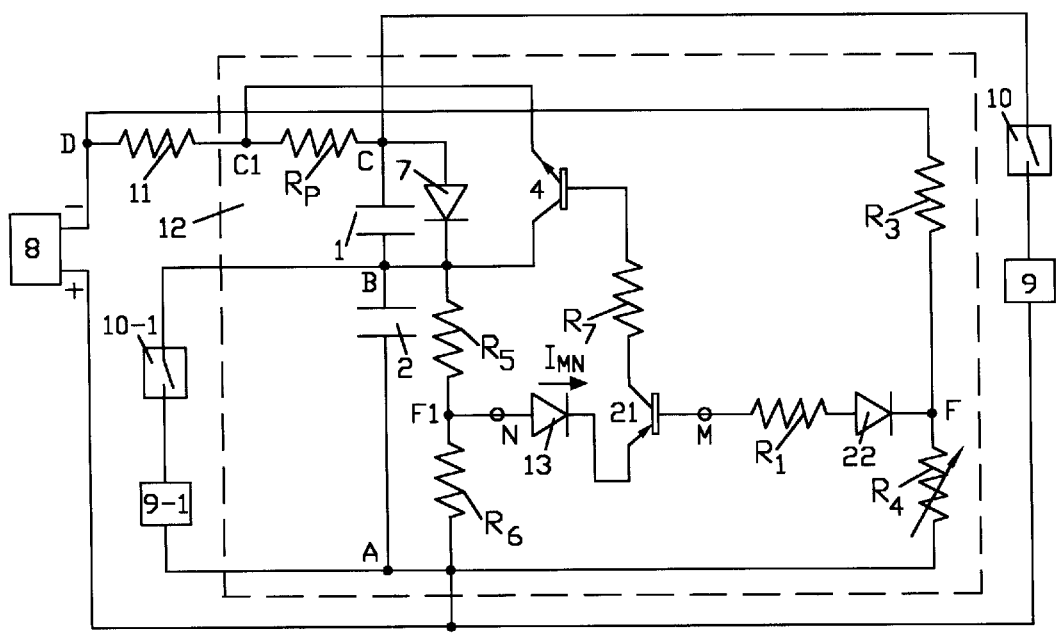
FIGS. 30–32 illustrate realizations of the adjustable capacitor 12 in which a transistor 21 (for example a darlington transistor) is used as said amplifying device 21. These figures illustrate also realizations which permit changing a voltage level of charging of said second capacitor and a voltage level on a load by changing a value of said control voltage $U_A$.
Figure 33:
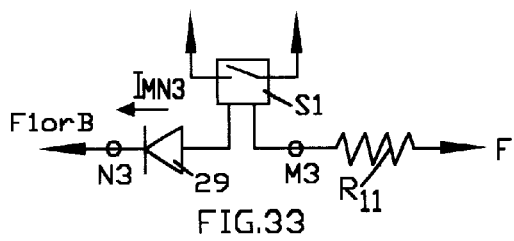
FIGS. 33–37 illustrate realizations of said first control system.
Figure 34:
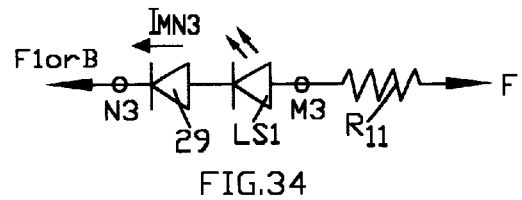

The switching device S1 and the light source LS1 are on when $I_{MN3} > 0$ where $I_{MN3}$ is a current of a new branch (FIGS. 33–34). The current $I_{MN3} > 0$ when:

$U_{R6} > U_{R4}$ where $U_{R4}$ and $U_{R6}$ are voltages on resistances $R_4$ and $R_6$ (FIGS. 33–34 with FIGS. 30–32; FIG. 42);

$U_A > U_{R6}$ (FIGS. 33–34 with FIG. 20);
$U_A > U_2$ (FIGS. 33–34 with FIGS. 9–11);
$U_{R4} > U_2$ (FIGS. 33–34 with FIGS. 12–14).

The switching device S1 and the light source LS1 are off when $I_{MN3}=0$. The current $I_{MN3}=0$ when:
$U_{R4} \geq U_{R6}$ (FIGS. 35–36 with FIGS. 30–32; FIG. 42);
$U_{R6} \geq U_A$ (FIGS. 33–34 with FIG. 20);
$U_2 \geq U_A$ (FIGS. 33–34 with FIGS. 9–11);
$U_2 \geq U_{R4}$ (FIGS. 33–34 with FIGS. 12–14).

The switching device S1-1 and the light source LS1-1 are on when $I_{MN4}>0$ where $I_{MN4}$ is a current of a second new branch (FIGS. 35–36). The current $I_{MN4}>0$ when:
$U_{R4} > U_{R6}$ (FIGS. 35–36 with FIGS. 30–32; FIG. 43);
$U_{R6} > U_A$ (FIGS. 35–36 with FIG. 20);
$U_2 > U_A$ (FIGS. 35–36 with FIGS. 9–11);
$U_2 > U_{R4}$ (FIGS. 35–36 with FIGS. 12–14).

The switching device S1-1 and the light source LS1-1 are off when $I_{MN4}=0$. The current $I_{MN4}=0$ when:
$U_{R6} \geq U_{R4}$ (FIGS. 35–36 with FIGS. 30–32; FIG. 43);
$U_A \geq U_{R6}$ (FIGS. 35–36 with FIG. 20);
$U_A \geq U_2$ (FIGS. 35–36 with FIGS. 9–11);
$U_{R4} \geq U_2$ (FIGS. 35–36 with FIGS. 12–14).

Therefore, one can simultaneously change a time of switching on the switching device S1 and switching off the switching device S1-1 by changing voltages: $U_{R4}$ and/or $U_{R6}$ (FIGS. 33–36 with FIGS. 30–32; FIGS. 42–43); $U_{R6}$ and/or $U_A$ (FIGS. 33–36 with FIG. 20); $U_A$ (FIGS. 33–36 with FIGS. 9–11); $U_{R4}$ ($U_{R4}=U_A$; FIGS. 33–36 with FIGS. 12–14). Switching devices S1 and S1-1 and light sources LS1 and LS1-1 are changing their states practically simultaneously.

FIG. 42 and FIG. 43 illustrate realizations of the adjustable capacitor 12 with the first control system in which a maximum voltage $U_{2max}$ on the second capacitor 2 and a time of switching on or switching off said switching devices S1 (FIG. 42), S1-1 (FIG. 43) can be changed by the step of changing a value of at least one of resistances $R_3$, $R_4$, $R_5$ and $R_6$. FIGS. 39–40 and these realizations (FIGS. 42–43) illustrate the step of controlling a turn-on time and/or a turn-off time of said second capacitor with at least one load 9 by at least one of said switching devices S1 (FIG. 39 and FIG. 42) and S1-1 (FIG. 40 and FIG. 43). Realizations illustrated in FIGS. 42–43 permit forming on a load 9 different form impulse voltages (FIGS. 45–46) whose amplitude is controlled. Realizations illustrated in FIGS. 39–40 can be used for controlling a turn-on time and a turn-off time of at least one load 9 by at least one of said switching devices S1 (FIG. 39 with points of connections D and A) and S1-1 (FIG. 40 with points of connections D and A).

FIG. 38 illustrates the step of controlling a time of beginning discharging the second capacitor 2 by the switching device S1 which functions as normally open switching device. When switching device S1 (FIG. 38) is in switched on state, the voltage on the second capacitor 2 is applied to the triggering electrode of the switching device 32 causing the change of the state of the switching device 32 into a conducting state. This technical solution permits obtaining relaxation oscillations (FIG. 44) on the second capacitor 2 whose amplitude is controlled by the switching device S1 (FIG. 38).

FIG. 41 illustrates the step of combining said branch with a second new branch (FIG. 36).

FIG. 47 illustrates a technical solution in which the second control system, having a switching device S2, is attained by steps of:

connecting the voltage source 8 of charging the adjustable capacitor through a supplementary voltage divider (with resistances $R_{15}$ and $R_{16}$) and using the voltage drop on the divider arm $R_{16}$ of said supplementary voltage divider as a supplementary voltage $U_{S1}$;

connecting capacitor plates of the first 1 and the second 2 capacitors through a second voltage divider (with resistances $R_{17}$ and $R_{18}$) and applying said supplementary voltage $U_{S1}$, ($U_{S1}=U_{R16}$) to the divider arm $R_{18}$ of said second voltage divider through the additional branch (with a current $I_{MN5}$) having an additional unidirectional conductive device 37;

using the current $I_{MN5}$ of said additional branch for controlling or switching on and switching off the switching device S2. One can change a time of switching on or switching off said switching device S2 by changing a value of said supplementary voltage $U_{S1}$, or by changing a value of at least one of said resistances $R_{17}$ and $R_{18}$.

(FIG. 62 or FIG. 63) illustrates a technical solution in which the second control system, having a switching device S2-1, is attained by steps of:

applying said supplementary voltage $U_{S1}$ ($U_{S1}=U_{R16}$) to the first 1 and second 2 capacitors through the second additional branch (with a current $I_{MN6}$), having a second additional unidirectional conductive device 38 which is installed in an opposite direction with respect to said additional unidirectional conductive device 37 (FIG. 48);

using the current $I_{MN6}$ of said second additional branch for controlling or switching on or switching off the switching device S2-1. One can change a time of switching on or switching off said switching device S2-1 by changing a value of said supplementary voltage $U_{S1}$.

(FIG. 66) illustrates a technical solution in which the second control system, having a switching device S2-1, is attained by steps of:

connecting capacitor plates of the first 1 and the second 2 capacitors through the second voltage divider (with resistances $R_{17}$ and $R_{18}$);

applying a supplementary voltage $U_{S1}$ ($U_{S1}=U_{R16}$) to the divider arm $R_{18}$ of said second voltage divider through the second additional branch (with a current $I_{MN6}$) having a second additional unidirectional conductive device 38 which is installed in an opposite direction with respect to said additional unidirectional conductive device 37 (FIG. 48);

using the current $I_{MN6}$ of said second additional branch for controlling or switching on or switching off the switching device S2-1. One can change a time of switching on or switching off said switching device S2-1 by changing a value of said supplementary voltage $U_{S1}$ or by changing a value of at least one of said resistances $R_{17}$ and $R_{18}$ of said second voltage divider.

The principle of functioning the second control system is demonstrated below for realizations shown in FIGS. 47–63.

Figure 49:
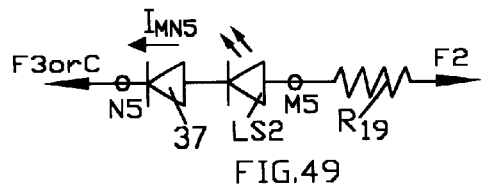

The switching device S2 and the light source LS2 are on when $I_{MN5}>0$ where $I_{MN5}$ is a current of an additional branch (FIGS. 48–49). For example, for realizations shown in FIG. 47 and FIGS. 62–63, the current $I_{MN5}>0$ when:
$U_{18}>U_{16}$ where $U_{18}$ and $U_{16}$ are voltages on resistances $R_{18}$ and $R_{16}$ (FIG. 47);
$U_{16}>U_1+U_2$ (FIGS. 48–49 with FIGS. 62–63).

The switching device S2 and the light source LS2 are off when $I_{MN5}=0$. The current $I_{MN5}=0$ when:

$U_{18} \leq U_{16}$ (FIG. 47);

$U_{16} \leq U_1+U_2$ (FIGS. 48–49 with FIGS. 62–63).

The switching device S2-1 and the light source LS2-1 are on when $I_{MN6}>0$ where $I_{MN6}$ is a current of a second additional branch (FIG. 48 and FIG. 50). The current $I_{MN6}>0$ when:

$U_{18}<U_{16}$ (FIG. 48 and FIG. 50 with FIG. 47);

$U_{16}<U_1+U_2$ (FIGS. 62–63).

The switching device S1-1 and the light source LS1-1 are off when $I_{MN6}=0$. The current $I_{MN6}=0$ when:

$U_{18} \geq U_{16}$ (FIG. 48 and FIG. 50 with FIG. 47);

$U_{16} \geq U_1+U_2$ (FIGS. 62–63).

FIG. 47 illustrates a realization of the adjustable capacitor 12 with the second control system in which a voltage on the divider arm $R_{16}$ of said supplementary voltage divider is used as a supplementary voltage $U_{S1}$. A time of switching on or switching off said switching devices S2 (FIG. 47), S2-1 (FIG. 48 with FIG. 47) and/or said light sources LS2 (FIG. 49 with FIG. 47), LS2-1 (FIG. 50 with FIG. 47) can be changed by the step of changing a value of at least one of resistances $R_{15}$, $R_{16}$, $R_{17}$ and $R_{18}$ where $R_{17}$ and $R_{18}$ are resistances of said second voltage divider. Switch devices S2 and S2-1 and light sources LS2 and LS2-1 are changing their states practically simultaneously.

FIG. 47, FIG. 52 and FIG. 62 illustrate the step of controlling a time of beginning discharging said first 1 and second 2 capacitors by one of said switching devices S2 (FIG. 47, FIG. 52) and S2-1 (FIG. 62) which functions as normally open switching device. When switching device S2 (FIG. 47, FIG. 52) or switching device S2-1 (FIG. 62) is in switched on state, the voltage on the first 1 and second 2 capacitors is applied to the triggering electrode of the switching device 32-1 causing the change of the state of the switching device 32-1 into a conducting state. These technical solutions permit obtaining relaxation oscillations (FIG. 64) on the first 1 and second 2 capacitors whose amplitude is controlled by the switching device S2 (FIG. 47, FIG. 52) or by the switching device S2-1 (FIG. 62) and whose pulse rate can be smoothly changed by the step of changing the capacity $C_A$ of the adjustable capacitor described above. One can change an amplitude of said relaxation oscillations by the step of changing a value of at least one of resistances $R_{15}$, $R_{16}$, $R_{17}$ and $R_{18}$ (FIG. 47) or of at least one of resistances $R_{15}$, $R_{16}$ (FIG. 62).

FIG. 55 with FIG. 1, FIG. 65a and FIG. 47 illustrate the step of applying a voltage of a voltage source or a voltage on unlike poles of an operating electric circuit to said first 1 and second 2 capacitors or to said first and second groups of capacitors through the switching device S2-1, which functions as normally closed switching device. This technical solution permits changing a maximum voltage $U_{ADJmax}$ on the adjustable capacitor by the step of changing a value of at least one of resistances $R_{15}$, $R_{16}$, $R_{17}$ and $R_{18}$.

FIG. 63 or FIGS. 56–57 with FIG. 47 and FIG. 65a illustrate the step of controlling a turn-on time and/or a turn-off time of said first 1 and second 2 capacitors with at least one load 9 by at least one of said switching devices S2 (FIG. 56), S2-1(FIG. 63 or FIG. 57 with FIG. 47).

Figure 59:
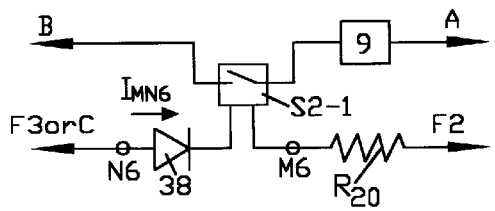
Figure 60:
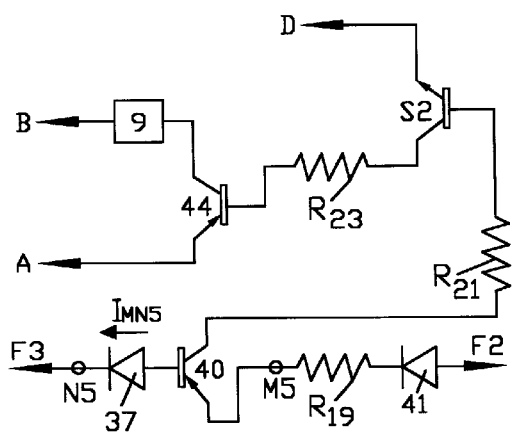

FIGS. 58–61 with FIG. 47 and FIG. 65a illustrate the step of controlling a turn-on time and/or a turn-off time of said second capacitor with at least one load 9 by at least one of said switching devices S2 (FIG. 58 and FIG. 60), S2-1 (FIG. 59 and FIG. 61). These technical solutions permit controlling a turn-on time or a turn-off time of the second capacitor 2 with a load 9 as a function of a voltage level on the first 1 and second 2 capacitors. One can change said voltage level on the first 1 and second 2 capacitors by the step of changing a value of at least one of resistances $R_{15}$, $R_{16}$, $R_{17}$ and $R_{18}$.

A voltage drop on at least one part of said additional and second additional branches can be used for controlling and/or switching on or switching off at least one of said switching devices S2, S2-1 and light sources LS2, LS2-1 similar to realizations (FIGS. 9–10, FIGS. 12–13, FIGS. 15–16 and FIG. 18) in which the switching device 4 is controlled by a voltage drop on said branch.

(FIG. 66) illustrates a technical solution in which the third control system, having a switching device S3, is attained by steps of:

connecting the voltage source 8 of charging the adjustable capacitor through the second supplementary voltage divider (with resistances $R_{25}$ and $R_{26}$) and using the voltage drop on the divider arm $R_{26}$ of said second supplementary voltage divider as a second supplementary voltage $U_{S2}$;

connecting capacitor plates of the first 1 and second 2 capacitors through the third voltage divider (with resistances $R_{27}$ and $R_{28}$s) and applying said second supplementary voltage $U_{S2}$ ($U_{S2}=U_{R26}$) to the divider arm $R_{28}$ of said third voltage divider through the new additional branch (with a current $I_{MN7}$) having a new additional unidirectional conductive device 46;

using the current $I_{MN7}$ of said new additional branch for controlling or switching on or switching off the switching device S3. One can change a time of switching on or switching off said switching device S3 by changing a value of said second supplementary voltage $U_{S2}$ or by changing a value of at least one of said resistances $R_{27}$ and $R_{28}$ of said third voltage divider.

(FIG. 66 with FIG. 67) illustrate a technical solution in which the third control system, having a switching device S3-1, is attained by steps of:

connecting capacitor plates of the first 1 and second 2 capacitors through the third voltage divider (with resistances $R_{27}$ and $R_{28}$);

applying a second supplementary voltage $U_{S2}$ ($U_{S2}=U_{R26}$) to the divider arm $R_{28}$ of said third voltage divider through the second new additional branch (with a current $I_{MN8}$) having a second new additional unidirectional conductive device 47 which is installed in an opposite direction with respect to said new additional unidirectional conductive device 46;

using the current $I_{MN8}$ of said second new additional branch for controlling or switching on or switching off the switching device S3-1. One can change a time of switching on or switching off said switching device S3-1 by changing a value of said second supplementary voltage $U_{S2}$ or by changing a value of at least one of said resistances $R_{27}$ and $R_{28}$ of said third voltage divider.

The principle of functioning the third control system is demonstrated below for realizations shown in FIGS. 66–77.

Figure 68:
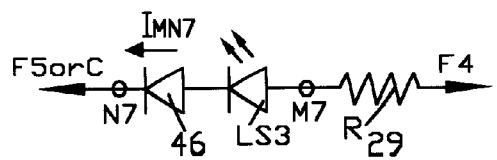

The switching device S3 and the light source LS3 are on when $I_{MN7}>0$ where $I_{MN7}$ is a current of a new additional branch (FIGS. 67–68). For example, for the realization shown in FIG. 66, the current $I_{MN7}>0$ when:

$U_{28}>U_{26}$ where $U_{28}$ and $U_{26}$ are voltages on resistances $R_{28}$ and $R_{26}$ (FIGS. 67–68 with FIG. 66).

The switching device S3 and the light source LS3 are off when $I_{MN7}=0$. The current $I_{MN7}=0$ when:

$U_{28} \leq U_{26}$ (FIGS. 67–68 with FIG. 66).

The switching device S3-1 and the light source LS3-1 are on when $I_{MN8}>0$ where $I_{MN8}$ is a current of a second new additional branch (FIG. 67 and FIG. 69). The current $I_{MN8}>0$ when:

$U_{28}<U_{26}$ (FIG. 67 and FIG. 69 with FIG. 66).

The switching device S3-1 and the light source LS3-1 are off when $I_{MN8}=0$. The current $I_{MN8}=0$ when:

$U_{28} \geq U_{26}$ (FIG. 67 and FIG. 69 with FIG. 66).

FIG. 66 illustrates a realization of the adjustable capacitor 12 with the third control system in which a voltage on the divider arm $R_{26}$ of said second supplementary voltage divider is used as a second supplementary voltage $U_{S2}$. A time of switching on or switching off said switching devices S3 (FIG. 66), S3-1 (FIG. 67 with FIG. 66) and/or said light sources LS3 (FIG. 68 with FIG. 66), LS3-1 (FIG. 69 with FIG. 66) can be changed by the step of changing at least one of resistances $R_{25}$, $R_{26}$, $R_{27}$ and $R_{28}$ where $R_{27}$ and $R_{28}$ are resistances of said third voltage divider. Switching devices S3, S3-1 and light sources LS3, LS3-1 are changing their states practically simultaneously.

FIG. 71 illustrates the step of controlling a time of beginning discharging said first 1 and second 2 capacitors by switching device S3 which functions as normally open switching device. When switching device S3 is in switched on state, the voltage on the first 1 and second 2 capacitors is applied to the triggering electrode of the switching device 32-1 causing the change of the state of the switching device 32-1 into a conducting state. This technical solution permits obtaining relaxation oscillations (FIG. 78) on the first 1 and second 2 capacitors whose amplitude can be controlled by the switching device S3 and whose pulse rate can be smoothly changed by the step of changing the capacity $C_A$ of the adjustable capacitor described above. One can change an amplitude of said relaxation oscillations by the step of changing a value of at least one of resistances $R_{25}$, $R_{26}$, $R_{27}$ and $R_{28}$ (FIG. 65b).

FIG. 72 with FIG. 65b and FIG. 73 with FIG. 65b illustrate the step of controlling a turn-on time, a turn-off time of said first 1 and second 2 capacitors with a load 9 by switching device S3 (FIG. 72) or switching device S3-1 (FIG. 73).

FIG. 74 with FIG. 65b, FIG. 66 illustrate the steps of connecting a current limiting device $R_{33}$ with the switching device S2-1 in parallel and installing them in an electric circuit of charging the adjustable capacitor. This technical solution permits changing a pulse duration on said load 9 or a pulse rise time as a function of a voltage level on the first 1 and second 2 capacitors. One can change said voltage level on the first 1 and second 2 capacitors by the step of changing a value of at least one of resistances $R_{25}$, $R_{26}$, $R_{27}$ and $R_{28}$ (FIG. 65b).

FIG. 75 and FIG. 76 illustrate the step of controlling a turn-on time and a turn-off time of a load 9 by switching devices S2 and S3-1 which function as normally open and as normally closed switching devices. These technical solutions permit changing a pulse duration on said load 9 as a function of two voltage levels on the first 1 and second 2 capacitors. One can change first of said voltage levels by the step of changing a value of at least one of resistances $R_{15}$, $R_{16}$, $R_{17}$ and $R_{18}$ (FIG. 65a) and second of said voltage levels by the step of changing a value of at least one of resistances $R_{25}$, $R_{26}$, $R_{27}$ and $R_{28}$ (FIG. 65b).

FIG. 76 (points of connections A and B) and FIG. 77 illustrate the step of controlling a turn-on time and a turn-off time of said second capacitor 2 with a load 9 by switching devices S2 and S3-1 which function as normally open and as normally closed switching devices. These technical solutions permit controlling a turn-on time, a turn-off time of the second capacitor with a load 9 as a function of two voltage levels on the first 1 and second 2 capacitors. One can change first of said voltage levels by the step of changing a value of at least one of resistances $R_{15}$, $R_{16}$, $R_{17}$ and $R_{18}$ (FIG. 65a) and second of said voltage levels by the step of changing a value of at least one of resistances $R_{25}$, $R_{26}$, $R_{27}$ and $R_{28}$ (FIG. 65b). These technical solutions permit forming on a load 9 rectangular form impulse voltages (FIG. 79) whose pulse duration and amplitude can be smoothly changed.

Technical solutions illustrated in FIG. 66 and FIG. 76 (points of connections A and C) permit forming on a load 9 different form impulse voltages (shaded sections of FIG. 78) whose minimal value and amplitude can be smoothly changed (by the step of changing a value of at least one of resistances $R_{15}$, $R_{16}$, $R_{17}$ and $R_{18}$ and by the step of changing a value of at least one of resistances $R_{25}$, $R_{26}$, $R_{27}$ and $R_{28}$) and whose pulse rate can be independently and smoothly changed by the step of changing the capacity $C_A$ of the adjustable capacitor described above.

FIG. 65c illustrates the step of combining said second voltage divider with said third voltage divider.

First, second and/or third control systems can be used for controlling a delay time in at least one electric circuit. For example, one can control a delay time of applying a voltage on a load 9 or a duration of time, when a voltage is applied to a load 9, by connecting optically at least one of said light sources LS1, LS1-1, LS2, LS2-1, LS3, LS3-1 to a photo-sensitive part 71 (FIG. 100). One can also control a delay time of applying a voltage on a load 9 or a duration of time, when a voltage is applied to a load 9, by connecting optically one of said light sources LS2, LS2-1 (which functions as normally switched off light source) to a photosensitive part 71 (FIG. 101) and connecting optically one of said light sources LS3, LS3-1 (which functions as normally switched on light source) to a photosensitive part 72 (FIG. 101). It is evident that said load 9 and photosensitive parts 71 and 72 (FIG. 100 and FIG. 101) can be parts of an electric circuit which do not have electrical connection with all mentioned realizations of the present invention. Only at least one or two of said light sources LS1, LS1-1, LS2, LS2-1, LS3, LS3-1 must be optically connected to one or two photosensitive parts 71 and 72 (FIG. 100 and FIG. 101).

Technical solutions illustrated in FIG. 37, FIG. 51 and FIG. 70 permit controlling of light sources LS1, LS2 and LS3 which have relatively high power (for example laser light sources LS1, LS2 and LS3).

Technical solutions illustrated above also show that the second and the third control systems are similar. The adjustable capacitor can have 4, 5 or more control systems similar to the second or third control system.

FIG. 88 illustrates the adjustable capacitor 12 of direct current on the base of first 1, second 2 and third 53 capacitors whose capacities are respectively equal to C1, C2 and C3. This technical solution permits obtaining the adjustable capacitor 12 whose capacity $C_A$ can be smoothly changed in each of following ranges given by expressions:

$$(C_1 \times C_2)/(C_1+C_2) \leq C_A \leq C_2 \tag{11}$$

When $U_{R16} > U_{R34max}$ and $0 \leq U_{R4} \leq U_{R6max}$;

$$(C_3 \times C_2)/(C_3+C_2) \leq C_A \leq C_2 \tag{12}$$

When $U_{R4} > U_{R6max}$ and $0 \leq U_{R16} \leq U_{R34max}$;

$$(C_1 \times C_2 \times C_3)/(C_2 C_3 + C_1 \times C_3 + C_1 \times C_2) \leq C_A \leq (C_1 \times C_2)/(C_1+C_2) \tag{13}$$

When $U_{R4}=0$ and $0 \leq U_{R16} \leq U_{R34max}$;

$$(C_1 \times C_2 \times C_3)/(C_2 C_3 + C_1 \times C_3 + C_1 \times C_2) \leq C_A \leq (C_3 \times C_2)/(C_3+C_2) \tag{14}$$

When $U_{R16}=0$ and $0 \leq U_{R4} \leq U_{R6max}$;

$$(C_1 \times C_2 \times C_3)/(C_2 C_3 + C_1 \times C_3 + C_1 \times C_2) \leq C_A \leq C_2 \tag{15}$$

When $0 \leq U_{R4} \leq U_{R6max}$ and $0 \leq U_{R16} \leq U_{R34max}$ where: $U_{R4}$, $U_{R16}$ are voltages on resistances $R_4$, and $R_{16}$; $U_{R6max}$, $U_{R34max}$ are maximum voltages on resistances $R_6$, and $R_{16}$ within charging of the second capacitor 2.

Technical solution illustrated in FIG. 88 also shows that control systems of the first 1 and third 53 capacitors are similar. The adjustable capacitor can have 4, 5 or more capacitors connected in series and a control system for each $4^{th}, 5^{th}, \ldots, n^{th}$ (where n>5) capacitor similar to the control system of the first capacitor 1 or the third capacitor 53 (FIG. 88).

FIG. 90 illustrates the step of connecting capacitor plates of the second capacitor 2 through a unidirectional conductive device 57, which is installed against current of charging of the second capacitor 2. This step permits:

using an adjustable capacitor 12 of direct current (described above) in an electric circuit of alternating current. Maximum power consumption of a load L (of alternating current) can be smoothly decreased about two times by the step of changing the capacity $C_A$ of the adjustable capacitor 12;

controlling a turn-on time and a turn-off time of the second capacitor 2 with a load 9 of direct current (FIG. 91) by at least one of said switching devices of the second and the third control systems as a function of a voltage level on the first 1 and second 2 capacitors of the adjustable capacitor 12 (FIG. 91). As an example, FIG. 91 shows the step of controlling a turn-on time and a turn-off time of the second capacitor 2 with a load 9 by the switching device S2 of the second control system whose supplementary voltage divider is illustrated in FIG. 92. A thyristor (for example) can be chosen as a load 9. In this case, a time of applying a voltage $U_2$ of the second capacitor 2 to the triggering terminals of said thyristor 9 (FIG. 91) depends on a voltage level on the first 1 and second 2 capacitors which can be changed by the step of changing a value of at least one of resistances $R_{15}$, $R_{16}$ of the supplementary voltage divider (FIG. 92) and/or by changing a value(s) of impedance(s) on at least one of divider arms of said second voltage divider. The voltage $U_2$ can be changed by the step of changing the capacity $C_A$ of the adjustable capacitor 12 (FIG. 91).

Figure 87:
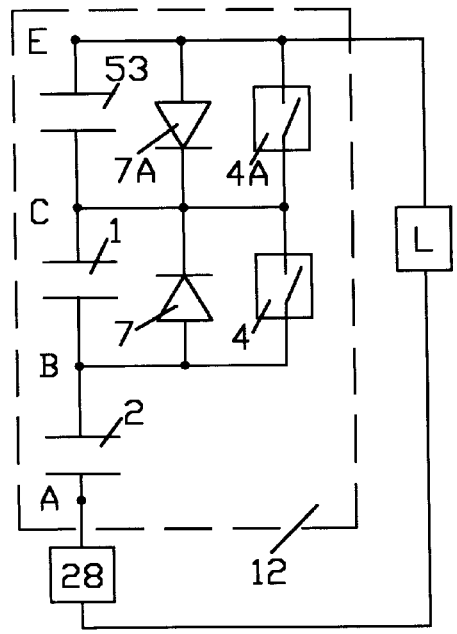

The method of obtaining the adjustable capacitor for alternating voltage is demonstrated below for realizations shown in FIG. 87 and FIGS. 93–94.

The third capacitor 53 is connected in series with the first capacitor 1 (FIG. 87, FIGS. 93–97). In a moment $t_0$ (FIG. 98a), the step of connecting the capacitor plates of the third capacitor 53 by a first short circuit, during a period of time when the voltage direction is positive, is realized by switching on the additional switching device 4A. In this moment $t_0$, the step of connecting the capacitor plates of the first capacitor 1 is realized by switching on the switching device 4. $t_0$ is a moment of switching on the voltage source 28. The charging of the second capacitor 2 begins at this moment $t_0$ (FIG. 98b). In a moment $t_1$ (FIG. 98b), the step of converting the switching device 4 into a non-conducting state is realized by switching off the switching device 4. The charging of the first capacitor 1 begins at this moment $t_1$. In a moment $t_2$, the process of charging the capacitors 1 and 2 is finished and the process of discharging the capacitors 1 and 2 is started. In a moment $t_3$ (FIG. 98b), the process of discharging the first capacitor 1 is finished and the step of connecting electrically the capacitor plates of the first capacitor 1 is realized by the diode 7. During a period of time $\Delta t_2 = t_4 - t_3$, the step of discharging the second capacitor 2 is realized through the diode 7.

In a moment $t_4$ the process of discharging the second capacitor 2 is finished. In this moment $t_4$, the step of connecting the capacitor plates of the first capacitor 1 by a second short circuit during a period of time when the voltage direction is negative is realized by switching on the switching device 4. The charging of the second capacitor 2 begins at this moment $t_4$ (FIG. 98b). During a period of time $\Delta t_3 = t_5 - t_4$, the step of connecting the capacitor plates of the third capacitor 53 through the additional switching device 4A is realized because the additional switching device 4A is in switching on state. In a moment $t_5$ (FIG. 98b), the step of converting the additional switching device 4A into a non-conducting state is realized by switching off the additional switching device 4A. The charging of the third capacitor 53 begins at this moment $t_5$. In a moment $t_6$, the process of charging the capacitors 2 and 53 is finished and the process of discharging the capacitors 2 and 53 is started. In a moment $t_7$ (FIG. 98b), the process of discharging the third capacitor 53 is finished and the step of connecting electrically the capacitor plates of the third capacitor 53 is realized by the additional diode 7A. During a period of time $\Delta t_4 = t_8 - t_7$, the step of discharging the second capacitor 2 is realized through the additional diode 7A. In a moment $t_8$, the process of discharging the second capacitor 2 is finished. At this moment $t_8$, the step of connecting the capacitor plates of the third capacitor 53 by a first short circuit during the period of time when the voltage direction is positive is repeated.

During a period of time $t_1 - t_0$ (FIG. 98), the switching device 4 (FIGS. 93–94, FIGS. 96–97) is on because the unidirectional conductive device 13 (FIGS. 93–94, FIG. 96) or the photodiode 13 (FIG. 97) is open and the current $I_{MN1} > 0$.

During a period of time $t_3 - t_1$ (FIG. 98), the switching device 4 (FIGS. 93–94, FIGS. 96–97) is off because the unidirectional conductive device 13 (FIGS. 93–94, FIG. 96) or the photodiode 13 (FIG. 97) is closed and the current $I_{MN1} = 0$. During a period of time $t_4 - t_3$, the step of discharging the second capacitor 2 is realized through the diode 7.

During a period of time $t_5 - t_4$ (FIG. 98), the switching device 4A (FIGS. 93–94, FIGS. 96–97) is on because the supplementary unidirectional conductive device 61 (FIGS. 93–94, FIG. 96) or the photodiode 61 (FIG. 97) is open and the current $I_{MN2} > 0$.

During a period of time $t_7 - t_5$ (FIG. 98), the switching device 4A (FIGS. 93–94, FIGS. 96–97) is off because the supplementary unidirectional conductive device 61 (FIGS. 93–94, FIG. 96) or the photodiode 61 (FIG. 97) is closed and the current $I_{MN2} = 0$. During a period of time $t_8 - t_7$, the step of discharging the second capacitor 2 is realized through the additional diode 7A.

The adjustable capacitor 12 shown in FIGS. 94–95 can function without diodes 7 and 7A. The diode 7 and 7A ensures the highest reliability.

The steps of installing an input circuit of an additional amplifying device 64 (FIG. 95) in said supplementary branch and controlling said additional switching device 4A through an output of said supplementary amplifying device 61 ensure smooth change of the capacity $C_A$ of the adjustable capacitor 12. These steps also permit using an adjustable resistance $R_{16}$ whose design power is about three to four and more orders of magnitude lesser than design power of the load L (FIG. 95) or of the charging resistor 54 (FIG. 99).

The step of combining said additional voltage divider with said supplementary voltage divider permits decreasing the quantity of resistors (FIGS. 96–97).

The energy losses can be decreased by steps of: installing a diode 62 (FIGS. 94–95) against current of charging of said third capacitor 53 in said voltage divider; installing a diode 63 against current of charging of said first capacitor 1 in said new voltage divider.

Figure 98:
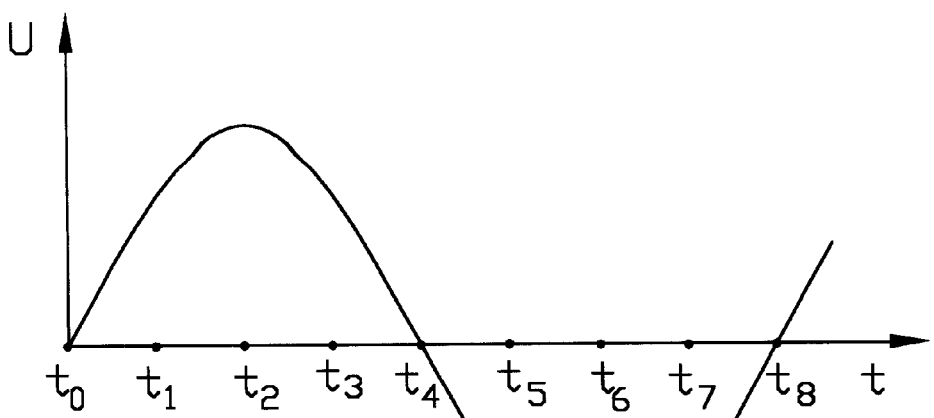
Figure 98:
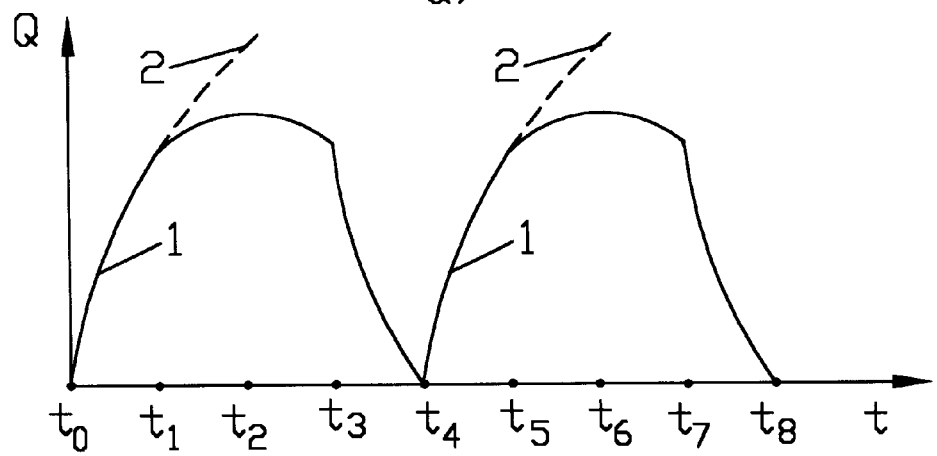

FIGS. 93–95 illustrate the steps of: connecting a first 25 and a second 59 stabilizing capacitors respectively with said additional and supplementary voltage dividers in parallel; connecting the voltage source 28 to said additional and supplementary voltage dividers respectively through a first 24 and a second 60 diodes. These steps permit maintaining switching devices 4A and 4 in switched on state (FIGS. 93–94) respectively during periods of time $t_4-t_0$ and $t_8-t_4$ (FIG. 98).

During a period of time when the voltage direction is positive (FIG. 98a), one can smoothly change the capacity $C_A$ of the adjustable capacitor 12 (FIG. 95) approximately within limits given by mentioned expression (12) by changing a value of voltage $U_{R16}$ within limits: $0 \leq U_{R16} \leq U_{R34max}$ where $U_{R16}$ is the voltage on the resistance $R_{16}$, $U_{R34max}$ is the maximum voltage on the resistance $R_{34}$.

During a period of time when the voltage direction is negative (FIG. 98a), one can smoothly change the capacity $C_A$ of the adjustable capacitor 12 (FIG. 95) approximately within limits given by mentioned expression (11) by changing a value of voltage $U_{R4}$ within limits: $0 \leq U_{R4} \leq U_{R6max}$ where $U_{R4}$ is the voltage on the resistance $R_4$, $U_{R6max}$ is the maximum voltage on the resistance $R_6$.

The step of controlling switched on and switched off states of switching devices 4 and 4A respectively by currents $I_{MN1}$, and $I_{MN2}$ permits maintaining amplitudes of alternating voltage $U_{2L}$ on the load L1, connected to the second capacitor 2 (FIG. 99 with the adjustable capacitor 12 illustrated in FIG. 93 or FIG. 94 or FIG. 95), practically constant when values of variable resistances $R_4$, $R_6$, $R_{16}$ and $R_{34}$ (FIGS. 93–94) or variable resistances $R_4$ and $R_{16}$ (FIG. 95) are fixed and $I_L \ll I_{54A}$ where: $I_L$ is effective value of the current of the load L1; $I_{54A}$ is allowable current through the resistance 54 (FIG. 99). One can smoothly change said voltage $U_{2L}$ (during a period of time when the voltage direction is positive) by changing a value of voltage $U_{R16}$ (FIG. 99 with the adjustable capacitor 12 illustrated in FIG. 95) and by changing a value of voltage $U_{R4}$ during a period of time when the voltage direction is negative. One can smoothly change said voltage $U_{2L}$ (during a period of time when the voltage direction is positive) by changing at least a value of one of said resistances $R_4$ and $R_6$ (FIG. 99 with the adjustable capacitor 12 illustrated in FIG. 93 or FIG. 94) and by changing at least a value of one of said resistances $R_{16}$ and $R_{34}$, during a period of time when the voltage direction is negative.

In case of (FIG. 97) $I_{D1} \ll I_L$ and $I_{D2} \ll I_L$, the currents $I_{D1}$ and $I_{D2}$ of said voltage dividers can not practically affect the process of charging and discharging said first 1, second 2 and third 53 capacitors.

FIG. 5 with FIG. 1 include the first capacitor 1 whose capacity is chosen no more than the capacity of the second capacitor 2. The realization of this technical solution comprises the steps of:

connecting said first 1 and second 2 capacitors in series; connecting capacitor plates of said first capacitor 1 through an adjustable resistance device 5. It is evident from expressions 5, 6, 7 and 8 that a capacity $C_A$ and the voltages $U_1$ and $U_2$ can be changed by changing a value of the adjustable resistance 5 (see FIG. 5 with FIG. 1 or with FIG. 2) or by changing a value of the adjustable reactance 6 (see FIG. 6 with FIG. 1 or with FIG. 2). In this case: a capacity $C_A$ cannot be stable in an electric circuit of direct current because $C_A$ is increasing to $C_2$ in the course of time. This way can be utilized for discharging the stored energy into a load connected to said first 1 and second 2 capacitors or to output terminals of said first 1 and second 2 groups of capacitors through a threshold switch 17 as shown on the FIG. 22. The step of connecting electrically the capacitor plates of the first capacitor 1 through a diode 7 provides a rapid extraction of the stored energy into said load; in an electric circuit of alternating current, the capacity $C_A$ is different for different oscillation frequencies.

Further modifications of the invention herein disclosed will occur to persons skilled in the art and all such modifications are deemed to be within the spirit and scope of the invention as defined by the appended claims.

What is claimed is:

1. The method of obtaining the adjustable capacitor comprising the steps of:

choosing the capacity of a first capacitor or a first group of capacitors, which has first and second output terminals, no more than the capacity of a second capacitor or a second group of capacitors which has first and second output terminals;

connecting at least said first and second capacitors or said first and second groups of capacitors in series;

applying a control voltage $U_A$ to said second capacitor or to said output terminals of the second group of capacitors through at least one branch, having at least one unidirectional conductive device or photodiode, or connecting capacitor plates of said second capacitor or said output terminals of the second group of capacitors through a voltage divider and applying said control voltage $U_A$ to a divider arm of said voltage divider through at least one branch having at least one unidirectional conductive device or photodiode;

connecting capacitor plates of said first capacitor or said output terminals of said first group of capacitors through at least one cell, which changes its resistance or reactance, or at least one switching device or at least one adjustable resistance device or at least one adjustable reactance device;

then converting at least one of said cells or switching devices or adjustable resistance devices or adjustable reactance devices into a non-conducting state or into a state with higher impedance within charging of said second capacitor or said second group of capacitors;

then connecting electrically the capacitor plates of said first capacitor or said output terminals of said first group of capacitors;

using a current of at least one of said branches or using a voltage drop on at least one part of said branches for controlling or realizing at least one of said steps of connecting and said step of converting;

and changing a capacity of the adjustable capacitor by changing a value of said control voltage $U_A$ or by changing a value(s) of impedance(s) on at least one of divider arms of said voltage divider.

2. The method of obtaining the adjustable capacitor as claimed in claim 1, further comprising the step of:

connecting a voltage source or unlike poles of an operating electric circuit of charging said first and second capacitors or said first and second groups of capacitors through an additional voltage divider and using at least one voltage drop on at least one of divider arms of said voltage divider as said control voltage $U_A$ and changing a capacity of the adjustable capacitor by changing a value(s) of impedance(s) on at least one of divider arms of said additional voltage divider.

3. The method of obtaining the adjustable capacitor as claimed in claim 2, further comprising the step of reversing said connections of said voltage source or unlike poles of said operating electric circuit through said additional voltage divider.

4. The method of obtaining the adjustable capacitor as claimed in claim 1, further comprising the steps of:
   installing an input circuit of an amplifying device in said branch;
   controlling a control gear of said switching device through at least an output of said amplifying device.

5. The method of obtaining the adjustable capacitor as claimed in claim 4, further comprising the step of controlling a control gear of said switching device through an output of said amplifying device and at least one transistor.

6. The method of obtaining the adjustable capacitor as claimed in claim 4, or 5 in which at least one of said amplifying device, switching device and transistors is a darlington transistor.

7. The method of obtaining the adjustable capacitor as claimed in claim 1 in which said step of charging said capacitors or said groups of capacitors is realized through at least one light source and a bridge rectifier.

8. The method of obtaining the adjustable capacitor as claimed in claim 1, 2, 3, 4, 5, or 7, further comprising the step of connecting capacitor plates of said second capacitor or said output terminals of said second group of capacitors through a load and changing a maximum voltage $U_{2max}$ on said second capacitor or said second group of capacitors by changing a value of said control voltage $U_A$.

9. The method of obtaining the adjustable capacitor as claimed in claim 1, further comprising the steps of:
   applying said control voltage $U_A$ to said second capacitor or to said output terminals of said second group of capacitors through at least one new branch, having at least one new unidirectional conductive device or photodiode, or applying said control voltage $U_A$ to a divider arm of said voltage divider through at least one new branch having at least one new unidirectional conductive device or photodiode;
   using a current of at least one of said new branches or a voltage drop on at least one part of said new branches for controlling or switching on or switching off at least one switching device S1 or at least one light source LS1;
   and changing a maximum voltage $U_{2max}$ on said second capacitor or on said second group of capacitors and a time of switching on or switching off said switching device S1 or said light source LS1 by changing a value of said control voltage $U_A$ or by changing a value(s) of impedance(s) on at least one of divider arms of said voltage divider.

10. The method of obtaining the adjustable capacitor as claimed in claim 9, further comprising the steps of:
    applying said control voltage $U_A$ to said second capacitor or to said output terminals of said second group of capacitors through at least one second new branch, having at least one second new unidirectional conductive device or photodiode which is installed in an opposite direction with respect to said new unidirectional conductive device or photodiode, or applying said control voltage $U_A$ to said divider arm of said voltage divider through at least one second new branch having at least one second new unidirectional conductive device or photodiode which is installed in an opposite direction with respect to said new unidirectional conductive device or photodiode;
    using a current of at least one of said second new branches or a voltage drop on at least one part of said second new branches for controlling or switching on or switching off at least one switching device S1-1 or at least one light source LS1-1;
    and changing a time of switching on or switching off said switching device S1-1 or said light source LS1-1 by changing a value of said control voltage $U_A$ or by changing a value(s) of impedance(s) on at least one of divider arms of said voltage divider.

11. The method of obtaining the adjustable capacitor as claimed in claim 10, further comprising the step of controlling a time of beginning discharging said second capacitor or said second group of capacitors by at least one of said switching devices S1, S1-1 and said light sources LS1, LS1-1 which function as normally open switching device and as normally switched off light source.

12. The method of obtaining the adjustable capacitor as claimed in claim 10, further comprising the step of controlling a turn-on time or a turn-off time of at least one load by at least one of said switching devices S1, S1-1 and light sources LS1, LS1-1.

13. The method of obtaining the adjustable capacitor as claimed in claim 10, further comprising the step of combining at least one of said branches with one of said first and second new branches.

14. The method of obtaining the adjustable capacitor as claimed in claim 10, further comprising the step of controlling a turn-on time or a turn-off time of said second capacitor or said second group of capacitors with at least one load by at least one of said switching devices S1, S1-1 and light sources LS1, LS1-1.

15. The method of obtaining the adjustable capacitor as claimed in claim 10, further comprising the steps of:
    connecting optically at least one of said light sources LS1, LS1-1 to at least one photosensitive part of an electric circuit;
    controlling a delay time in said electric circuit by at least one of said light sources LS1, LS1-1 which is optically connected to said photosensitive part.

16. The method of obtaining the adjustable capacitor as claimed in claim 1, further comprising the steps of:
    applying a supplementary voltage $U_{S1}$ to said first and second capacitors or to output terminals of said first and second groups of capacitors through at least one additional branch, having at least one additional unidirectional conductive device or photodiode, or connecting capacitor plates of said first and second capacitors or output terminals of said first and second groups of capacitors through a second voltage divider and applying said supplementary voltage $U_{S1}$ to a divider arm of said second voltage divider through at least one additional branch having at least one additional unidirectional conductive device or photodiode;
    using a current of at least one of said additional branches or a voltage drop on at least one part of said additional branches for controlling or switching on or switching off at least one switching device S2 or at least one light source LS2;
    and changing a time of switching on or switching off said switching device S2 or said light source LS2 by changing a value of said supplementary voltage $U_{S1}$ or by changing a value(s) of impedance(s) on at least one of divider arms of said second voltage divider.

17. The method of obtaining the adjustable capacitor as claimed in claim 16, further comprising the steps of:
    connecting a voltage source of charging the adjustable capacitor or unlike poles of an operating electric circuit of charging the adjustable capacitor through a supplementary voltage divider and using at least one voltage drop on at least one of divider arms of said supplementary voltage divider as said supplementary voltage $U_{S1}$;

and changing a time of switching on or switching off said switching device S2 or said light source LS2 by changing a value(s) of impedance(s) on at least one of divider arms of said supplementary voltage divider.

18. The method of obtaining the adjustable capacitor as claimed in claim 17, further comprising the steps of:

applying said supplementary voltage $U_{S1}$ to said first and second capacitors or to output terminals of said first and second groups of capacitors through at least one second additional branch, having at least one second additional unidirectional conductive device or photodiode which is installed in an opposite direction with respect to said additional unidirectional conductive device or photodiode, or applying said supplementary voltage $U_{S1}$ to said divider arm of said second voltage divider through at least one second additional branch having at least one second additional unidirectional conductive device or photodiode which is installed in an opposite direction with respect to said additional unidirectional conductive device or photodiode;

using a current of at least one of said second additional branches or a voltage drop on at least one part of said second additional branches for controlling or switching on or switching off at least one switching device S2-1 or at least one light source LS2-1;

and changing a time of switching on or switching off said switching device S2-1 or said light source LS2-1 by changing a value of said supplementary voltage $U_{S1}$ or by changing a value(s) of impedance(s) on at least one of divider arms of said second voltage divider.

19. The method of obtaining the adjustable capacitor as claimed in claim 18, further comprising the step of controlling a time of beginning discharging said first and second capacitors or said first and second groups of capacitors by at least one of said switching devices S2, S2-1 and said light sources LS2, LS2-1 which function as normally open switching device and as normally switched off light source.

20. The method of obtaining the adjustable capacitor as claimed in claim 18, further comprising the step of controlling a turn-on time or a turn-off time of at least one load by at least one of said switching devices S2, S2-1 and light sources LS2, LS2-1.

21. The method of obtaining the adjustable capacitor as claimed in claim 18, further comprising the steps of applying a voltage of said voltage source or a voltage on said unlike poles of said operating electric circuit to said first and second capacitors or to output terminals of said first and second groups of capacitors through one of said switching devices S2 S2-1 which functions as normally closed switching device;

changing a maximum voltage $U_{ADJmax}$ on the adjustable capacitor by changing a value of said supplementary voltage $U_{S1}$ or by changing a value(s) of impedance(s) on at least one of divider arms of said second voltage divider.

22. The method of obtaining the adjustable capacitor as claimed in claim 18, further comprising the step of controlling a turn-on time or a turn-off time of said first and second capacitors or said first and second groups of capacitors with at least one load by at least one of said switching devices S2, S2-1 and light sources LS2, LS2-1.

23. The method of obtaining the adjustable capacitor as claimed in claim 18, further comprising the step of:

controlling a turn-on time or a turn-off time of said second capacitor or said second group of capacitors with at least one load by at least one of said switching devices S2, S2-1 and light sources LS2, LS2-1.

24. The method of obtaining the adjustable capacitor as claimed in claim 23, further comprising the steps of:

connecting a stabilizing capacitor with said supplementary voltage divider in parallel;

connecting said voltage source or unlike poles of said operating electric circuit to said supplementary voltage divider through a diode.

25. The method of obtaining the adjustable capacitor as claimed in claim 18, further comprising the steps of:

connecting optically at least one of said light sources LS2, LS2-1 to at least one photosensitive part of an electric circuit;

controlling a delay time in said electric circuit by at least one of said light sources LS2, LS2-1 which is optically connected to said photosensitive part.

26. The method of obtaining the adjustable capacitor as claimed in claim 18, further comprising the steps of:

applying a second supplementary voltage $U_{S2}$ to said first and second capacitors or to output terminals of said first and second groups of capacitors through at least one new additional branch, having at least one new additional unidirectional conductive device or photodiode, or connecting capacitor plates of said first and second capacitors or output terminals of said first and second groups of capacitors through a third voltage divider and applying said second supplementary voltage $U_{S2}$ to a divider arm of said third voltage divider through at least one new additional branch having at least one new additional unidirectional conductive device or photodiode;

using a current of at least one of said new additional branches or a voltage drop on at least one part of said new additional branches for controlling or switching on or switching off at least one switching device S3 or at least one light source LS3;

and changing a time of switching on or switching off said switching device S3 or said light source LS3 by changing a value of said second supplementary voltage $U_{S2}$ or by changing a value(s) of impedance(s) on at least one of divider arms of said third voltage divider.

27. The method of obtaining the adjustable capacitor as claimed in claim 26, further comprising the steps of:

connecting said voltage source of charging the adjustable capacitor or unlike poles of said operating electric circuit of charging the adjustable capacitor through a second supplementary voltage divider and using at least one voltage drop on at least one of divider arms of said second supplementary voltage divider as said second supplementary voltage $U_{S2}$;

and changing a time of switching on or switching off said switching device S3 or said light source LS3 by changing a value(s) of impedance(s) on at least one of divider arms of said second supplementary voltage divider.

28. The method of obtaining the adjustable capacitor as claimed in claim 27, further comprising the steps of:

applying said second supplementary voltage $U_{S2}$ to said first and second capacitors or to output terminals of said first and second groups of capacitors through at least one second new additional branch, having at least one second new additional unidirectional conductive device or photodiode which is installed in an opposite direction with respect to said new additional unidirectional conductive device or photodiode, or applying said second supplementary voltage $U_{S2}$ to said divider arm of said third voltage divider through at least one second new additional branch having at least one second new additional unidirectional conductive device or photodiode which is installed in an opposite direction with respect to said new additional unidirectional conductive device or photodiode;

using a current of at least one of said second new additional branches or a voltage drop on at least one part of said second new additional branches for controlling or switching on or switching off at least one switching device S3-1 or at least one light source LS3-1;

and changing a time of switching on or switching off said switching device S3-1 or said light source LS3-1 by changing a value of said second supplementary voltage $U_{S2}$ or by changing a value(s) of impedance(s) on at least one of divider arms of said third voltage divider.

29. The method of obtaining the adjustable capacitor as claimed in claim 28, further comprising the step of:

controlling a turn-on time and a turn-off time of at least one load by one of said switching devices S2, S2-1 and one of said switching devices S3, S3-1 which function as normally open and as normally closed switching devices or by one of said light sources LS2, LS2-1 and one of said light sources LS3, LS3-1 which function as normally switched off and as normally switched on light sources.

30. The method of obtaining the adjustable capacitor as claimed in claim 28, further comprising the step of:

controlling a turn-on time and a turn-off time of said first and second capacitors or said first and second groups of capacitors with at least one load by one of said switching devices S2, S2-1 and one of said switching devices S3, S3-1 which function as normally open and as normally closed switching devices or by one of said light sources LS2, LS2-1 and one of said light sources LS3, LS3-1 which function as normally switched off and as normally switched on light sources.

31. The method of obtaining the adjustable capacitor as claimed in claim 28, further comprising the step of:

controlling a turn-on time and a turn-off time of said second capacitor or said second group of capacitors with at least one load by one of said switching devices S2, S2-1 and one of said switching devices S3, S3-1 which function as normally open and as normally closed switching devices or by one of said light sources LS2, LS2-1 and one of said light sources LS3, LS3-1 which function as normally switched off and as normally switched on light sources.

32. The method of obtaining the adjustable capacitor as claimed in claim 29, or 30, further comprising the step of controlling a time of beginning discharging said first and second capacitors or said first and second groups of capacitors by one of said switching devices S3, S3-1 and said light sources LS3, LS3-1 which functions as normally open switching device and as normally switched off light source.

33. The method of obtaining the adjustable capacitor as claimed in claim 29, further comprising the steps of connecting at least one current limiting device with at least one of said switching devices S2, S2-1, S3 and S3-1 in parallel and installing them in an electric circuit of charging the adjustable capacitor.

34. The method of obtaining the adjustable capacitor as claimed in claim 28, further comprising the step of combining at least two of said voltage dividers.

35. The method of obtaining the adjustable capacitor as claimed in claim 1, further comprising the steps of:

connecting at least one third capacitor or third group of capacitors, which has first and second output terminals, with said first capacitor or first group of capacitors or with said second capacitor or second group of capacitors in series;

applying a supplementary voltage $U_{S1}$ to said second capacitor or to said output terminals of said second group of capacitors through at least one new supplementary branch, having at least one new supplementary unidirectional conductive device or photodiode, or connecting capacitor plates of said second capacitor or said output terminals of said second group of capacitors through a new voltage divider and applying, said supplementary voltage $U_{S1}$ to a divider arm of said new voltage divider through at least one new supplementary branch having at least one new supplementary unidirectional conductive devices or photodiode;

connecting capacitor plates of said third capacitor or said output terminals of said third group of capacitors through at least one additional cell, which changes its impedance, or at least one additional switching device or at least one additional adjustable resistance device or at least one additional adjustable reactance device;

then converting at least one of said additional cells or additional switching devices or additional adjustable resistance devices or additional adjustable reactance devices into a non-conducting state or into a state with higher impedance within charging of said second capacitor or said second group of capacitors;

then connecting electrically the capacitor plates of said third capacitor or said output terminals of said third group of capacitors;

using a current of at least one of said new supplementary branches or using a voltage drop on at least one part of said new supplementary branches for controlling or realizing at least one of said steps of connecting and said step of converting;

and changing a capacity of the adjustable capacitor by changing a value of said supplementary voltage $U_{S1}$ or by changing a value(s) of impedance(s) on at least one of divider arms of said new voltage divider.

36. The method of obtaining the adjustable capacitor as claimed in claim 35, further comprising the step of combining said voltage divider with said new voltage divider.

37. The method of obtaining the adjustable capacitor as claimed in claim 1, 2, 3, 4, 5, 23, 24, or 35, further comprising the step of connecting capacitor plates of said second capacitor or said output terminals of said second group of capacitors through a unidirectional conductive device which is installed against current of charging of said second capacitor or said second group of capacitors.

38. The method of obtaining the adjustable capacitor as claimed in claim 1, further comprising the steps of:

connecting a third capacitor or a third group of capacitors, which has first and second output terminals, with said first capacitor or first group of capacitors or with said second capacitor or second group of capacitors in series;

applying a supplementary voltage $U_{S1}$ to said second capacitor or to said output terminals of said second group of capacitors through at least one supplementary branch, having at least one supplementary unidirectional conductive device or photodiode, or connecting capacitor plates of said second capacitor or said output terminals of said second group of capacitors through a new voltage divider and applying said supplementary voltage $U_{S1}$ to a divider arm of said new voltage divider through at least one supplementary branch having at least one supplementary unidirectional conductive devices or photodiode;

removing charging of said third capacitor or said third group of capacitors by a short circuit or by a circuit with a low impedance during a period of time when the voltage direction is positive;

then removing charging of said first capacitor or said first group of capacitors by a second short circuit or by a second circuit with a low impedance during a period of time when the voltage direction is negative;

connecting capacitor plates of said third capacitor or said output terminals of said third group of capacitors through at least one additional cell, which changes its impedance, or at least one additional switching device or at least one additional adjustable resistance device or at least one additional adjustable reactance device;

then converting at least one of said additional cells or additional switching devices or additional adjustable resistance devices or additional adjustable reactance devices into a non-conducting state or into a state with higher impedance within charging of said second capacitor or said second group of capacitors;

then connecting electrically the capacitor plates of said third capacitor or said output terminals of said third group of capacitors using a current of at least one of said supplementary branches or using a voltage drop on at least one part of said supplementary branches for controlling or realizing at least one of said steps of connecting, converting and removing;

and changing a capacity of the adjustable capacitor by changing a value of said supplementary voltage $U_{S1}$ or by changing a value(s) of impedance(s) on at least one of divider arms of said new voltage divider.

39. The method of obtaining the adjustable capacitor as claimed in claim 38, further comprising the steps of:

connecting a voltage source of charging the adjustable capacitor or unlike poles of an operating electric circuit of charging the adjustable capacitor through an additional and a supplementary voltage dividers;

using at least one voltage drop on at least one of divider arms of each of said voltage dividers as said control voltage $U_A$ and said supplementary voltage $U_{S1}$ and changing a capacity of the adjustable capacitor by changing a value(s) of impedance(s) on at least one of divider arms of said additional and supplementary voltage dividers.

40. The method of obtaining the adjustable capacitor as claimed in claim 39, further comprising the steps of:

connecting a first and a second stabilizing capacitors respectively with said additional and supplementary voltage dividers in parallel;

connecting said voltage source or unlike poles of said operating electric circuit to said additional and supplementary voltage dividers respectively through a first and a second diodes.

41. The method of obtaining the adjustable capacitor as claimed in claim 38, further comprising the steps of:

installing a diode against current of charging of said third capacitor or said third group of capacitors in said voltage divider;

installing a diode against current of charging of said first capacitor or said first group of capacitors in said new voltage divider.

42. The method of obtaining the adjustable capacitor as claimed in claim 38, further comprising the step of connecting capacitor plates of said second capacitor or said output terminals of said second group of capacitors through at least one load.

43. The method of obtaining the adjustable capacitor as claimed in claim 38, 39, 40, 41 or 42, further comprising the steps of:

installing an input circuit of an additional amplifying device in said supplementary branch;

controlling a control gear of said additional switching device through at least an output of said amplifying device or controlling a control gear of said additional switching device through at least an output of said amplifying device and at least one additional transistor.

44. The method of obtaining the adjustable capacitor as claimed in claim 39, further comprising the step of combining said additional voltage divider with said supplementary voltage divider.

45. The method of obtaining the adjustable capacitor as claimed in claim 44, further comprising the step of combining said voltage divider with said new voltage divider.

46. The method of obtaining the adjustable capacitor comprising the steps of:

choosing the capacity of a first capacitor or a first group of capacitors, which has first and second output terminals, less than the capacity of a second capacitor or a second group of capacitors which has first and second output terminals;

connecting at least said first and second capacitors or said first and second groups of capacitors in series;

connecting capacitor plates of said first capacitor or said first and second output terminals of said first group of capacitors through at least one cell, which changes its resistance or reactance, or at least one adjustable resistance device or at least one adjustable reactance device;

and changing a capacity of the adjustable capacitor by changing a value of said resistance or reactance of said cell or by changing a value of resistance of said adjustable resistance device or by changing a value of reactance of said adjustable reactance device.

47. The method of obtaining the adjustable capacitor as claimed in claim 46, further comprising the step of:

combining a capacitor plate of said first capacitor with a capacitor plate of said second capacitor, which have the same potential, and making the area of said combined capacitor plate bigger than the area of each of non-combined capacitor plates or combining the capacitor plates of said first group of capacitors with the capacitor plates of said second group of capacitors, which have the same potential, and making the area of said combined capacitor plates bigger than the area of each of non-combined capacitor plates.

48. The method of obtaining the adjustable capacitor as claimed in claim 46, further comprising the step of connecting electrically the capacitor plates of said first capacitor or connecting electrically said first and second output terminals of said first group of capacitors or connecting the capacitor plates of said first capacitor or said first and second output terminals of said first group of capacitors through at least one diode which is installed against current of charging of said first capacitor or said first group of capacitors.

49. The method of obtaining the adjustable capacitor as claimed in claim 1, 46, 47 or 48 in which $C_1 \ll C_2$ where $C_1$ and $C_2$ are the capacities of the first and the second capacitors or are the capacities of the first and the second groups of capacitors respectively.

* * * * *